(12) United States Patent
Lin

(10) Patent No.: US 9,922,603 B2
(45) Date of Patent: Mar. 20, 2018

(54) COLOR DISPLAY DEVICE AND DRIVING METHODS THEREFOR

(71) Applicant: E INK CALIFORNIA, LLC, Fremont, CA (US)

(72) Inventor: Craig Lin, Oakland, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 15/168,493

(22) Filed: May 31, 2016

(65) Prior Publication Data

US 2016/0275874 A1    Sep. 22, 2016

Related U.S. Application Data

(63) Continuation-in-part of application No. 14/626,552, filed on Feb. 19, 2015, now Pat. No. 9,541,814, which is a continuation-in-part of application No. 14/794,689, filed on Jul. 8, 2015, now Pat. No. 9,671,668.

(60) Provisional application No. 62/061,077, filed on Oct. 7, 2014, provisional application No. 62/022,557, filed on Jul. 9, 2014, provisional application No. 62/169,300, filed on Jun. 1, 2015, provisional application No. 62/241,633, filed on Oct. 14, 2015.

(51) Int. Cl.
*G09G 3/34* (2006.01)
*G09G 3/20* (2006.01)
*G02F 1/167* (2006.01)

(52) U.S. Cl.
CPC ............ *G09G 3/344* (2013.01); *G02F 1/167* (2013.01); *G09G 3/2003* (2013.01); *G09G 3/2011* (2013.01); *G02F 2001/1678* (2013.01); *G09G 2300/0452* (2013.01); *G09G 2310/0216* (2013.01); *G09G 2310/06* (2013.01)

(58) Field of Classification Search
CPC ............ G02F 1/167; G02F 2001/1678; G02F 2001/1672; G02F 2001/1676; G09G 3/344
USPC .......................................... 359/296; 345/107
See application file for complete search history.

(56) References Cited

U.S. PATENT DOCUMENTS

| | | | |
|---|---|---|---|
| 6,017,584 A | 1/2000 | Albert | |
| 6,545,797 B2 | 4/2003 | Chen | |
| 6,636,186 B1 * | 10/2003 | Yamaguchi | G09G 3/344 345/107 |
| 6,664,944 B1 | 12/2003 | Albert | |
| 6,781,745 B2 | 8/2004 | Chung | |

(Continued)

FOREIGN PATENT DOCUMENTS

| | | |
|---|---|---|
| JP | 2006343458 A | 12/2006 |
| JP | 2007140129 A | 6/2007 |

(Continued)

OTHER PUBLICATIONS

Korean Intellectual Property Office; PCT/US2016/035174; International Search Report and Written Opinion; dated Aug. 31, 2016. Aug. 31, 2016.

(Continued)

*Primary Examiner* — Koosha Sharifi-Tafreshi
(74) *Attorney, Agent, or Firm* — Brian D. Bean

(57) ABSTRACT

The invention relates to electrophoretic layers containing at least five different particles, and to driving methods for displaying at least five, and in some embodiments, six different colors at each pixel or sub-pixel.

22 Claims, 43 Drawing Sheets

(56) References Cited

U.S. PATENT DOCUMENTS

| | | |
|---|---|---|
| 6,788,452 B2 | 9/2004 | Liang |
| 6,864,875 B2 | 3/2005 | Drzaic |
| 6,914,714 B2 | 7/2005 | Chen |
| 6,930,818 B1 | 8/2005 | Liang |
| 6,972,893 B2 | 12/2005 | Sipix |
| 7,038,656 B2 | 5/2006 | Liang |
| 7,038,670 B2 | 5/2006 | Liang |
| 7,046,228 B2 | 5/2006 | Liang |
| 7,052,571 B2 | 5/2006 | Wang |
| 7,075,502 B1 | 7/2006 | Drzaic |
| 7,167,155 B1 | 1/2007 | Albert et al. |
| 7,292,386 B2 | 11/2007 | Kanbe |
| 7,312,916 B2 | 12/2007 | Pullen |
| 7,385,751 B2 | 6/2008 | Chen |
| 7,433,113 B2 | 10/2008 | Chopra |
| 7,492,505 B2 | 2/2009 | Liang |
| 7,609,435 B2 | 10/2009 | Moriyama |
| 7,636,076 B2 | 12/2009 | Hung |
| 7,652,656 B2 | 1/2010 | Chopra |
| 7,656,576 B2 | 2/2010 | Suwabe et al. |
| 7,667,684 B2 | 2/2010 | Jacobson et al. |
| 7,684,108 B2 | 3/2010 | Wang |
| 7,791,789 B2 | 9/2010 | Albert |
| 7,800,813 B2 | 9/2010 | Wu |
| 7,821,702 B2 | 10/2010 | Liang |
| 7,839,564 B2 | 11/2010 | Whitesides et al. |
| 7,848,009 B2 | 12/2010 | Machida |
| 7,910,175 B2 | 3/2011 | Webber |
| 7,952,790 B2 | 5/2011 | Honeyman |
| 7,956,841 B2 | 6/2011 | Albert |
| 7,982,941 B2 | 7/2011 | Lin |
| 8,040,594 B2 | 10/2011 | Paolini, Jr. |
| 8,054,288 B2 | 11/2011 | Sugita |
| 8,054,526 B2 | 11/2011 | Bouchard |
| 8,054,535 B2 | 11/2011 | Sikharulidze |
| 8,067,305 B2 | 11/2011 | Zafiropoulo |
| 8,068,090 B2 | 11/2011 | Machida |
| 8,072,675 B2 | 12/2011 | Lin |
| 8,081,375 B2 | 12/2011 | Komatsu |
| 8,098,418 B2 | 1/2012 | Paolini, Jr. |
| 8,115,729 B2 | 2/2012 | Danner |
| 8,159,636 B2 | 4/2012 | Sun |
| 8,174,491 B2 | 5/2012 | Machida |
| 8,213,076 B2 | 7/2012 | Albert |
| 8,243,013 B1 * | 8/2012 | Sprague ............ G09G 3/344 345/107 |
| 8,270,063 B2 | 9/2012 | Fontana |
| 8,363,299 B2 | 1/2013 | Paolini, Jr. |
| 8,373,727 B2 | 2/2013 | Furihata |
| 8,422,116 B2 | 4/2013 | Sprague |
| 8,441,713 B2 | 5/2013 | Kawashima |
| 8,441,714 B2 | 5/2013 | Paolini, Jr. |
| 8,441,716 B2 | 5/2013 | Paolini, Jr. |
| 8,466,852 B2 | 6/2013 | Drzaic |
| 8,477,405 B2 | 7/2013 | Ishii |
| 8,491,767 B2 | 7/2013 | Gibson |
| 8,503,063 B2 | 8/2013 | Sprague |
| 8,520,296 B2 | 8/2013 | Wang |
| 8,565,522 B2 | 10/2013 | Swic |
| 8,570,639 B2 | 10/2013 | Masuzawa |
| 8,574,937 B2 | 11/2013 | Shi |
| 8,576,470 B2 | 11/2013 | Paolini, Jr. |
| 8,576,475 B2 | 11/2013 | Huang |
| 8,576,476 B2 | 11/2013 | Telfer |
| 8,593,721 B2 | 11/2013 | Albert |
| 8,605,354 B2 | 12/2013 | Zhang |
| 8,629,832 B2 | 1/2014 | Tanabe |
| 8,649,084 B2 | 2/2014 | Wang |
| 8,670,174 B2 | 3/2014 | Sprague |
| 8,704,754 B2 | 4/2014 | Machida |
| 8,704,756 B2 | 4/2014 | Lin |
| 8,717,662 B2 | 5/2014 | Komatsu |
| 8,717,664 B2 | 5/2014 | Wang |
| 8,786,935 B2 | 7/2014 | Sprague |
| 8,797,634 B2 | 8/2014 | Paolini, Jr. |
| 8,810,899 B2 | 8/2014 | Sprague |
| 8,830,559 B2 | 9/2014 | Honeyman |
| 8,873,129 B2 | 10/2014 | Paolini, Jr. |
| 8,902,153 B2 | 12/2014 | Bouchard |
| 8,902,491 B2 | 12/2014 | Wang |
| 8,917,439 B2 | 12/2014 | Wang |
| 8,963,903 B2 | 2/2015 | Sakamoto |
| 8,964,282 B2 | 2/2015 | Wang |
| 8,988,764 B2 | 3/2015 | Abe |
| 9,013,516 B2 | 4/2015 | Sakamoto |
| 9,013,783 B2 | 4/2015 | Sprague |
| 9,052,564 B2 | 6/2015 | Sprague |
| 9,116,412 B2 | 8/2015 | Lin |
| 9,146,439 B2 | 9/2015 | Zhang |
| 9,164,207 B2 | 10/2015 | Honeyman et al. |
| 9,170,467 B2 | 10/2015 | Whitesides |
| 9,170,468 B2 | 10/2015 | Lin |
| 9,176,358 B2 | 11/2015 | Fujimori |
| 9,182,646 B2 | 11/2015 | Paolini, Jr. |
| 9,195,111 B2 | 11/2015 | Anseth |
| 9,199,441 B2 | 12/2015 | Danner |
| 9,251,736 B2 | 2/2016 | Lin |
| 9,268,191 B2 | 2/2016 | Paolini, Jr. |
| 9,285,649 B2 | 3/2016 | Du |
| 9,293,511 B2 | 3/2016 | Jacobson |
| 9,341,916 B2 | 5/2016 | Telfer et al. |
| 9,360,733 B2 | 6/2016 | Wang |
| 9,361,836 B1 | 6/2016 | Telfer et al. |
| 9,383,623 B2 | 7/2016 | Lin |
| 9,423,666 B2 | 8/2016 | Wang |
| 9,436,056 B2 | 9/2016 | Paolini, Jr. |
| 9,633,610 B2 | 4/2017 | Van Delden et al. |
| 2002/0005832 A1 * | 1/2002 | Katase ............... G02F 1/167 345/107 |
| 2003/0132908 A1 * | 7/2003 | Herb ............... G02F 1/167 345/107 |
| 2006/0209009 A1 | 9/2006 | Schlangen |
| 2007/0268565 A1 * | 11/2007 | Chopra ............ G02F 1/167 359/296 |
| 2008/0042928 A1 | 2/2008 | Schlangen |
| 2008/0043318 A1 | 2/2008 | Whitesides |
| 2008/0048970 A1 | 2/2008 | Drzaic |
| 2008/0062159 A1 * | 3/2008 | Roh ............... G02F 1/167 345/205 |
| 2008/0117165 A1 | 5/2008 | Machida |
| 2009/0225398 A1 | 9/2009 | Duthaler |
| 2010/0020384 A1 * | 1/2010 | MacHida ............ G02F 1/167 359/296 |
| 2010/0060628 A1 | 3/2010 | Lenssen et al. |
| 2010/0156780 A1 | 6/2010 | Jacobson |
| 2011/0043543 A1 | 2/2011 | Chen |
| 2012/0154899 A1 * | 6/2012 | Ahn ............... G09G 3/344 359/296 |
| 2012/0299947 A1 | 11/2012 | Tsuda |
| 2012/0326957 A1 | 12/2012 | Drzaic |
| 2013/0242378 A1 | 9/2013 | Paolini, Jr. |
| 2013/0278995 A1 | 10/2013 | Drzaic |
| 2014/0011913 A1 | 1/2014 | Du |
| 2014/0055840 A1 | 2/2014 | Zang |
| 2014/0078576 A1 | 3/2014 | Sprague |
| 2014/0085358 A1 * | 3/2014 | Inoue ............... G09G 3/344 345/691 |
| 2014/0268302 A1 * | 9/2014 | Fujimori ............ G02F 1/167 359/296 |
| 2014/0340430 A1 | 11/2014 | Telfer |
| 2014/0340736 A1 | 11/2014 | Lin |
| 2014/0354615 A1 * | 12/2014 | Sakamoto ............ G02F 1/167 345/208 |
| 2014/0362213 A1 | 12/2014 | Tseng |
| 2015/0097877 A1 | 4/2015 | Lin |
| 2015/0103394 A1 | 4/2015 | Wang |
| 2015/0118390 A1 | 4/2015 | Rosenfeld |
| 2015/0124345 A1 | 5/2015 | Rosenfeld |
| 2015/0198858 A1 | 7/2015 | Chan |
| 2015/0234250 A1 | 8/2015 | Lin |
| 2015/0268531 A1 | 9/2015 | Wang |
| 2015/0300246 A1 | 10/2015 | Zang |
| 2016/0011484 A1 | 1/2016 | Chan |

(56) References Cited

U.S. PATENT DOCUMENTS

| | | |
|---|---|---|
| 2016/0026062 A1 | 1/2016 | Zhang |
| 2016/0048054 A1 | 2/2016 | Danner |
| 2016/0116816 A1 | 4/2016 | Paolini |
| 2016/0116818 A1 | 4/2016 | Du |
| 2016/0140909 A1 | 5/2016 | Lin |

FOREIGN PATENT DOCUMENTS

| | | |
|---|---|---|
| JP | 2008033000 A | 2/2008 |
| JP | 2008209589 A | 9/2008 |
| JP | 2009116041 A | 5/2009 |
| JP | 2009192637 A | 8/2009 |
| JP | 2011158783 A | 8/2011 |
| KR | 20070082680 A | 8/2007 |
| KR | 20110103765 A | 9/2011 |
| TW | 201346413 A | 11/2013 |

OTHER PUBLICATIONS

Seigou Kawaguchi et al., "Synthesis of polyethylene macromonomers and their radical copolymerizations with methyl methacrylate in homogeneous and oligoethylene melts media" Designed Monomers and Polymers 2000, vol. 3, No. 3, p. 263-277.
Korean Intellectual Property Office; PCT/US2015/039563; International Search Report and Written Opinion; dated Oct. 26, 2015.

\* cited by examiner

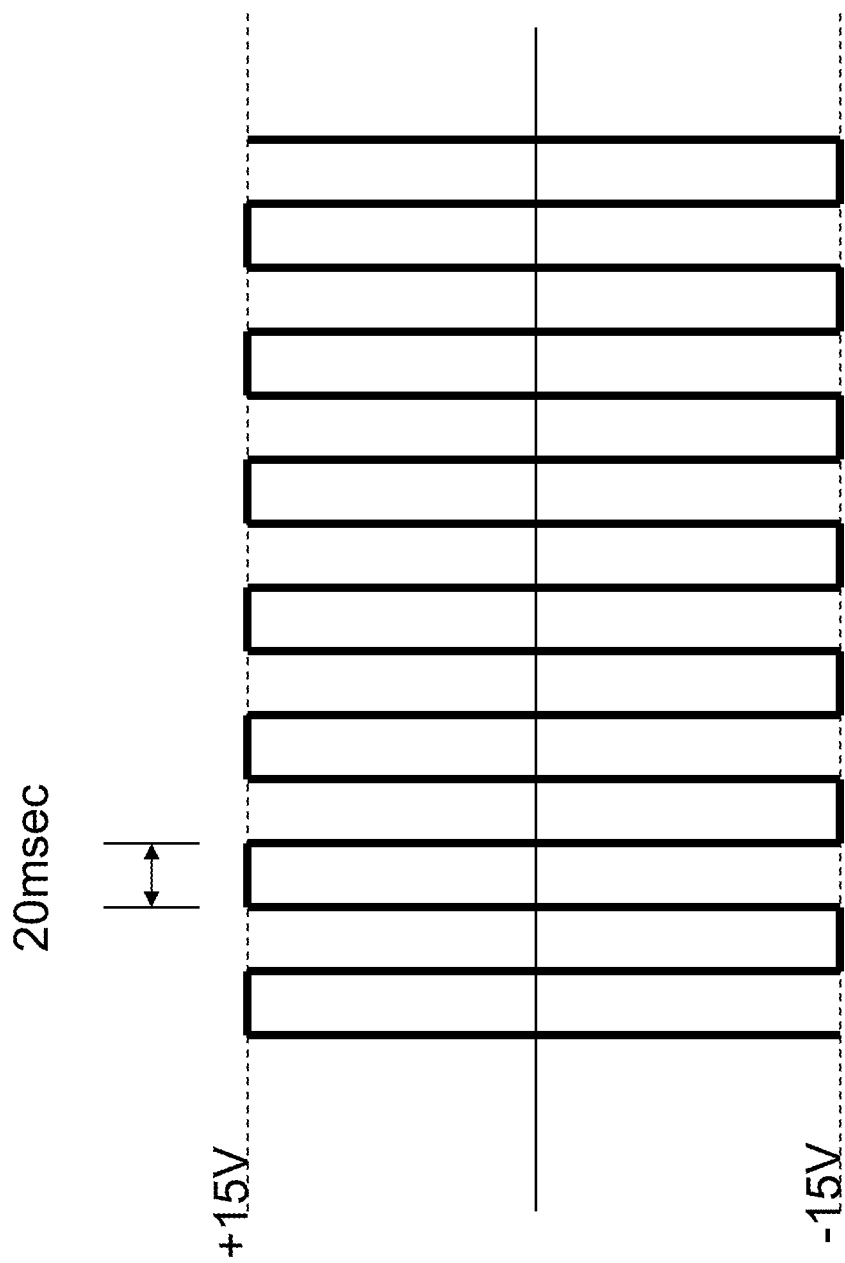

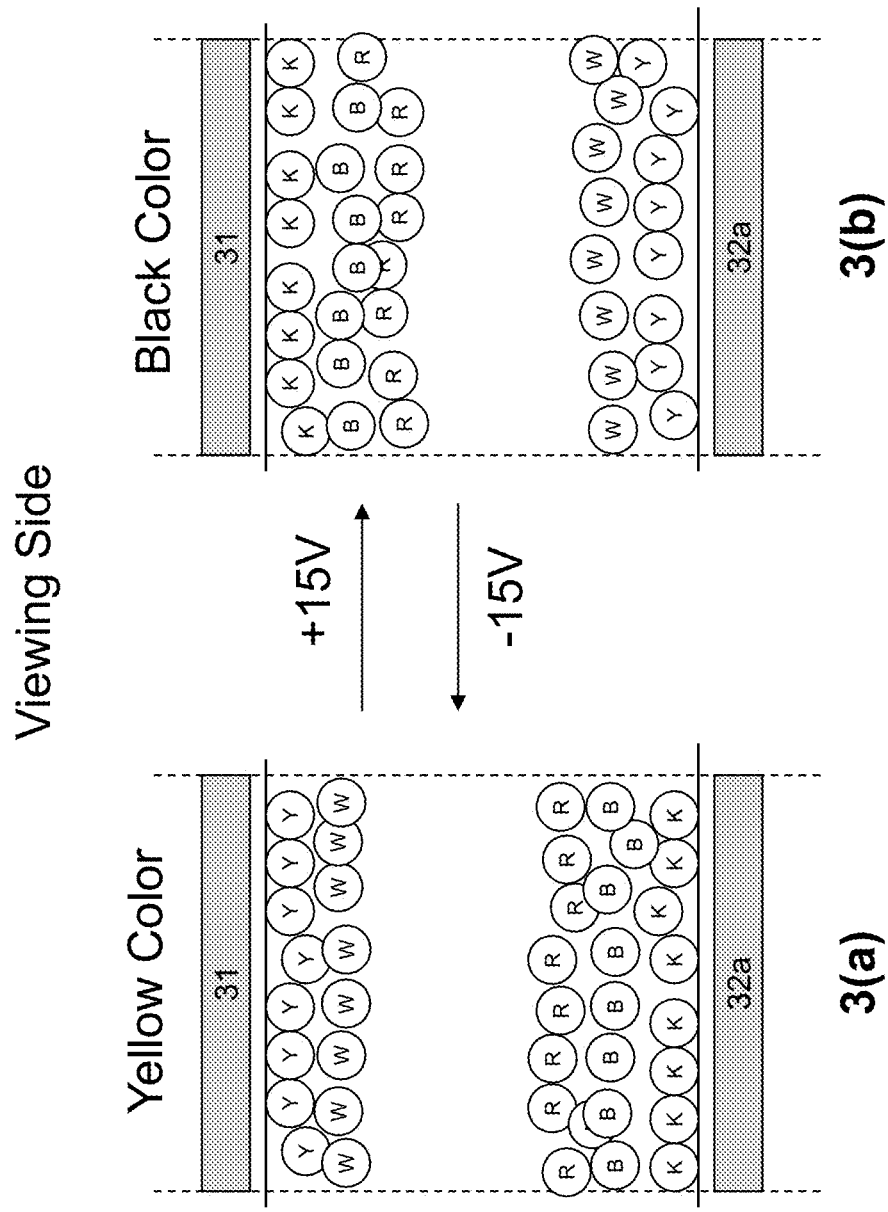

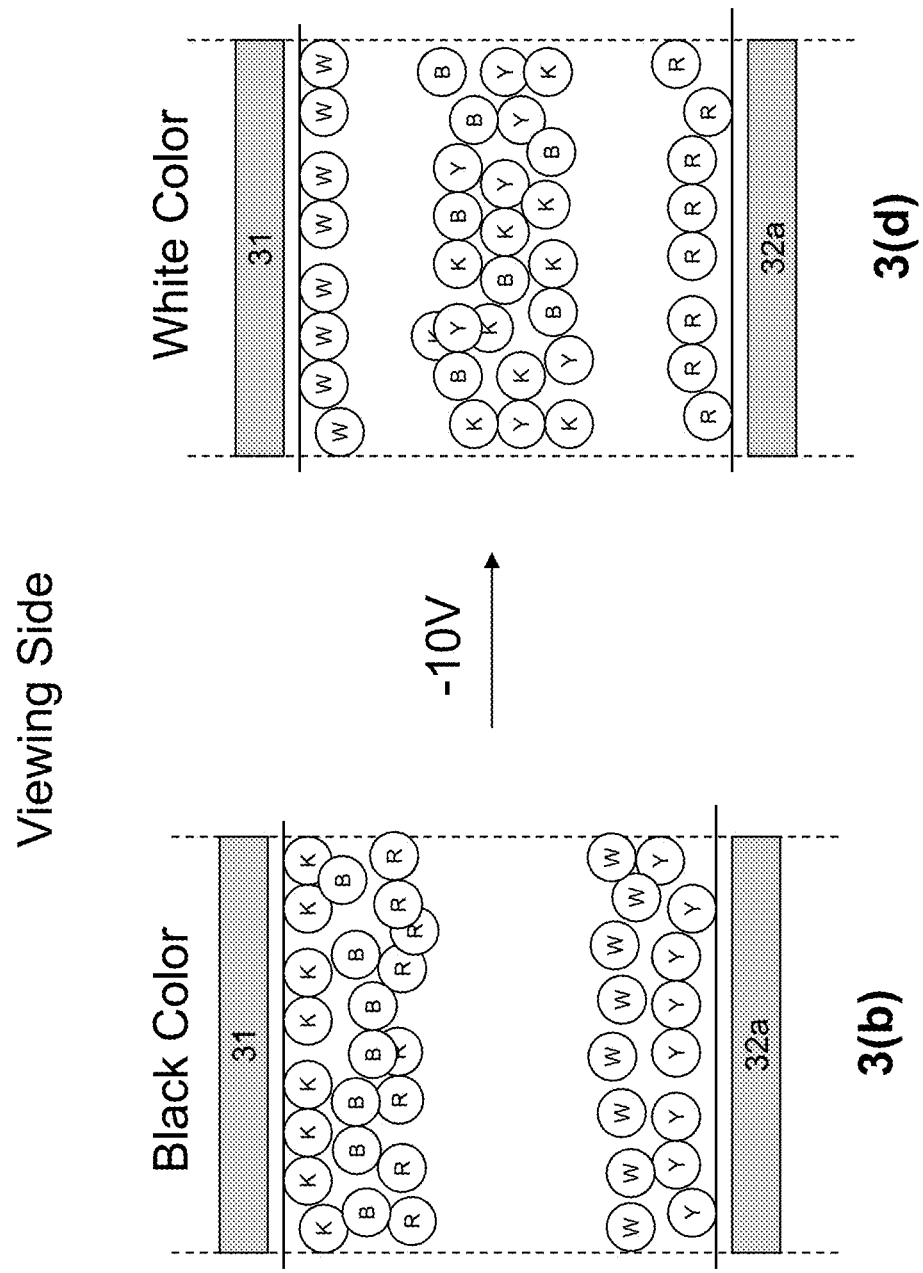

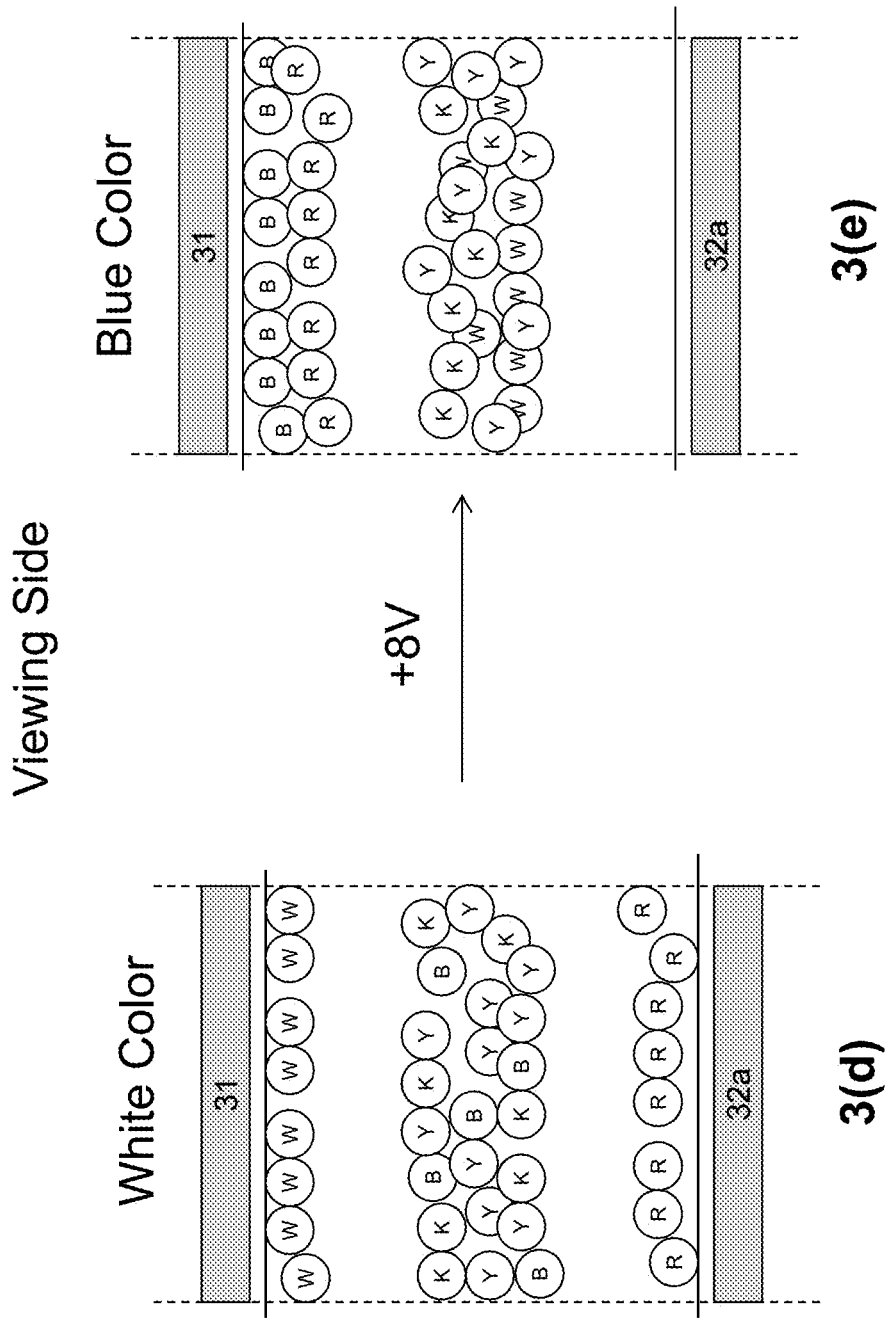

COLOR DISPLAY DEVICE AND DRIVING METHODS THEREFOR

REFERENCE TO RELATED APPLICATIONS

This application is a continuation-in-part of application Ser. No. 14/626,552, filed Feb. 19, 2015 (Publication No. 2015/0234250, now U.S. Pat. No. 9,541,814, issued Jan. 10, 2017) and of application Ser. No. 14/794,689, filed Jul. 8, 2015 (Publication No. 2016/0011484, now U.S. Pat. No. 9,671,668, issued Jun. 6, 2017). Application Ser. No. 14/626,552 claims benefit of provisional Application Ser. No. 62/061,077, filed Oct. 7, 2014, while application Ser. No. 14/794,689 claims benefit of provisional Application Ser. No. 62/022,557, filed Jul. 9, 2014. This application also claims benefit of provisional Application Ser. No. 62/169,300, filed Jun. 1, 2015 and of provisional Application Ser. No. 62/241,633, filed Oct. 14, 2015.

The entire contents of the aforementioned applications, and of all other U.S. patents and published and copending applications mentioned below, are herein incorporated by reference.

BACKGROUND OF INVENTION

This invention relates to color display devices in which each pixel can display at least five, and in some cases at least six, high quality color states, and to methods for driving such color display devices.

In order to achieve a color display, color filters are often used. The most common approach is to add color filters on top of black/white sub-pixels of a pixelated display to display red, green and blue colors. When a red color is desired, the green and blue sub-pixels are turned to the black state so that the only color displayed is red. When a blue color is desired, the green and red sub-pixels are turned to the black state so that the only color displayed is blue. When a green color is desired, the red and blue sub-pixels are turned to the black state so that the only color displayed is green. When the black state is desired, all three-sub-pixels are turned to the black state. When the white state is desired, the three sub-pixels are turned to red, green and blue, respectively, and as a result, a white state is seen by the viewer.

The biggest disadvantage of using such a technique for a reflective display is that since each of the sub-pixels has a reflectance of about one third of the desired white state, the white state is fairly dim. To compensate for this, a fourth sub-pixel may be added which can display only the black and white states, so that the white level is doubled at the expense of the red, green or blue color level (where each sub-pixel is only one fourth of the area of the pixel). Brighter colors can be achieved by adding light from the white pixel, but this is achieved at the expense of color gamut to cause the colors to be very light and unsaturated. A similar result can be achieved by reducing the color saturation of the three sub-pixels. Even with this approach, the white level is normally substantially less than half of that of a black and white display, rendering it an unacceptable choice for display devices, such as e-readers or displays that need well readable black-white brightness and contrast.

In view of these disadvantages of color filter based displays, efforts have been made to develop color displays in which three or more colors can be displayed at each pixel. See, in addition to the aforementioned US 2015/0234250 and US 2016/0011484, U.S. Pat. No. 8,717,664, US 2015/0103394, US 2015/0097877, U.S. Pat. No. 9,170,468, US 2015/0198858, US 2016/0140909 and US 2014/0340430. For convenience, such displays may hereinafter be referred to as "multi-color pixel" of "MCP" displays; when it is desired to specify how many colors are displayed at each pixel, reference may be made to "5-CP" and "6-CP" displays.

SUMMARY OF INVENTION

Accordingly, this invention provides a display layer having a first, viewing surface and a second surface on the opposed side of the display layer from the first surface, the display layer further comprising an electrophoretic medium comprising a fluid and first, second, third, fourth and fifth types of particles dispersed in the fluid, the first, second, third, fourth and fifth types of particles having respectively first, second, third, fourth and fifth optical characteristics differing from one another, the first, third and fourth types of particles having charges of one polarity and the second and fifth types of particles having charges of the opposite polarity, the first type of particles having a greater zeta potential or electrophoretic mobility than the third type of particles, the third type of particles having a greater zeta potential or electrophoretic mobility than the fourth type of particles, and the second type of particles having a greater zeta potential or electrophoretic mobility than the fifth type of particles.

The display layer of the present invention may also comprise a sixth type of particles having a sixth optical characteristic differing from the first, second, third, fourth and fifth optical characteristics, the sixth type of particles bearing a charge of the same polarity as the second and fifth particles but having a zeta potential or electrophoretic mobility intermediate those of the second and the fifth types of particles.

This invention also provides a method of driving a display layer having a first, viewing surface and a second surface on the opposed side of the display layer from the first surface, the display layer being provided with means for applying an electric field between the first and second surfaces, the display layer further comprising an electrophoretic medium comprising a fluid and first, second, third, fourth and fifth types of particles dispersed in the fluid, the first, second, third, fourth and fifth types of particles having respectively first, second, third, fourth and fifth optical characteristics differing from one another, the first, third and fourth type of particles having charges of one polarity and the second and fifth types of particles having charges of the opposite polarity, the method comprising, in any order:

(i) applying a first electric field having a high magnitude and a polarity driving the first type of particles towards the viewing surface, thereby causing the display layer to display the first optical characteristic at the viewing surface;

(ii) applying a second electric field having a high magnitude and a polarity driving the second type of particles towards the viewing surface, thereby causing the display layer to display the second optical characteristic at the viewing surface;

(iii) when the second optical characteristic is displayed at the viewing surface, applying a third electric field having a low magnitude and a polarity driving the fourth type of particles towards the viewing surface, thereby causing the display layer to display the fourth optical characteristic at the viewing surface;

(iv) when the first optical characteristic is displayed at the viewing surface, applying a fourth electric field having a low magnitude and a polarity driving the fifth type of particles towards the viewing surface, thereby causing the display layer to display the fifth optical characteristic at the viewing surface; and (v) when the fifth optical characteristic is displayed at the viewing surface applying a fifth electric field having a magnitude intermediate the first and third electric fields and a polarity driving the third type of particles towards the viewing surface, thereby causing the display layer to display the third optical characteristic at the viewing surface.

In this method, the electrophoretic layer may further comprise a sixth type of particles having a sixth optical characteristic differing from the first, second, third, fourth and fifth optical characteristics, the sixth type of particles bearing a charge of the same polarity as the second and fifth particles, and the method may further comprise:

(vi) when the fourth optical characteristic is displayed at the viewing surface applying a sixth electric field having a magnitude intermediate the second and fourth electric fields and a polarity driving the sixth type of particles towards the viewing surface, thereby causing the display layer to display the sixth optical characteristic at the viewing surface.

In either the five or six particle method of the present invention, step (iii) may be effected by first applying a high electric field having a polarity which drives the fourth particles towards the second surface and thereafter applying the third electric field. A shaking waveform may be applied prior to application of the high electric field, and the high electric field may be applied for a second period prior to the shaking waveform. The application of the high electric field and the application of the third electric field may repeated at least twice, at least four times or at least eight times. Following the application of the third electric field, no electric field may be applied for a period. Alternatively or in addition, no electric field may be applied for a period between the application of the high electric field and the application of the third electric field.

In either the five or six particle method of the present invention, step (iv) may be effected by first applying a high electric field having a polarity which drives the fifth particles towards the second surface and thereafter applying the fourth electric field. A shaking waveform may be applied prior to application of the high electric field, and the high electric field may be applied for a second period prior to the shaking waveform. The application of the high electric field and the application of the fourth electric field may be repeated at least twice, at least four times or at least eight times. Following the application of the fourth electric field, no electric field may be applied for a period. Alternatively or in addition, no electric field may be applied for a period between the application of the high electric field and the application of the fourth electric field.

In either the five or six particle method of the present invention, step (v) may be effected by first applying a low electric field having a magnitude less than that of the fifth electric field and a polarity which drives the third particles towards the second surface, and thereafter applying the fifth electric field. A high electric field having a magnitude greater than that of, but the same polarity as, the fifth electric field may be applied prior to application of the low electric field. A shaking waveform may be applied prior to the high electric field. The high electric field may be applied for a second period prior to the shaking waveform. Alternatively, in either the five or six particle method of the present invention, step (v) may be effected by first applying a low electric field having a magnitude less than that of the fifth electric field and a polarity which drives the third particles towards the second surface and thereafter applying multiple periods of the fifth electric field alternating with periods of zero electric field. A high electric field having a magnitude greater than that of, but the same polarity as, the fifth electric field may be applied prior to application of the low electric field. A shaking waveform may be applied prior to the high electric field. The high electric field may be applied for a second period prior to the shaking waveform.

In a six particle method of the present invention, step (vi) may effected by first applying a low electric field having a magnitude less than that of the sixth electric field and a polarity which drives the sixth particles towards the second surface and thereafter applying the sixth electric field. A high electric field having a magnitude greater than that of, but the same polarity as, the sixth electric field may be applied prior to application of the low electric field. A shaking waveform may applied prior to the high electric field. The high electric field may be applied for a second period prior to the shaking waveform. Alternatively, in a six particle method of the present invention, step (vi) may effected by first applying a low electric field having a magnitude less than that of the sixth electric field and a polarity which drives the sixth particles towards the second surface and thereafter applying multiple periods of the sixth electric field alternating with periods of zero electric field. A high electric field having a magnitude greater than that of, but the same polarity as, the sixth electric field may be applied prior to application of the low electric field. A shaking waveform may be applied prior to the high electric field. The high electric field may be applied for a second period prior to the shaking waveform.

BRIEF DESCRIPTION OF DRAWINGS

FIG. 2 shows a shaking waveform which may be used in the driving methods of the present invention.

FIGS. 3-1 to 3-5 are schematic cross-sections similar to those of FIG. 1 but illustrating changes in particle positions effected during various steps of driving methods of the present invention.

FIG. 4 illustrates a waveform which can used to cause the display layer shown in FIG. 1 to effect the transition shown in FIG. 3-2 to display the red color of low charged positive particles.

FIGS. 5-7, 8-10 and 11-13 illustrate alternative waveforms which may be used in place of part of the waveform shown in FIG. 4.

FIGS. 29-1 to 29-7 are schematic cross-sections similar to those of FIGS. 3-1 to 3-5 but illustrating changes in particle positions in the display layer of FIG. 28 effected during various steps of driving methods of the present invention.

DETAILED DESCRIPTION

Figure 1:
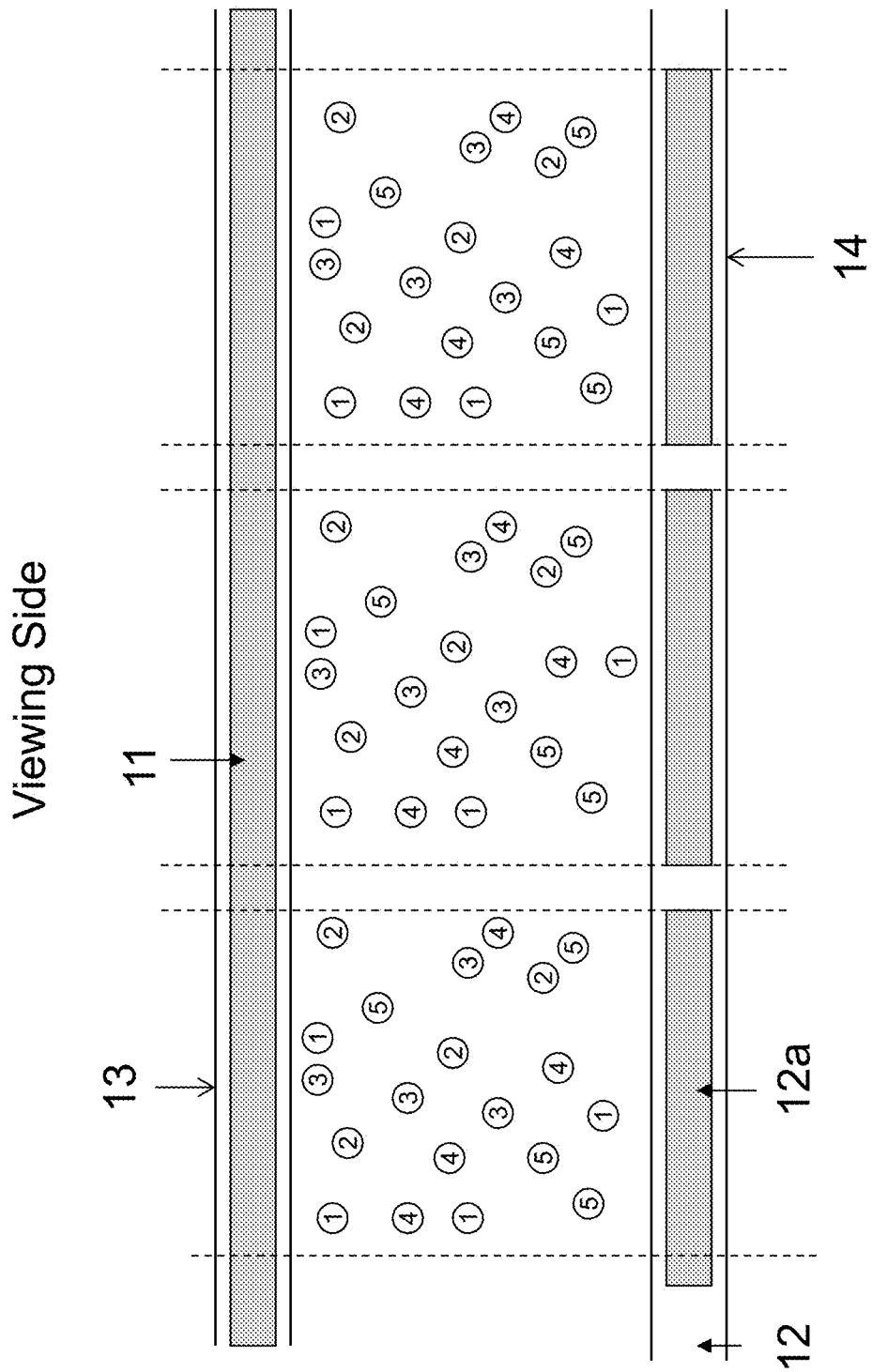
FIG. 1 is a schematic cross-section through a display layer containing five different types of particles which can display five different color states.

The driving methods of the present invention are suitable for driving an electrophoretic display utilizing a display fluid which comprises five, or in some cases six, types of particles dispersed in a fluid, which is typically a dielectric solvent or solvent mixture. The particles may be referred to as a first type of particles, a second type of particles, a third type of particles, a fourth type of particles and a fifth type of particles, and a sixth type of particles (when present). The various types of particles have different optical characteristics. These optical characteristics are typically colors perceptible to the human eye, but may be other optical properties, such as optical transmission, reflectance, luminescence or, in the case of displays intended for machine reading, pseudo-color in the sense of a change in reflectance of electromagnetic wavelengths outside the visible range. The invention broadly encompasses particles of any colors as long as the multiple types of particles are visually distinguishable. As an example, the particles may be any combinations of white particles (W), black particles (K), red particles (R), green particles (G), blue particles (B), cyan particles (C), magenta particles (M) and yellow particles (Y).

In addition, the various types of particles have different levels of charge potential. For example, five types of particles may be high positive particles, middle positive particles, low positive particles, high negative particles and low negative particles, or alternatively, high negative particles, middle negative particles, low negative particles, high positive particles and low positive particles. When six types of particles are present, they may be high positive particles, middle positive particles, low positive particles, high negative particles, middle negative particles and low negative particles. The term "charge potential", in the context of the present application, may be used interchangeably with "zeta potential" or with electrophoretic mobility. The charge polarities and levels of charge potential of the particles may be varied by the method described in U.S. Patent Application Publication No. 2014/0011913.

The magnitudes of the charges on, zeta potentials or electrophoretic mobilities on the "high positive" particles and the "high negative" particles may be the same or different. Likewise, the magnitudes of these parameters on the "middle positive" and the "middle negative" particles may be the same or different, and the magnitudes of these parameters on the "low positive" particles and the "low negative" particles may be the same or different.

As already mentioned, the charge potentials of the particles may be measured in terms of zeta potential. In one embodiment, the zeta potential is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse 17000, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential. Methods and apparatus for the measurement of electrophoretic mobility are well known to those skilled in the technology of electrophoretic displays.

The dielectric fluid in which the particles are typically dispersed may be clear and colorless. It preferably has a dielectric constant in the range of about 2 to about 30, more preferably about 2 to about 15 for high particle mobility. Examples of suitable dielectric fluids include hydrocarbons such as isoparaffin, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluorobenzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-Corning (DC-200).

The particles are preferably opaque, in the sense that they should be light reflecting not light transmissive. It be apparent to those skilled in color science that if the particles were light transmissive, some of the color states appearing in the following description of specific embodiments of the invention would be severely distorted or not obtained. White particles are of course light scattering rather than reflective but care should be taken to ensure that not too much light passes through a layer of white particles. For example, if in the white state shown in FIG. 3-3 discussed below, the layer of white particles allowed a substantial amount of light to pass through it and be reflected from the particles behind it, the brightness of the white state could be substantially reduced. The particles used may be primary particles without a polymer shell. Alternatively, each particle may comprise an insoluble core with a polymer shell. The core could be either an organic or inorganic pigment, and it may be a single core particle or an aggregate of multiple core particles. The particles may also be hollow particles.

In the case of white particles (W), the primary particles or core particles may be $TiO_2$, $ZrO_2$, ZnO, $Al_2O_3$, $Sb_2O_3$, $BaSO_4$, $PbSO_4$ or the like. For the black particles (K), the primary particles or core particles may be Cl pigment black 26 or 28 or the like (e.g., manganese ferrite black spinel or copper chromite black spinel) or carbon black. For the other colored particles (which are non-white and non-black), the primary particles or core particles may include, but are not limited to, CI pigment PR 254, PR122, PR149, PG36, PG58, PG7, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, F2G-EDS, Novoperm Yellow HR-70-EDS, Hostaperm Green GNX, BASF Irgazine red L 3630, Cinquasia Red L 4100 HD, and Irgazine Red L 3660 HD; Sun Chemical phthalocyanine blue, phthalocyanine green, diarylide yellow or diarylide AAOT yellow. Also, for the other colored particles (non-white and non-black), the primary particles or core particles may also be inorganic pigments, such as red, green, blue and yellow pigments. Examples may include, but are not limited to, CI pigment blue 28 (PB28), CI pigment green 50 and CI pigment yellow 227.

The percentages of different types of particles in the fluid may vary. For example, one type of particles may take up 0.1% to 10%, preferably 0.5% to 5%, by volume of the electrophoretic fluid; another type of particles may take up 1% to 50%, preferably 5% to 20%, by volume of the fluid; and each of the remaining types of particles may take up 2% to 20%, preferably 4% to 10%, by volume of the fluid.

The various types of particles may have different particle sizes. For example, the smaller particles may have a size which ranges from about 50 nm to about 800 nm. The larger particles may have a size which is about 2 to about 50 times, and more preferably about 2 to about 10 times, the sizes of the smaller particles.

Preferred embodiments of the invention will now be described in detail, though by way of illustration only, with reference to the accompanying drawings. Five particle systems of the invention will be described first, and then the modifications needed to incorporate a sixth type of particles will be described.

As already mentioned, FIG. 1 is a schematic cross-section through a display layer containing five different types of particles which can display five different color states (i.e., a 5-CP display layer). The display layer has a first, viewing surface 13 (the upper surface as illustrated in FIG. 1) and a second surface 14 on the opposed side of the display layer from the first surface 13. The term "viewing surface" of course refers to the side of the display on which a user normally views images. The display layer comprises an electrophoretic medium comprising a fluid and first, second, third fourth and fifth types of particles (indicated respectively by numbers 1-5 enclosed in a circle) dispersed in the fluid. The first, second, third, fourth and fifth types of particles having respectively first, second, third, fourth and fifth optical characteristics differing from one another, the first, third and fourth type of particles having charges of one polarity and the second and fifth types of particles having charges of the opposite polarity. More specifically, in the system shown in FIG. 1, the first type of particles are black particles (K) carrying a high positive charge and the second type of particles are yellow particles (Y) carrying a high negative charge. The third type of particles are blue (B) particles carrying a middle positive charge and the fourth type of particles are red (R) particles are positively charged; but their magnitudes are progressively less than that of the black particles, which means that the black particles are high-positive particles, the blue particles are mid-positive particles and the red particles are low-positive particles. The fifth type of particles are white (W) particles carrying a low negative charge.

The display layer shown in FIG. 1 is provided with means for applying electric fields across the display layer, these field applying means having the form of two electrode layers, the first of which is a light-transmissive or transparent common electrode layer 11 extending across the entire viewing surface of the display. The electrode layer 11 may be formed from indium tin oxide (ITO) or a similar light-transmissive conductor. The other electrode layer 12 is a layer of discrete pixel electrodes 12a, which define individual pixel of the display, these pixels being indicated by dotted vertical lines in FIG. 1. The pixel electrodes 12a may form part of an active matrix driving system with, for example, a thin film transistor (TFT) backplane, but other types of electrode addressing may be used provided the electrodes provide the necessary electric field across the display layer.

Figures 2, 3:
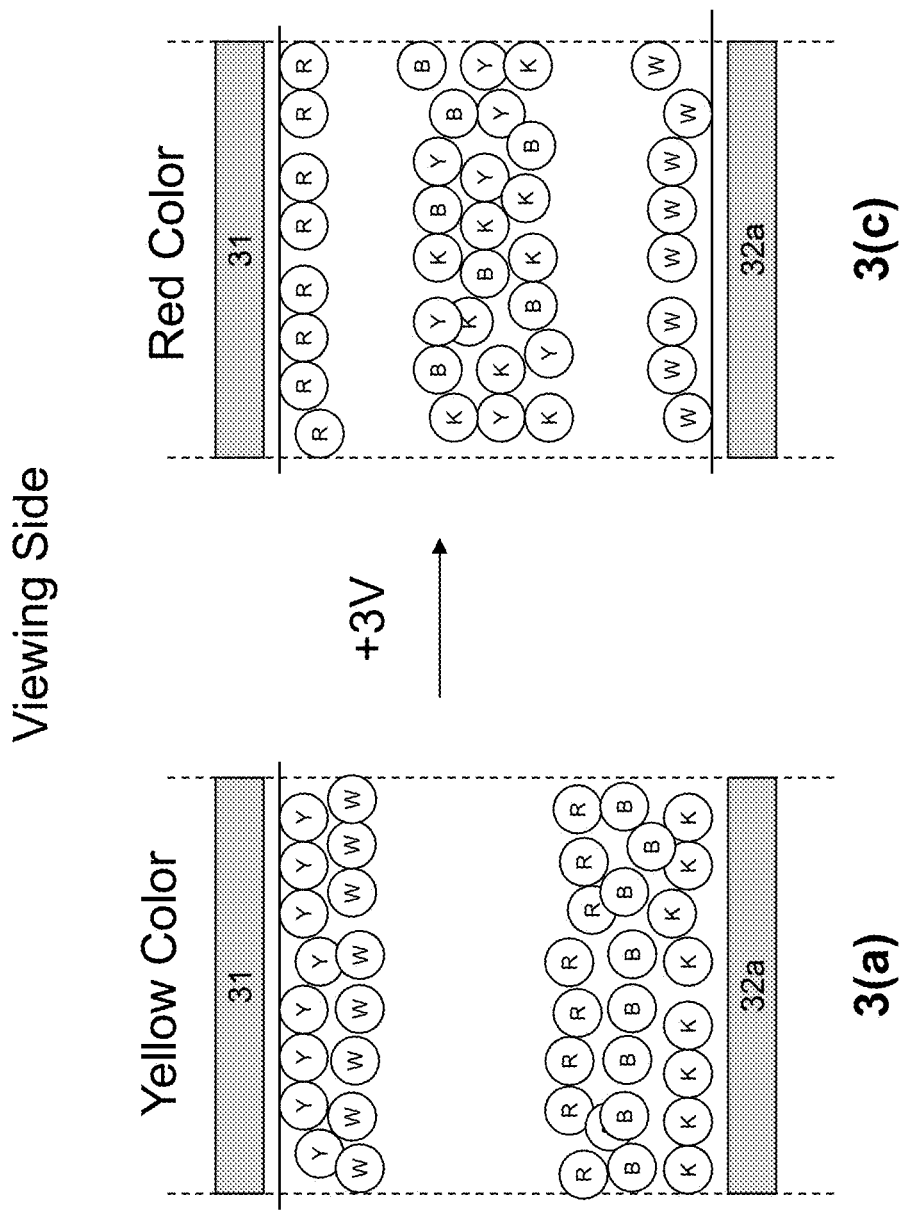

FIG. 2 is a voltage versus time graph of a shaking waveform may which be used in the driving methods of the present invention. The shaking waveform may consist of repeating a pair of opposite driving pulses for many cycles. For example, the shaking waveform may consist of a +15V pulse for 20 msec and a −15V pulse for 20 msec, with this pair of pulses being repeated 50 times. The total duration of such a shaking waveform would be 2000 msec. For ease of illustration, FIG. 2 illustrates only seven pairs of pulses. In practice, there may be at least 10 repetitions (i.e., ten pairs of positive and negative pulses). The shaking waveform may be applied regardless of the optical state prior to a driving voltage is applied. After the shaking waveform is applied, the optical state (at either the viewing surface or the second surface, if visible) will not be a pure color, but will be a mixture of the colors of the five types of pigment particles.

Each of the driving pulses in the shaking waveform is applied for not exceeding 50% (or not exceeding 30%, 10% or 5%) of the driving time required for driving from the color state of the high positive particles to the color state of the high negative particles, or vice versa. For example, if it takes 300 msec to drive a display device from the color state of the high positive particles to the color state of the high negative particles, or vice versa, the shaking waveform may consist of positive and negative pulses, each applied for not more than 150 msec. In practice, it is preferred that the pulses be shorter.

As already mentioned, the display layer shown in FIG. 1 comprises first, black, high positive particles, second, yellow, high negative yellow particles, third, blue, middle positive particles, fourth red, low positive particles, and fifth, white, low negative particles. The manner in which the colors of the various particles can be displayed at the viewing surface will now be described with reference to FIGS. 3-1 to 3-5.

When a high negative driving voltage ($V_{H2}$, e.g., −15V) is applied to the pixel electrode (3b) (hereinafter, it will be assumed that the common electrode will be maintained at 0V, so in this case the common electrode is strongly positive relative to the pixel electrode) for a time period of sufficient length, an electric field is generated to cause the high negative yellow particles to be driven adjacent the common electrode 31 and the high positive black particles driven adjacent the pixel electrode 32a.

The low positive red and middle positive blue particles move slower than the high positive black particles and as a result, the blue particles are above the black particles but below the red particles because the blue particles carry higher charges than the red particles. The black particles are closest to the pixel electrode, as shown in 3(a). The low negative white particles move slower than the high negative yellow particles, and therefore the white particles are below and masked by the yellow particles and therefore not visible at the viewing surface. Thus, a yellow color is displayed at the viewing surface.

Conversely, when a high positive driving voltage ($V_{H1}$, e.g., +15V) is applied to the pixel electrode (3a) (so that the common electrode is strongly negative relative to the pixel electrode) for a time period of sufficient length, an electric field is generated to cause the high positive black particles to be driven adjacent the common electrode 31 and the high negative yellow particles adjacent the pixel electrode 32*a*. The resulting particle distribution (3(*b*)) is the exact inverse of that shown in 3(*a*) and a black color is displayed at the viewing surface.

The high driving voltages thus applied may be in the form of single pulses or pulsing waveforms having alternating periods of zero voltage and the driving voltage. The magnitude of the driving voltage used in a pulsing waveform may be or may not be the same as that of the driving voltage used in a single pulse method. There may be, for example, 10-200 cycles of pulsing. A pulsing waveform may lead to better color performance because it can prevent aggregation of the particles with each other, which usually causes reduction of hiding power of the layers of particles.

The driving methods used in FIG. 3-1 therefore may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:
 (a) the five types of pigment particles have optical characteristics differing from one another;
 (b) the first and second types of particles carry opposite charge polarities;
 (c) the third and fourth types of particles carry the same charge polarity as the first type of particles, and the first type, the third type and the fourth type of particles have progressively lower magnitudes; and
 (d) the fifth type of particles carries the same charge polarity as the second type of particles but its magnitude is lower than that of the second type of particles, the method comprising
  (i) applying a first driving voltage to a pixel of the electrophoretic display for a first period of time, wherein the first driving voltage has the same polarity as the first type of particles and the first period of time is sufficient to drive the pixel to the color state of the first type of particles to appear at the viewing side, or
  (ii) applying a second driving voltage to a pixel of the electrophoretic display for a second period of time, wherein the second driving voltage has the same polarity as the second type of particles and the second period of time is sufficient to drive the pixel to the color state of the second type of particles to appear at the viewing side.

FIG. 3-2 illustrates the manner in which the low positive (red) particles are displayed at the viewing surface of the display shown in FIG. 1. The process starts from the (yellow) state 3(*a*) shown in FIG. 3-1 and repeated on the left side of FIG. 3-2. A low positive voltage ($V_{L1}$, e.g., +3V) is applied to the pixel electrode (i.e., the common electrode is made slightly negative with respect to the pixel electrode) for a time period of sufficient length to cause the high negative yellow particles to move towards the pixel electrode (32*a*) while the high positive black and middle positive blue particles move towards the common electrode (31). However, when the yellow, black and blue particles meet intermediate the pixel and common electrodes as shown in 3(*c*), they remain at the intermediate position because the electric field generated by the low driving voltage is not strong enough to overcome the attractive forces between them. As shown, the yellow, black and blue particles stay intermediate the pixel and common electrodes in a mixed state.

The term "attractive force" as used herein, encompasses electrostatic interactions, linearly dependent on the particle charge potentials, and the attractive force can be further enhanced by other forces, such as Van der Waals forces, hydrophobic interactions and the like.

Obviously, attractive forces also exist between the low positive red particles and the high negative yellow particles, and between the low negative white particles and both the high positive black and middle positive blue particles. However, these attractive forces are not as strong as the attractive forces between the black and yellow particles and between the blue and yellow particles, and thus the weak attractive forces on the red and white particles can be overcome by the electric field generated by the low driving voltage, so that the low charged particles and the high charged particles of opposite polarity can be separated. The electric field generated by the low driving voltage is sufficient to separate the low negative white and low positive red particles, thereby causing the red particles to move adjacent the common electrode (31) viewing surface and the white particles to move adjacent the pixel electrode (32*a*). As a result, the pixel displays a red color, while the white particles lie closest to the pixel electrode, as shown in 3(*c*).

The driving method of FIG. 3-2 can therefore be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:
 (a) the five types of pigment particles have optical characteristics differing from one another;
 (b) the first and second types of particles carry opposite charge polarities;
 (c) the third and fourth types of particles carry the same charge polarity as the first type of particles, and the first type, the third type and the fourth type of particles have progressively lower magnitudes; and
 (d) the fifth type of particles carries the same charge polarity as the second type of particles but its magnitude is lower than that of the second type of particles, the method comprising:
  (i) driving a pixel of the electrophoretic display to the color of the second type of particles; and
  (ii) applying a low driving voltage for a period of time, wherein the low driving voltage has the same polarity as the fourth type of particles and the period of time is sufficient to drive the pixel from the color state of the second type of particles to the color state of the fourth type of particles to appear at the viewing side.

FIG. 3-3 illustrates the manner in which the low negative (white) particles are displayed at the viewing surface of the display shown in FIG. 1. The process starts from the (black) state 3(*b*) shown in FIG. 3-1 and repeated on the left side of FIG. 3-3. A low negative voltage ($V_{L2}$, e.g., −10V) is applied to the pixel electrode (i.e., the common electrode is made slightly positive with respect to the pixel electrode) for a time period of sufficient length to cause the high positive black and middle positive blue particles to move towards the pixel electrode (32*a*) while the high negative yellow particles move towards the common electrode (31). However, when the yellow, black and blue particles meet intermediate the pixel and common electrodes as shown at 3(d), they remain at the intermediate position because the electric field generated by the low driving voltage is not strong enough to overcome the attractive forces between them. Thus, as previously discussed with reference to FIG. 3-2, the yellow, black and blue particles stay intermediate the pixel and common electrodes in a mixed state.

As discussed above with reference to Figure, attractive forces also exist between the low positive red particles and the high negative yellow particles, and between the low negative white particles and both the high positive black and middle positive blue particles. However, these attractive forces are not as strong as the attractive forces between the black and yellow particles and between the blue and yellow particles, and thus the weak attractive forces on the red and white particles can be overcome by the electric field generated by the low driving voltage, so that the low charged particles and the high charged particles of opposite polarity can be separated. The electric field generated by the low driving voltage is sufficient to separate the low negative white and low positive red particles, thereby causing the white particles to move adjacent the common electrode (31) viewing surface and the red particles to move adjacent the pixel electrode (32a). As a result, the pixel displays a white color, while the red particles lie closest to the pixel electrode, as shown in 3(d).

Figures 3, 4:
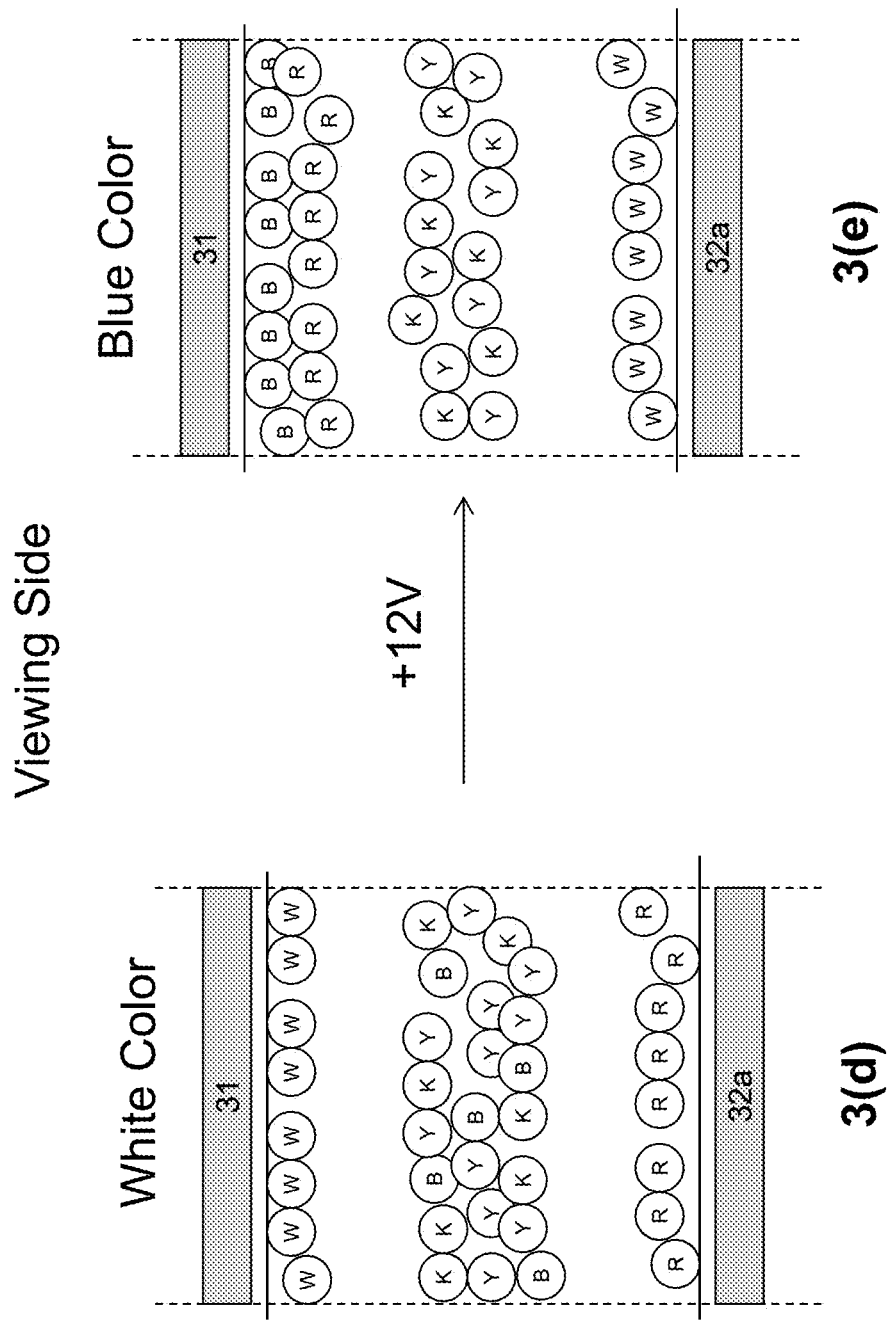
Figure 4:
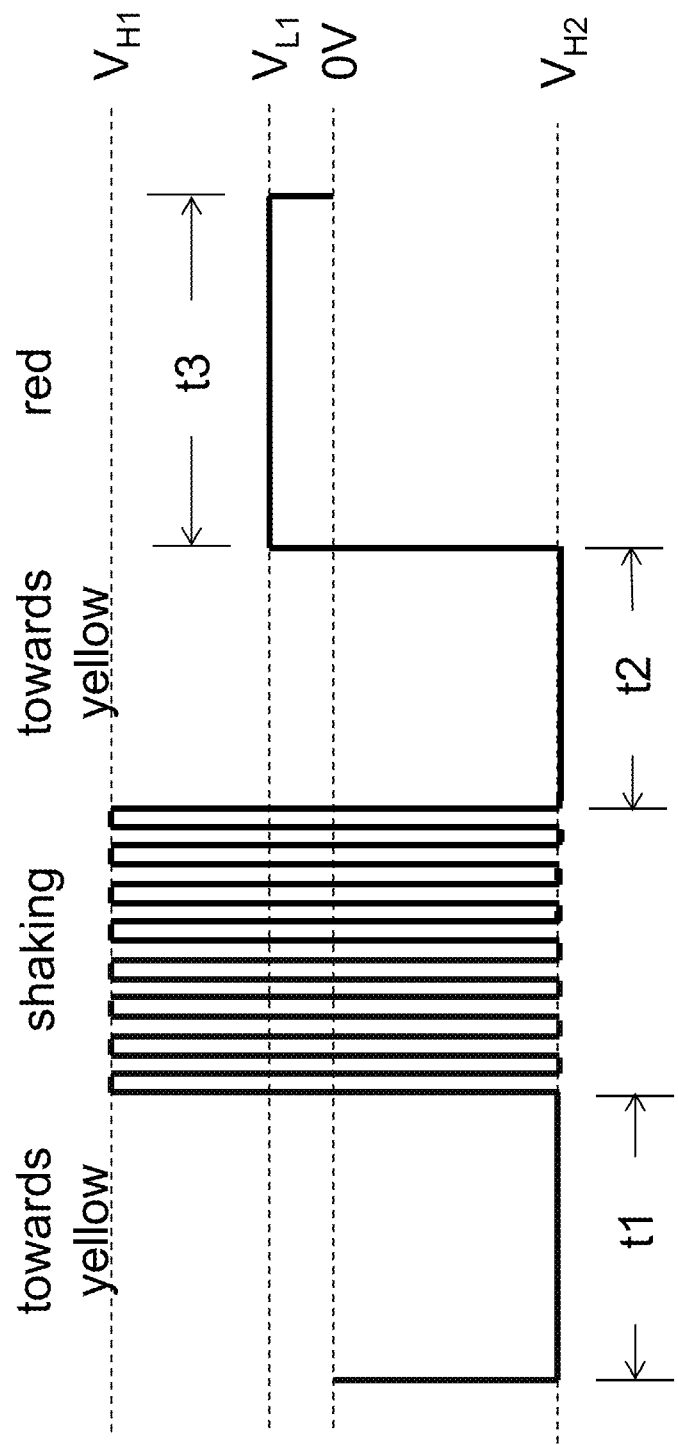
Figure 5:
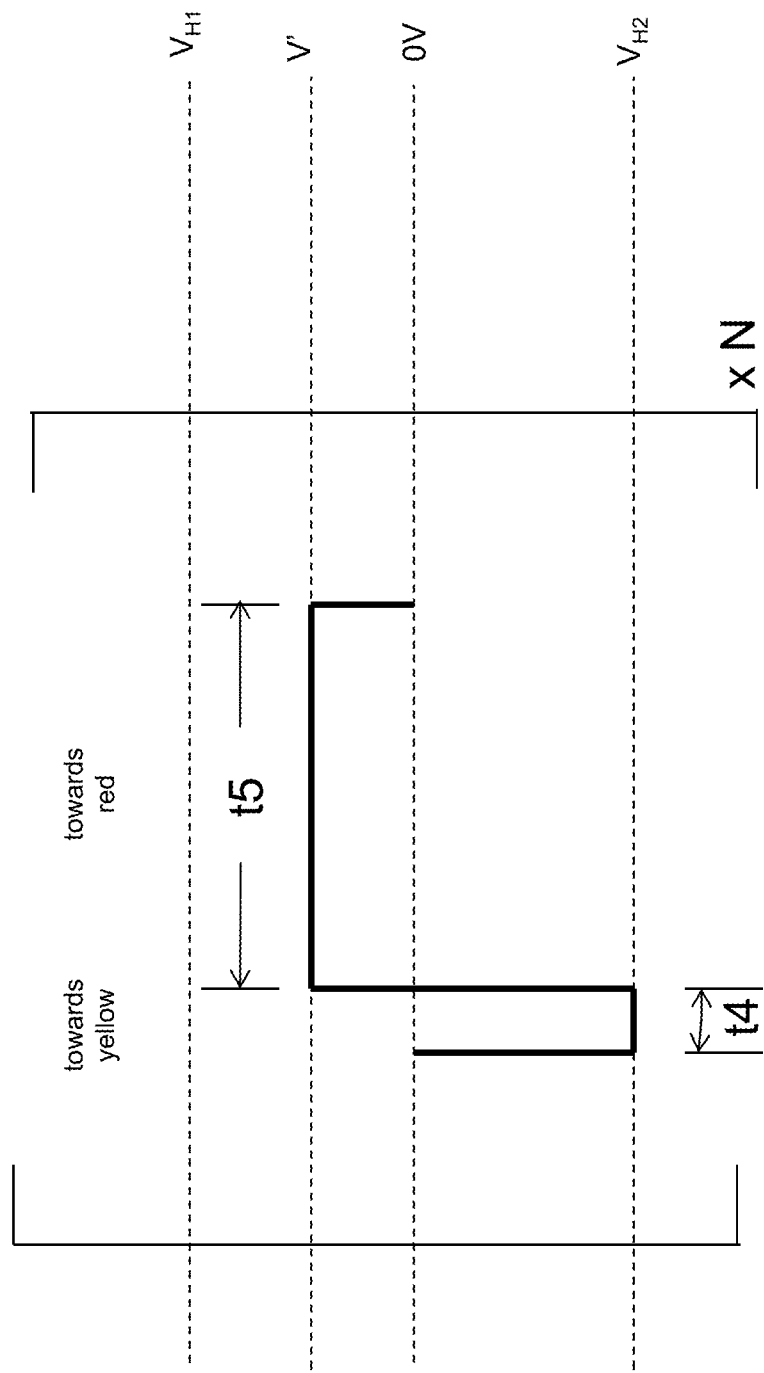

FIGS. 3-4 and 3-5 illustrate the manner in which the middle positive (blue) particles are displayed at the viewing surface of the display shown in FIG. 1. The process starts from the (white) state 3(d) shown in FIG. 3-3 and repeated on the left sides of FIGS. 3-4 and 3-5. In FIG. 3-4, a medium positive voltage ($V_{M1}$, e.g., +12V) is applied to the pixel electrode (i.e., the common electrode is made moderately negative with respect to the pixel electrode). The medium positive driving voltage causes the white particles to move away from the common electrode and the red particles to move away from the pixel electrode, thereby tending to cause all five types of particles to meet and form a "pack" intermediate the common and pixel electrodes. The medium voltage applied is not sufficient to separate the high positive black from the high negative yellow particles in the pack, but (unlike the situation with the low driving voltage used in FIG. 3-2) is sufficient to cause the middle positive blue particles to break away from the pack and move towards the common electrode. The low positive red particles also separate from the high negative yellow particles and move towards the common electrode. However, the middle positive blue particles move faster than the low positive red particles and arrive adjacent the common electrode first, so that the pixel displays a blue color at the viewing surface. Similarly, the low negative white particles separate from the high positive black particles and move adjacent the pixel electrode, to produce the state illustrated at 3(e).

FIG. 3-5 shows an alternative method of effected the same white-to-blue transition as in FIG. 3-4. The difference between FIGS. 3-4 and 3-5 is that in the latter the medium positive driving voltage is reduced from +12 to +8V, with the result that, although the blue and red particles separate from the pack in the same way as in FIG. 3-4, the electric field generated by the driving voltage of +8V is not sufficient to separate the low negative white particles from the high positive black particles, so that the black, yellow and white particles remain in a pack intermediate the common and pixel electrodes. A blue color is still displayed at the viewing surface but the pixel electrode surface (if visible) will display the color of a mixture of black, yellow and white particles, rather than the white state displayed at this surface in FIG. 3-4. For most practical purposes, this difference is of no consequence.

It will readily be apparent to those skilled in imaging science that if "clean", well saturated colors are to be obtained in the various color states illustrated in FIGS. 3-1 to 3-5, all non-black and non-white particles used in the electrophoretic medium should be light-reflecting rather than light-transmissive. (White particles are inherently light-scattering, while black particles are inherently light-absorbing.) For example, in the blue color state 3(e) shown in FIG. 3-4, if the blue particles were substantially light-transmissive, a substantial proportion of the light entering the electrophoretic layer through the viewing surface would pass through the blue particles and a proportion of this transmitted would be reflected back from the red particles immediately "behind" (i.e., immediately below as illustrated in FIG. 3-4) the blue particles. Assuming the red particles were also significantly light-transmissive, a further proportion of the light transmitted through blue particles would be reflected from the pack of white and yellow particles. The overall effect would be serious "contamination" of the desired blue color with at least red, and possibly also yellow tinges, a highly undesirable. Similar considerations apply, with even more force, to six particle systems of the invention described below with reference to FIGS. 29-1 to 29-7.

FIG. 4 illustrates a waveform which may be used to effect the yellow-to-red (high negative to low positive) transition of FIG. 3-2. In the waveform of FIG. 4, a high negative driving voltage ($V_{H2}$, for example −15V) is first applied for a period of t1. This initial application of a high negative driving voltage may be omitted but is preferably included to ensure that the entire waveform of FIG. 4 is DC balanced. (The term "DC balanced" is used herein to mean that the integral of the driving voltage applied to a pixel with respect to time taken over an entire waveform is substantially zero.) A shaking waveform is then applied, followed by application of the high negative driving voltage ($V_{H2}$) for a period of t2, thus ensuring that the pixel is in the yellow state shown in FIG. 3-2. From this yellow state, the pixel is driven to the red state by applying a low positive driving voltage ($V_{L1}$, for example +3V) for a period of t3, to effect the yellow-to-red transition shown in FIG. 3-2. The period t2 is sufficient to drive the pixel to the yellow state when $V_{H2}$ is applied and the period t3 is sufficient to drive the pixel to the red state from the yellow state when $V_{L1}$ is applied.

FIG. 5 illustrates a waveform which may be used to replace the portion of the waveform of FIG. 4 occurring in period t3. In the first portion of the waveform of FIG. 5, the high negative driving voltage ($V_{H2}$) is applied to a pixel for a period of t4 to drive the pixel towards the yellow state, then a positive driving voltage (+V') is applied for a period of t5 to drive the pixel towards the red state. The magnitude of V' is lower than that of $V_H$ (e.g., $V_{H1}$ or $V_{H2}$). The magnitude of +V' may be less than 50% of the magnitude of $V_H$, and t5 may greater than t4, for example, t4 may be in the range of 20-400 msec and t5 may be ≥200 msec. The waveform of FIG. 5 is repeated for at least 2 cycles (N≥2), preferably at least 4 cycles and more preferably at least 8 cycles. The red color becomes more intense after each driving cycle.

Figure 6:
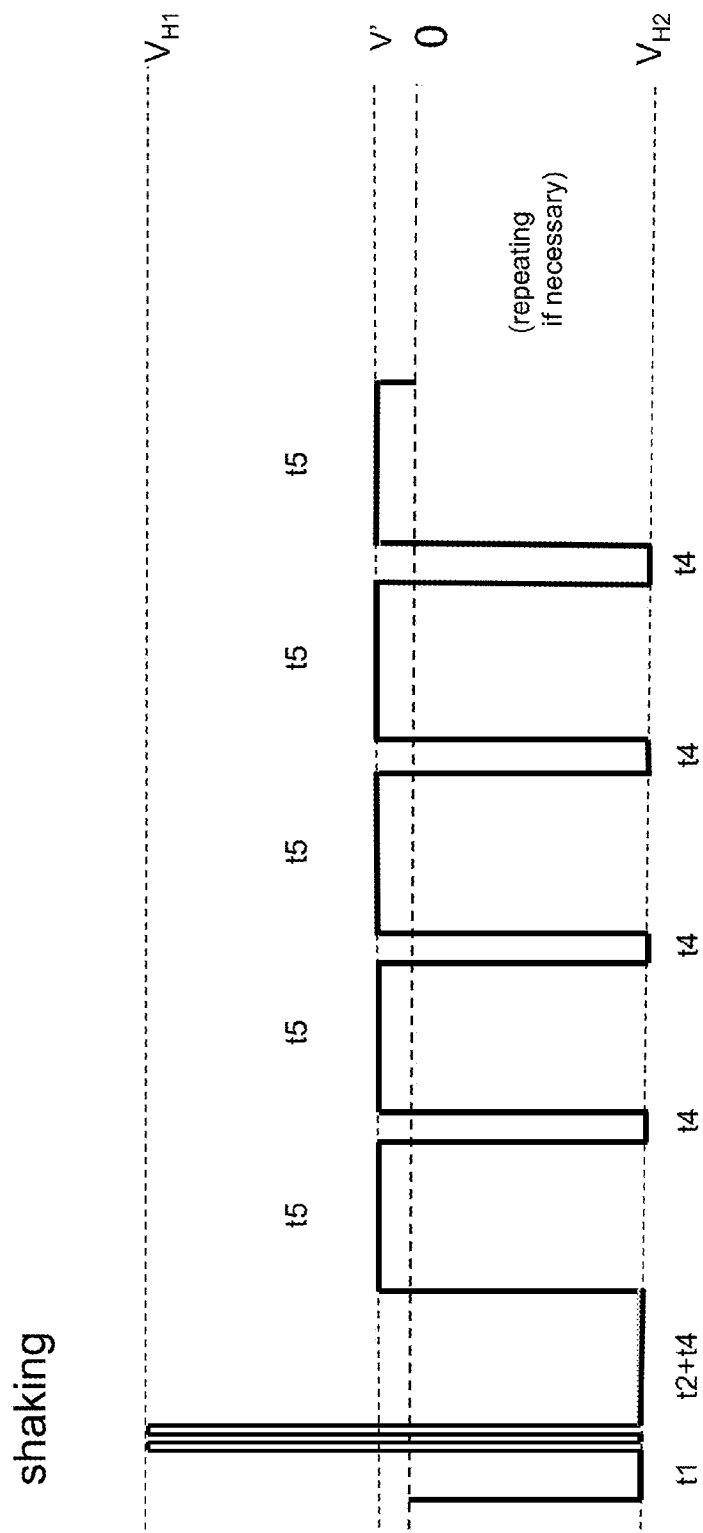

As already noted, the waveform of FIG. 5 may be used to replace the portion of the waveform of FIG. 4 occurring in period t3. FIG. 6 illustrates a waveform in which the portion of the waveform of FIG. 4 occurring in period t3 is replaced by five cycles of the waveform of FIG. 5 (more or fewer cycles may of course be used). In other words, the waveform of FIG. 6 comprises driving towards yellow for a period of t1 (cf. FIG. 4), a shaking waveform, driving towards yellow for a period of t2 (again, cf. FIG. 4), and then applying multiple cycles of the waveform of FIG. 5.

Figure 7:
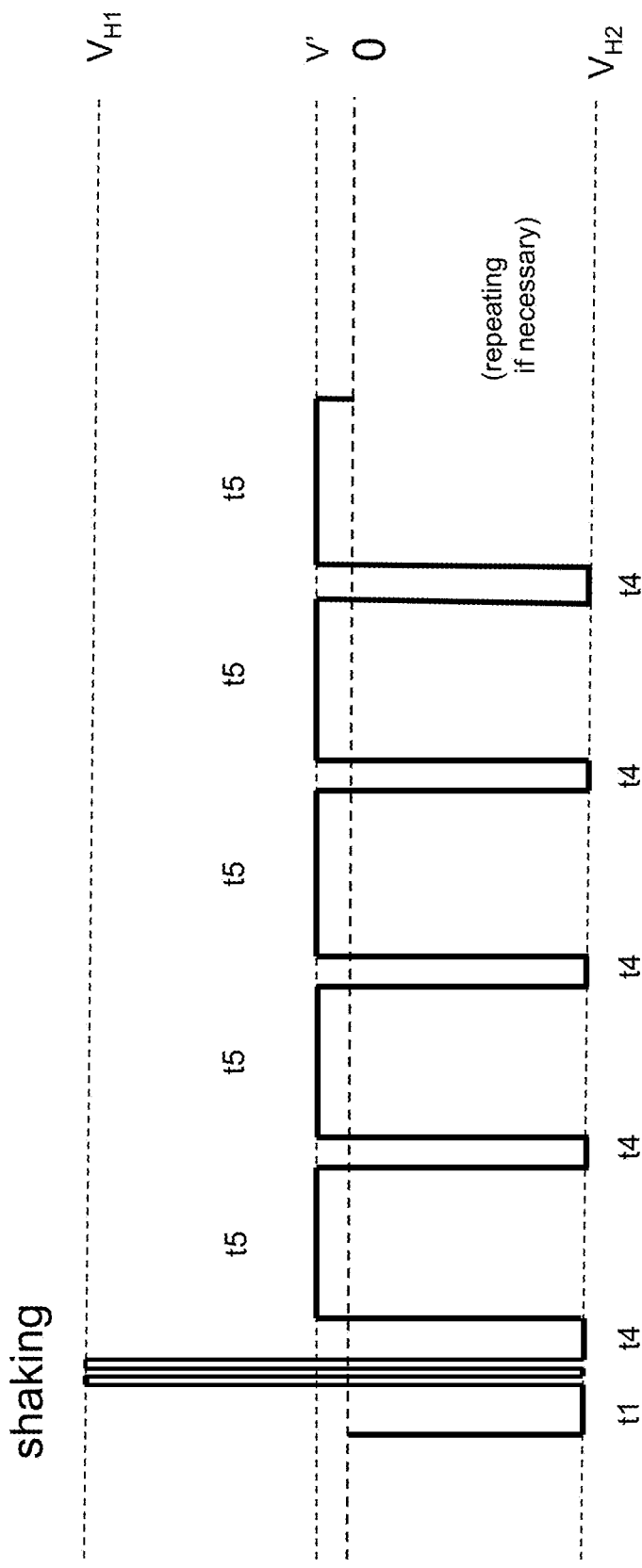

FIG. 7 illustrates a waveform similar to that of FIG. 6 but in which the step of driving towards the yellow state for the period of t2 is eliminated, so that the waveform of FIG. 7 transitions from the shaking waveform immediately to the waveform of FIG. 5. The waveforms of FIGS. 6 and 7 may each be DC balanced.

The driving method of FIG. 5 therefore may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:
  (a) the five types of pigment particles have optical characteristics differing from one another;
  (b) the first and second types of particles carry opposite charge polarities;
  (c) the third and fourth types of particles carry the same charge polarity as the first type of particles, and the first type, the third type and the fourth type of particles have progressively lower magnitudes; and
  (d) the fifth type of particles carries the same charge polarity as the second type of particles but its magnitude is lower than that of the second type of particles, the method comprises the following steps:
  (i) applying a first driving voltage to a pixel of the electrophoretic display for a first period of time to drive the pixel towards the color state of the second type of particles;
  (ii) applying a second driving voltage to the pixel for a second period of time, wherein the second driving voltage has same polarity as the fourth type of particles and a magnitude lower than that of the first driving voltage, to drive the pixel from the color state of the second type of particles towards the color state of the fourth type of particles to appear at the viewing side; and
  repeating steps (i) and (ii).

In this method, the magnitude of the second driving voltage may be less than 50% of the magnitude of the first driving voltage. Steps (i) and (ii) may be repeated at least 2 times, preferably at least 4 times and more preferably at least 8 times. The method may further comprise a shaking waveform before step (i), and/or may further comprise driving the pixel to the color state of the second type of particles after the shaking waveform but prior to step (i).

Figure 8:
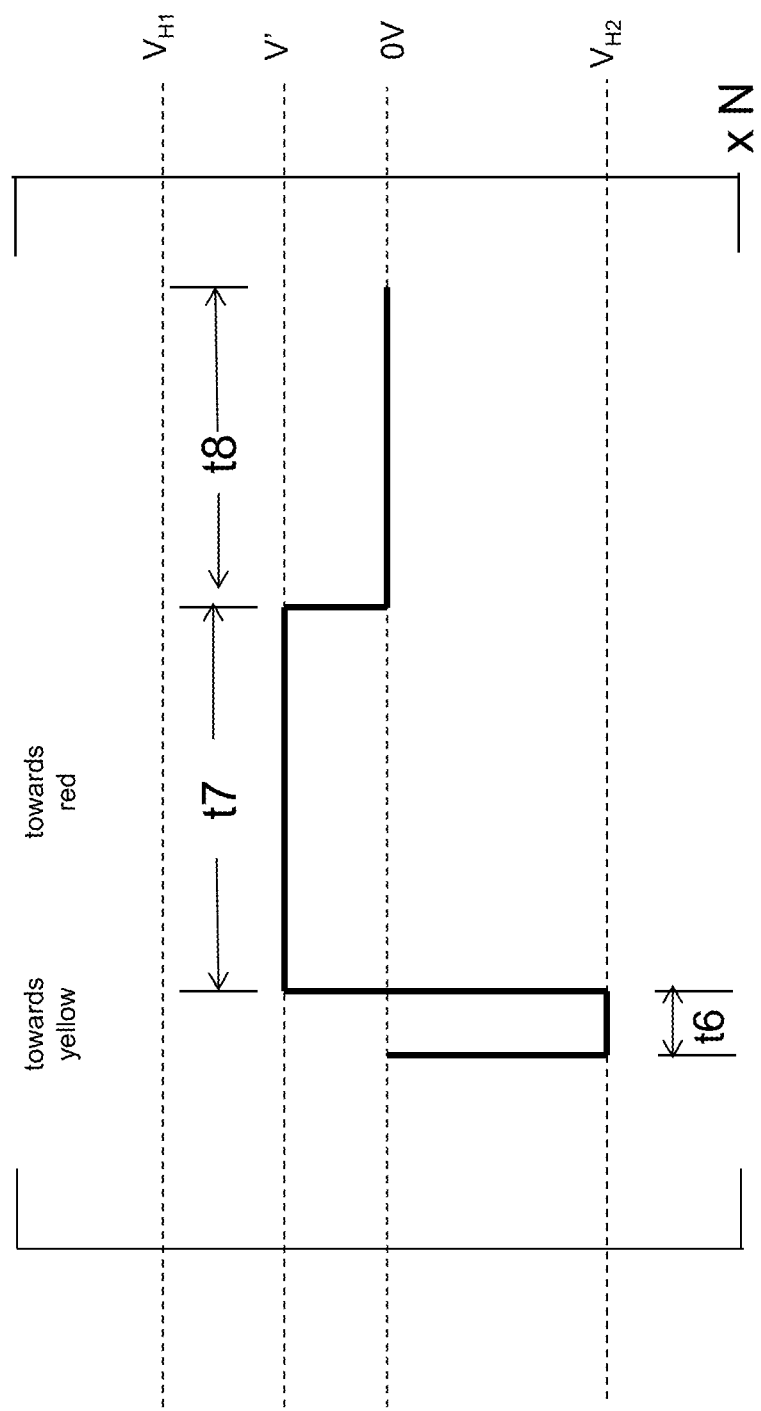

FIG. 8 illustrates a waveform which may be used in place of the waveform of FIG. 5 to replace the portion of the waveform of FIG. 4 occurring in period t3. The waveform of FIG. 8 comprises driving towards yellow for an initial period of t6 (cf. period t4 in FIG. 5), followed by driving towards red for a period of t7 (cf. period t5 in FIG. 5). However, in the waveform of FIG. 8, period t7 is followed by a wait period of t8 in which no driving voltage is applied. The waveform of FIG. 8 is designed to release the charge imbalance stored in the dielectric layers and/or at the interfaces between layers of different materials, in an electrophoretic display device, especially when the resistance of the dielectric layers is high, for example, at a low temperature. (As used herein, the term "low temperature" refers to a temperature below about 10° C.) The wait time presumably can dissipate the unwanted charge stored in the dielectric layers and cause the short pulse t6 for driving a pixel towards the yellow state and the longer pulse t7 for driving the pixel towards the red state to be more efficient. As a result, this alternative driving method will bring a better separation of the low charged (red) particles from the higher charged ones. The wait period t8 may be in the range of 5-5000 msec, depending on the resistance of the dielectric layers. The entire waveform of FIG. 8 may be repeated at least 2 times (N≥2), preferably at least 4 times and more preferably at least 8 times.

Figure 9:
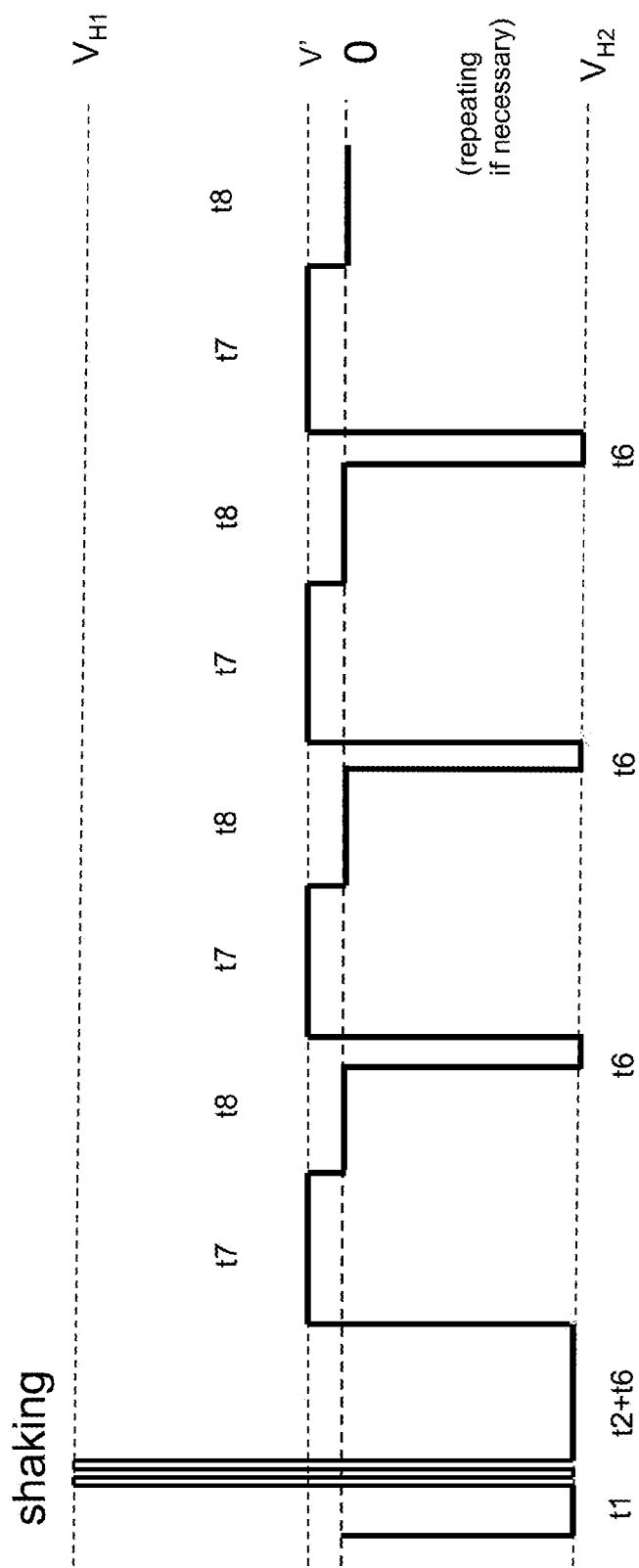

As already noted, the waveform of FIG. 8 may be used to replace the portion of the waveform of FIG. 4 occurring in period t3. FIG. 9 illustrates a waveform in which the portion of the waveform of FIG. 4 occurring in period t3 is replaced by four cycles of the waveform of FIG. 8 (more or fewer cycles may of course be used). In other words, the waveform of FIG. 9 comprises driving towards yellow for a period of t1 (cf. FIG. 4), a shaking waveform, driving towards yellow for a period of t2 (again, cf. FIG. 4), and then applying multiple cycles of the waveform of FIG. 8.

Figure 10:
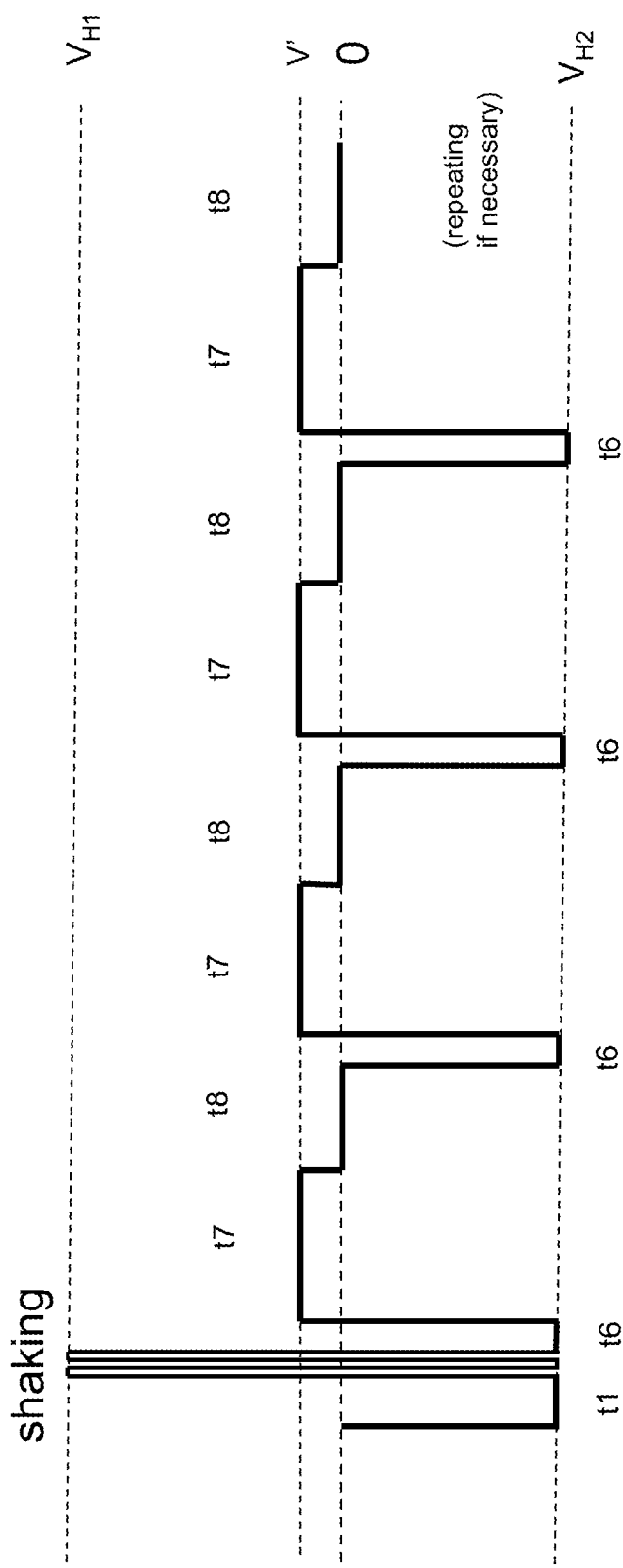

FIG. 10 illustrates a waveform similar to that of FIG. 9 but in which the step of driving towards the yellow state for the period of t2 is eliminated, so that the waveform of FIG. 10 transitions from the shaking waveform immediately to the waveform of FIG. 8. The waveforms of FIGS. 9 and 10 may each be DC balanced.

The driving method of FIG. 8 therefore can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:
  (a) the five types of pigment particles have optical characteristics differing from one another;
  (b) the first and second types of particles carry opposite charge polarities;
  (c) the third and fourth types of particles carry the same charge polarity as the first type of particles, and the first type, the third type and the fourth type of particles have progressively lower magnitudes; and
  (d) the fifth type of particles carries the same charge polarity as the second type of particles but its magnitude is lower than that of the second type of particles, the method comprises the following steps:
  (i) applying a first driving voltage to a pixel of the electrophoretic display for a first period of time to drive the pixel towards the color state of the second type of particles;
  (ii) applying a second driving voltage to the pixel for a second period of time, wherein the second driving voltage has same polarity as the fourth type of particles and a magnitude lower than that of the first driving voltage, to drive the pixel from the color state of the second type of particles towards the color state of the fourth type of particles to appear at the viewing side;
  (iii) applying no driving voltage to the pixel for a third period of time; and
  repeating steps (i)-(iii).

In this method, the magnitude of the second driving voltage may be less than 50% of the magnitude of the first driving voltage. Steps (i), (ii) and (iii) may be repeated at least 2 times, preferably at least 4 times and more preferably at least 8 times. The method may further comprise a shaking waveform before step (i), and/or may further comprise driving the pixel to the color state of the second type of particles after the shaking waveform but prior to step (i). The lengths of the driving periods may be temperature dependent.

Figure 11:
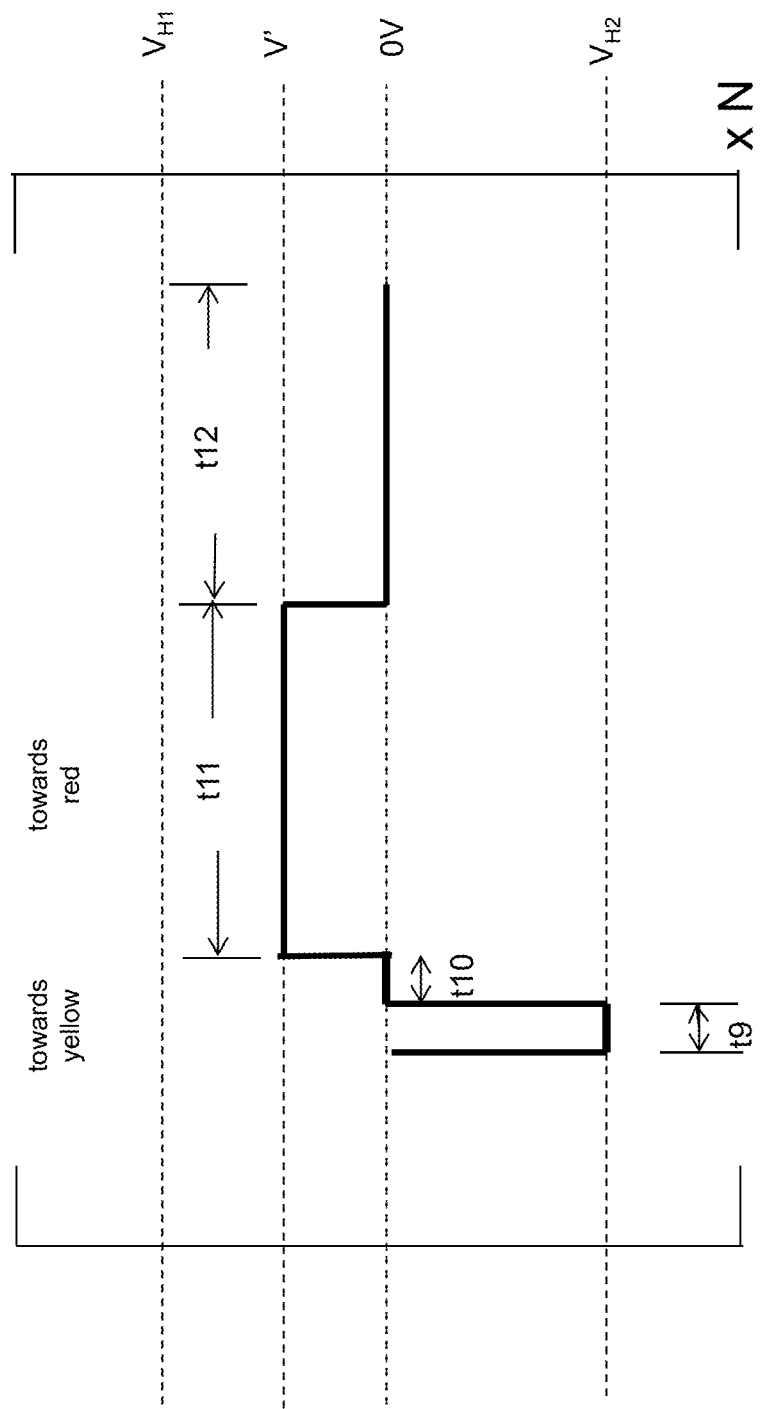

FIG. 11 illustrates a waveform which may be used in place of the waveform of FIG. 5 or 8 to replace the portion of the waveform of FIG. 4 occurring in period t3. The waveform of FIG. 11 comprises driving towards yellow for an initial period of t9 (cf. period t4 in FIG. 5), followed by a wait time of t10 during which no driving voltage is applied. The wait time of t10 is followed by driving towards red for a period of t11 (cf. period t5 in FIG. 5), followed by a wait period of t12 in which no driving voltage is applied (cf. period t8 in FIG. 8). The waveform of FIG. 11 may be repeated at least 2 times, preferably at least 4 times and more preferably at least 8 times.

In the waveform of FIG. 11, the first wait time t10 is very short while the second wait time t12 is longer. The period t9 is also shorter than the period t11. For example, t9 may be in the range of 20-200 msec; t10 may be less than 100 msec; t11 may be in the range of 100-200 msec; and t12 may be less than 1000 msec.

Figure 12:
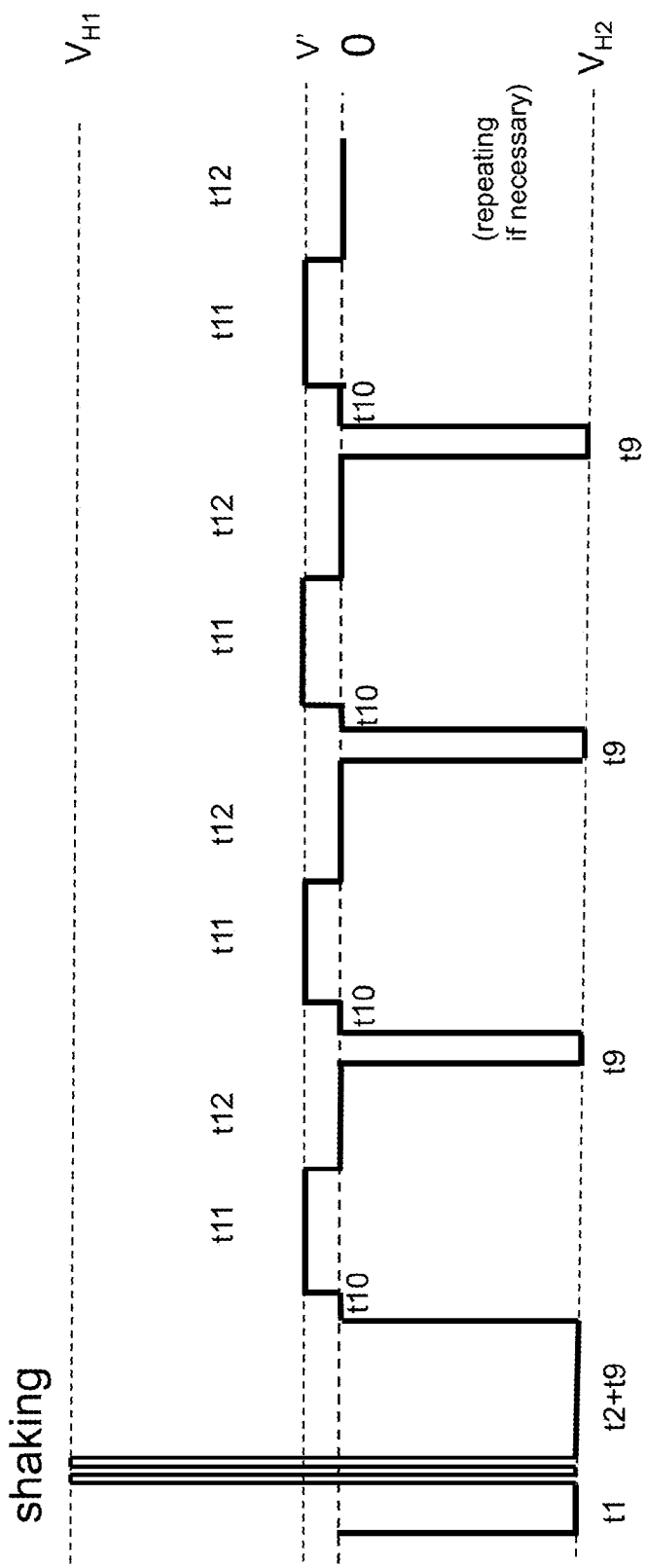

As already noted, the waveform of FIG. 11 may be used to replace the portion of the waveform of FIG. 4 occurring in period t3. FIG. 12 illustrates a waveform in which the portion of the waveform of FIG. 4 occurring in period t3 is replaced by four cycles of the waveform of FIG. 11 (more or fewer cycles may of course be used). In other words, the waveform of FIG. 12 comprises driving towards yellow for a period of t1 (cf. FIG. 4), a shaking waveform, driving towards yellow for a period of t2 (again, cf. FIG. 4), and then applying multiple cycles of the waveform of FIG. 11. As a general rule, the better the yellow state achieved at the end of period t2, the better the red state that will be displayed at the end of the waveform.

Figure 13:
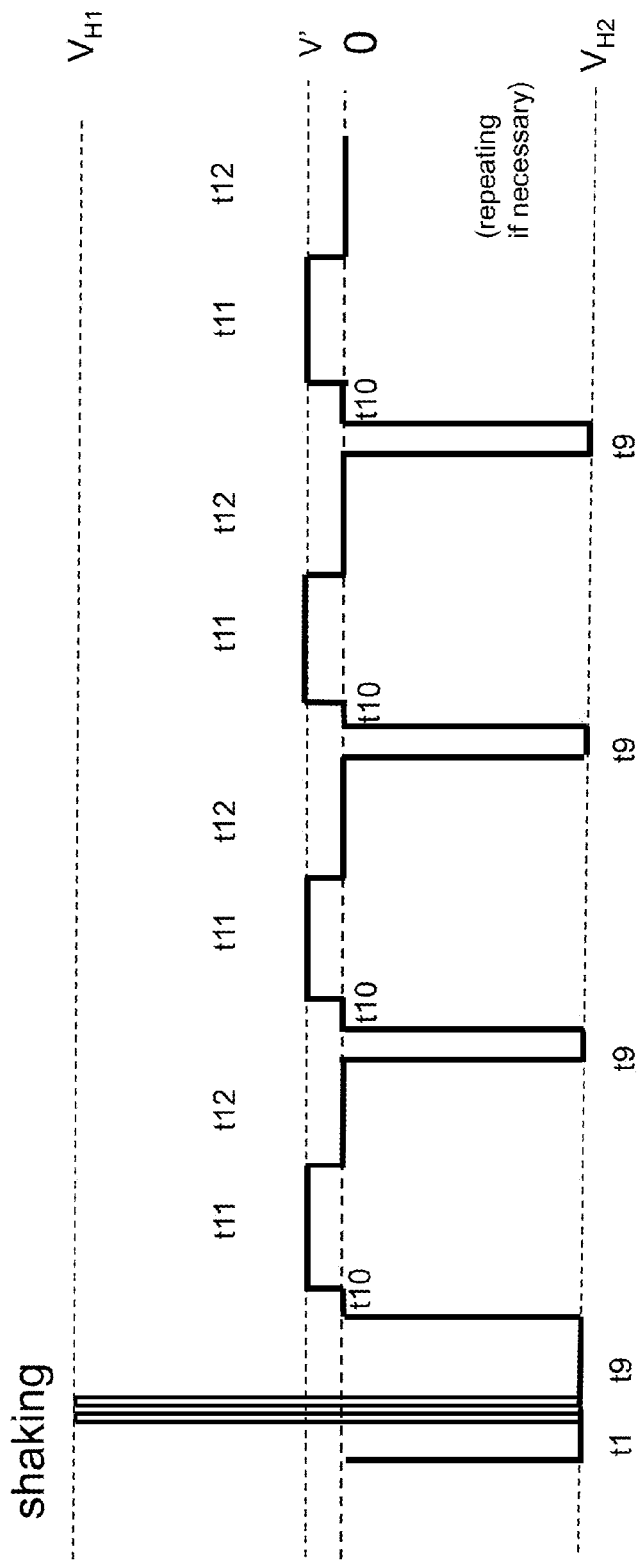

FIG. 13 illustrates a waveform similar to that of FIG. 12 but in which the step of driving towards the yellow state for the period of t2 is eliminated, so that the waveform of FIG. 13 transitions from the shaking waveform immediately to the waveform of FIG. 11. The waveforms of FIGS. 12 and 13 may each be DC balanced.

The driving method of FIG. 11 therefore can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:
   (a) the five types of pigment particles have optical characteristics differing from one another;
   (b) the first and second types of particles carry opposite charge polarities;
   (c) the third and fourth types of particles carry the same charge polarity as the first type of particles, and the first type, the third type and the fourth type of particles have progressively lower magnitudes; and
   (d) the fifth type of particles carries the same charge polarity as the second type of particles but its magnitude is lower than that of the second type of particles, the method comprises the following steps:

(i) applying a first driving voltage to a pixel in the electrophoretic display for a first period of time to drive the pixel towards the color state of the second type of particles;
   (ii) applying no driving voltage to the pixel for a second period of time;
   (iii) applying a second driving voltage to the pixel for a third period of time, wherein the second driving voltage has the same polarity as the fourth type of particles and has a magnitude lower than that of the first driving voltage, to drive the pixel from the color state of the second type of particles towards the color state of the fourth type of particles to appear at the viewing side;
   (iv) applying no driving voltage to the pixel for a fourth period of time; and
   repeating steps (i)-(iv).

In this method, the magnitude of the second driving voltage may be less than 50% of the magnitude of the first driving voltage. Steps (i)-(iv) may be repeated at least 2 times, preferably at least 4 times and more preferably at least 8 times. The method may further comprise a shaking waveform before step (i), and/or may further comprise driving the pixel to the color state of the second type of particles after the shaking waveform but prior to step (i). The lengths of the driving periods may be temperature dependent.

This driving method not only is particularly effective at a low temperature, but can also provide a display device better tolerance of structural variations caused during manufacture of the display device. Therefore its usefulness is not limited to low temperature driving.

Figure 14:
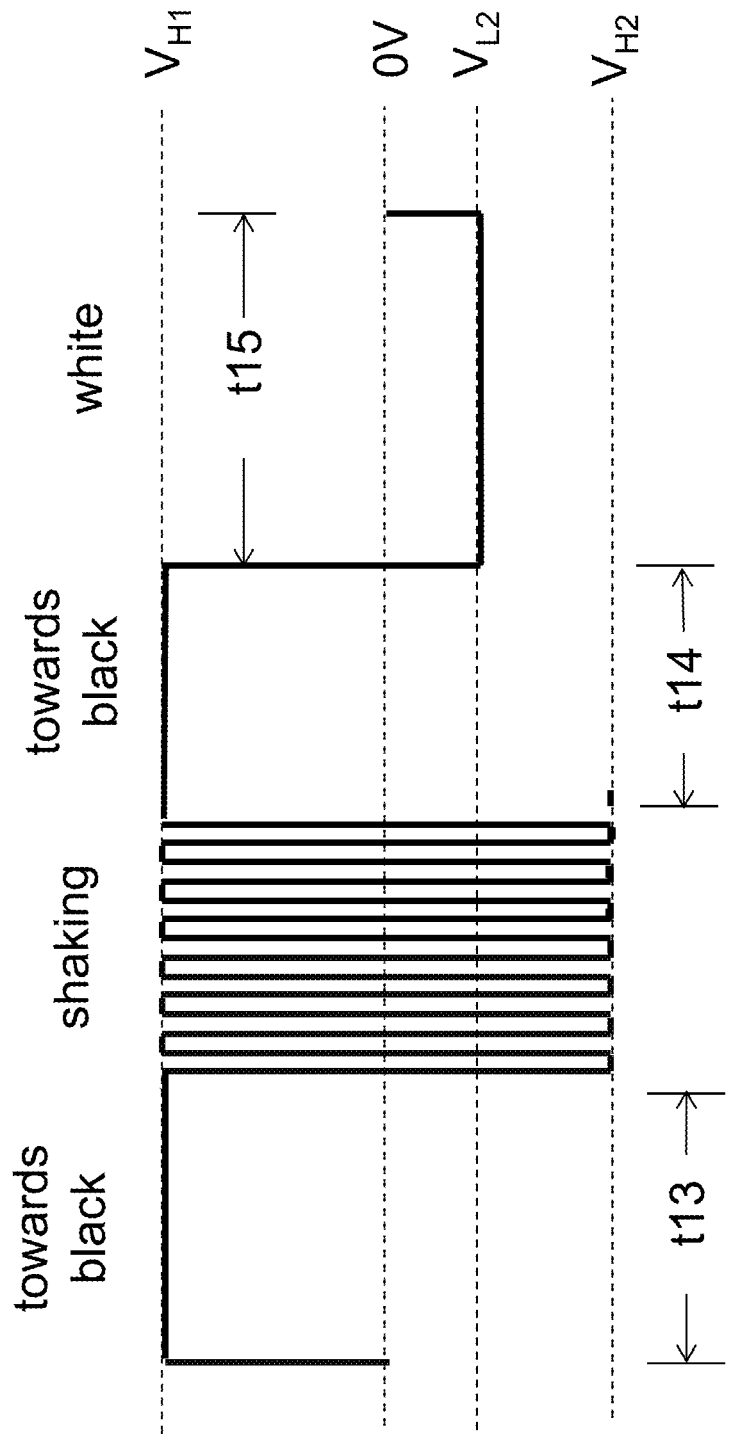
FIG. 14 illustrates a waveform which can used to cause the display layer shown in FIG. 1 to effect the transition shown in FIG. 3-3 to display the white color of low charged negative particles.

FIG. 14 illustrates a waveform which may be used to effect the black-to-white (high positive to low negative) transition of FIG. 3-3. In the waveform of FIG. 14, which is essentially an inverted version of the waveform of FIG. 4, a high positive driving voltage ($V_{H1}$, for example +15V) is first applied for a period of t13. This initial application of a high positive driving voltage may be omitted but is preferably included to ensure that the entire waveform of FIG. 14 is DC balanced. A shaking waveform is then applied, followed by application of the high positive driving voltage ($V_{H1}$) for a period of t14, thus ensuring that the pixel is in the black state shown in FIG. 3-3. From this black state, the pixel is driven to the white state by applying a low negative driving voltage ($V_{L2}$, for example −10V) for a period of t15, to effect the black-to-white transition shown in FIG. 3-3. The period t14 is sufficient to drive the pixel to the black state when $V_{H1}$ is applied and the period t15 is sufficient to drive the pixel to the white state from the black state when $V_{L2}$ is applied. The waveform of FIG. 14 may be DC balanced.

The driving method of FIG. 14 therefore can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:
   (a) the five types of pigment particles have optical characteristics differing from one another;
   (b) the first and second types of particles carry opposite charge polarities;
   (c) the third and fourth types of particles carry the same charge polarity as the first type of particles, and the first type, the third type and the fourth type of particles have progressively lower magnitudes; and (d) the fifth type of particles carries the same charge polarity as the second type of particles but its magnitude is lower than that of the second type of particles, the method comprises the following steps:
(i) driving a pixel of the electrophoretic display to the color of the first type of particles; and
(ii) applying a low driving voltage for a period of time, wherein the low driving voltage has the same polarity as the fifth type of particles and the period of time is sufficient to drive the pixel from the color state of the first type of particles to the color state of the fifth type of particles to appear at the viewing side.

Figure 15:
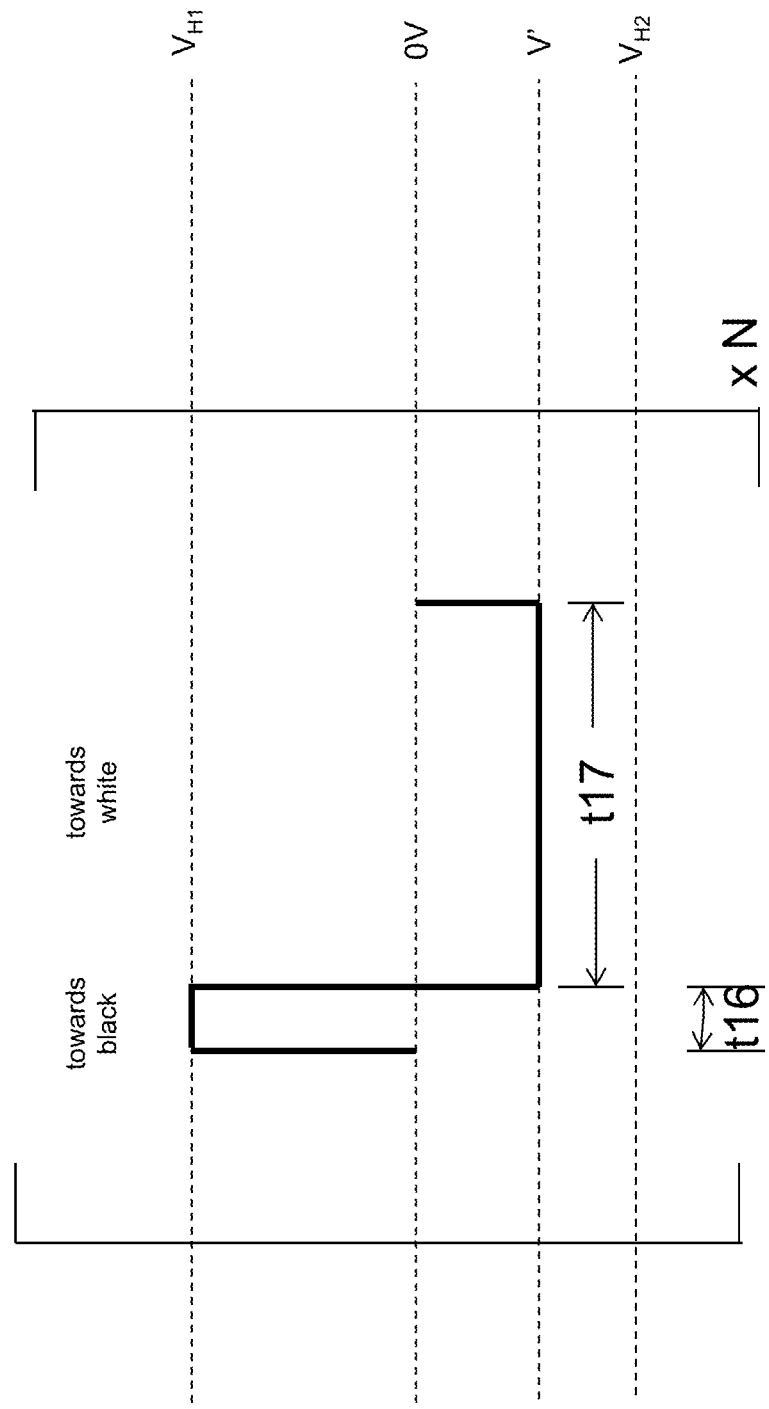
FIGS. 15-17, 18-20 and 21-23 illustrate alternative waveforms which may be used in place of part of the waveform shown in FIG. 14.

FIG. 15 illustrates a waveform which may be used to replace the portion of the waveform of FIG. 14 occurring in period t15. In the first portion of the waveform of FIG. 14, which is essentially an inverted version of the waveform of FIG. 5, the high positive driving voltage ($V_{H1}$) is applied to a pixel for a period of t16 to drive the pixel towards the black state, then a negative driving voltage (−V') is applied for a period of t17 to drive the pixel towards the white state. The magnitude of −V' is lower than that of $V_H$ (e.g., $V_{H1}$ or $V_{H2}$) The magnitude of −V' may be less than 50% of the magnitude of $V_H$, and t17 may greater than t16, for example, t16 may be in the range of 20-400 msec and t17 may be ≥200 msec. The waveform of FIG. 15 is repeated for at least 2 cycles (N≥2), preferably at least 4 cycles and more preferably at least 8 cycles. The white color becomes more intense after each driving cycle.

Figure 16:
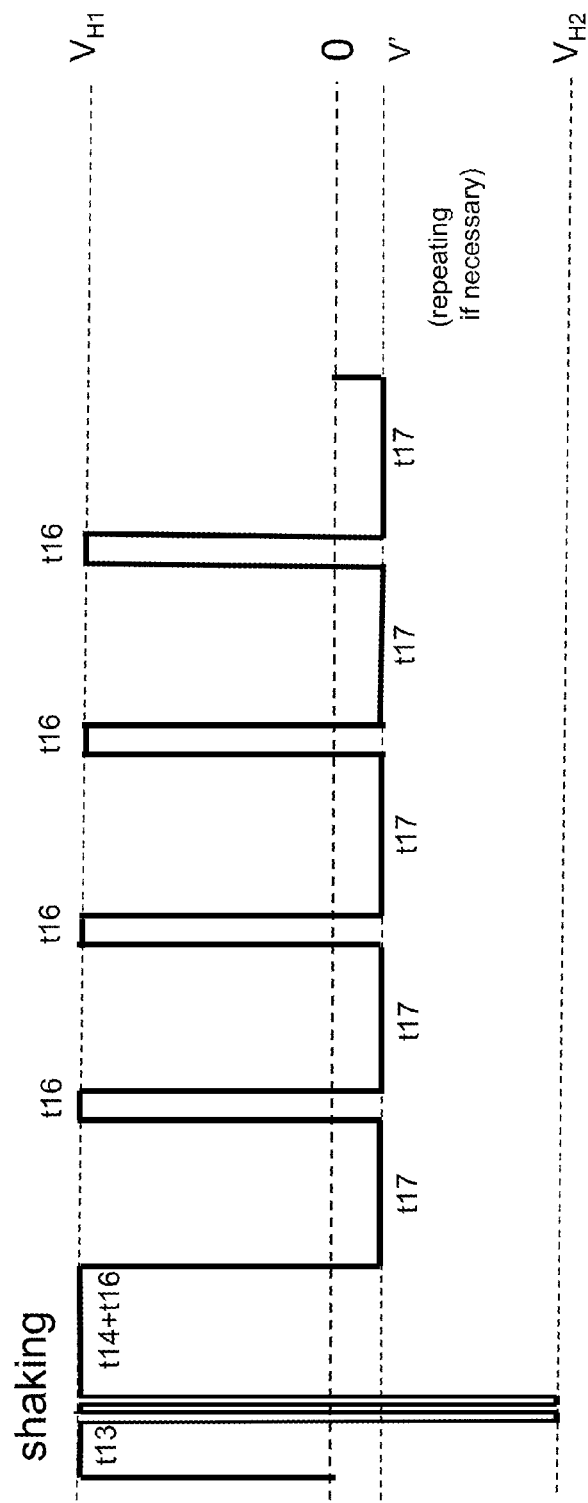

As already noted, the waveform of FIG. 15 may be used to replace the portion of the waveform of FIG. 14 occurring in period t15. FIG. 16 illustrates a waveform in which the portion of the waveform of FIG. 14 occurring in period t15 is replaced by four cycles of the waveform of FIG. 15 (more or fewer cycles may of course be used). In other words, the waveform of FIG. 16 comprises driving towards black for a period of t13 (cf. FIG. 14), a shaking waveform, driving towards black for a period of t14 (again, cf. FIG. 14), and then applying multiple cycles of the waveform of FIG. 15.

Figure 17:
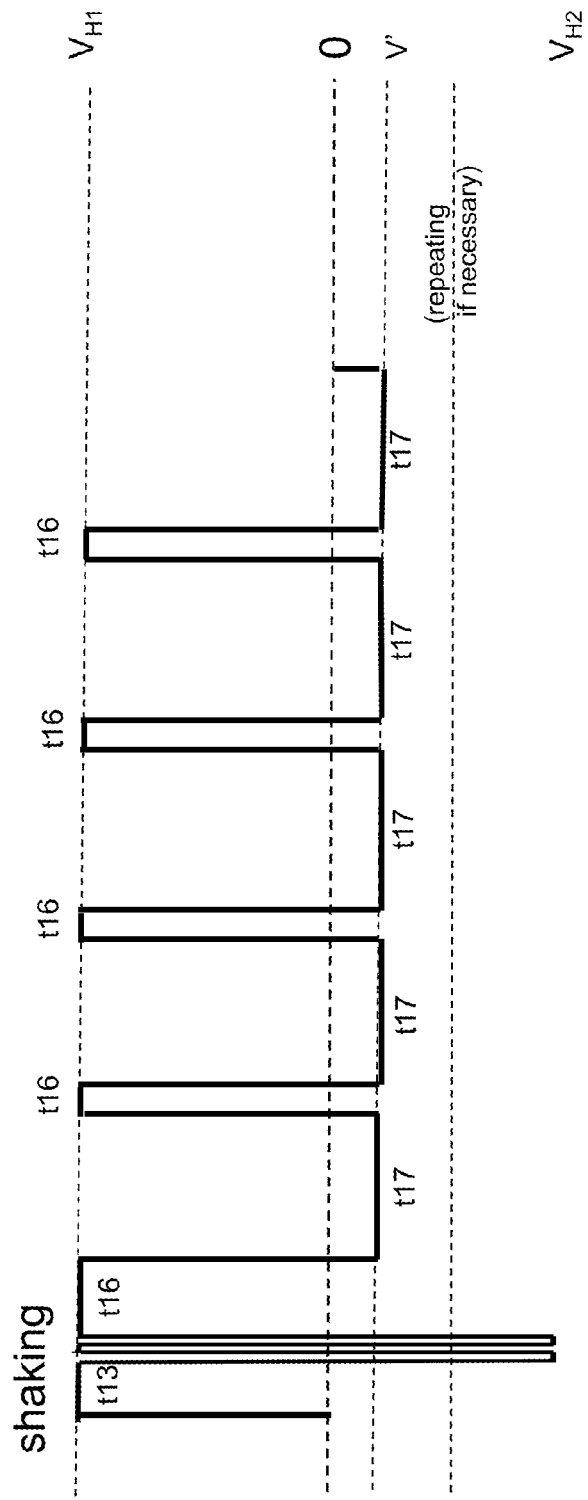

FIG. 17 illustrates a waveform similar to that of FIG. 16 but in which the step of driving towards the black state for the period of t14 is eliminated, so that the waveform of FIG. 17 transitions from the shaking waveform immediately to the waveform of FIG. 15. The waveforms of FIGS. 16 and 17 may each be DC balanced.

The driving method of FIG. 15 therefore can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:
(a) the five types of pigment particles have optical characteristics differing from one another;
(b) the first and second types of particles carry opposite charge polarities;
(c) the third and fourth types of particles carry the same charge polarity as the first type of particles, and the first type, the third type and the fourth type of particles have progressively lower magnitudes; and
(d) the fifth type of particles carries the same charge polarity as the second type of particles but its magnitude is lower than that of the second type of particles, the method comprises the following steps:
(i) applying a first driving voltage to a pixel of the electrophoretic display for a first period of time to drive the pixel towards the color state of the first type of particles;
(ii) applying a second driving voltage to the pixel for a second period of time, wherein the second driving voltage has same polarity as the fifth type of particles and a magnitude lower than that of the first driving voltage, to drive the pixel from the color state of the first type of particles towards the color state of the fifth type of particles to appear at the viewing side; and
repeating steps (i) and (ii).

In this method, the magnitude of the second driving voltage may be less than 50% of the magnitude of the first driving voltage. Steps (i) and (ii) may be repeated at least 2 times, preferably at least 4 times and more preferably at least 8 times. The method may further comprise a shaking waveform before step (i), and/or may further comprise driving the pixel to the color state of the first type of particles after the shaking waveform but prior to step (i). The lengths of the driving periods may be temperature dependent.

Figure 18:
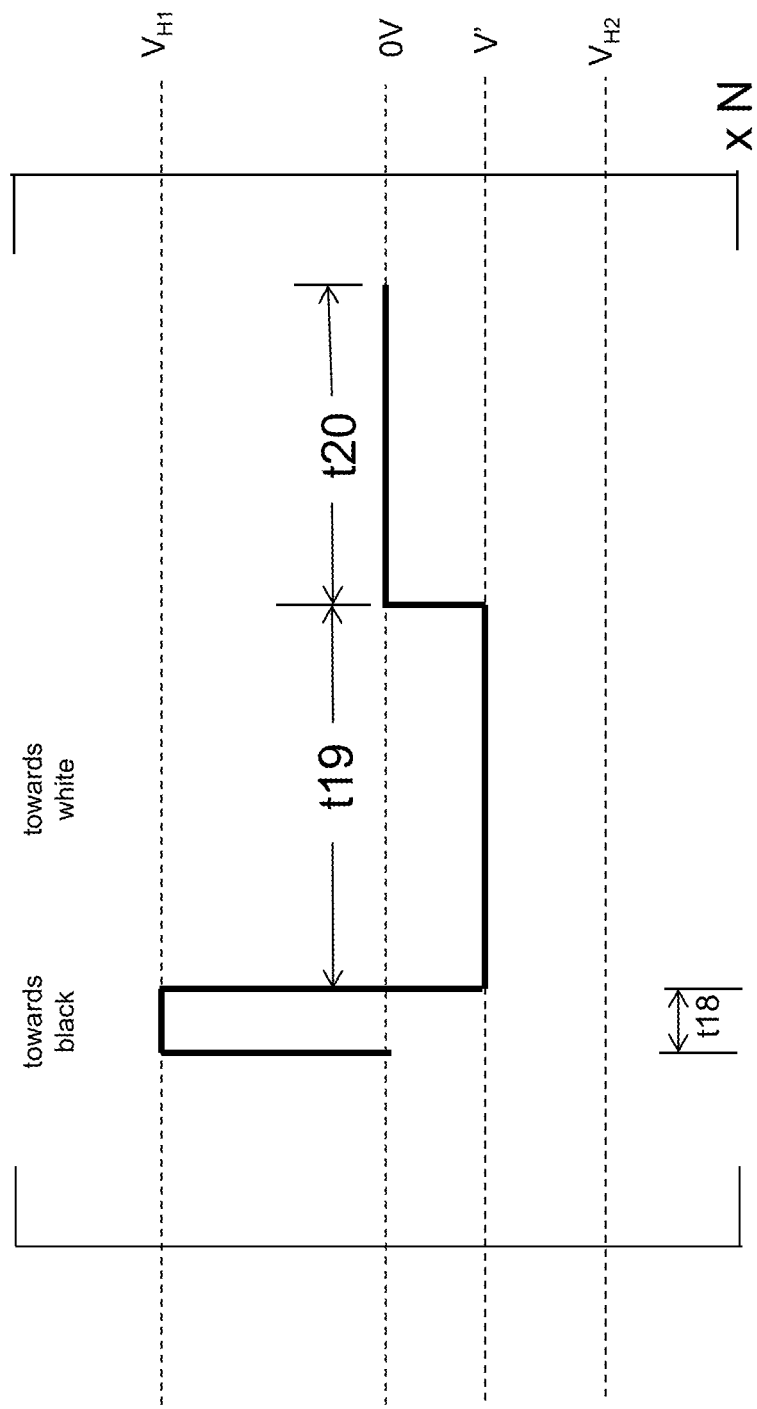

FIG. 18 illustrates a waveform which may be used in place of the waveform of FIG. 15 to replace the portion of the waveform of FIG. 14 occurring in period t15. The waveform of FIG. 8, which is essentially an inverted version of the waveform of FIG. 8, comprises driving towards black for an initial period of t18 (cf. period t16 in FIG. 15), followed by driving towards white for a period of t19 (cf. period t17 in FIG. 15). However, in the waveform of FIG. 18, period t19 is followed by a wait period of t20 in which no driving voltage is applied. Like the waveform of FIG. 8, the waveform of FIG. 18 is designed to release the charge imbalance stored in the dielectric layers and/or at the interfaces between layers of different materials, in an electrophoretic display device, especially when the resistance of the dielectric layers is high, for example, at a low temperature. The wait time presumably can dissipate the unwanted charge stored in the dielectric layers and cause the short pulse t18 for driving a pixel towards the black state and the longer pulse t19 for driving the pixel towards the white state to be more efficient. The wait period t20 may be in the range of 5-5000 msec, depending on the resistance of the dielectric layers. The entire waveform of FIG. 8 may be repeated at least 2 times (N≥2), preferably at least 4 times and more preferably at least 8 times. The periods, t18 and t19 in FIG. 18, are similar to periods t16 and t17 in FIG. 15, respectively. In other words, t19 is greater than t18.

Figure 19:
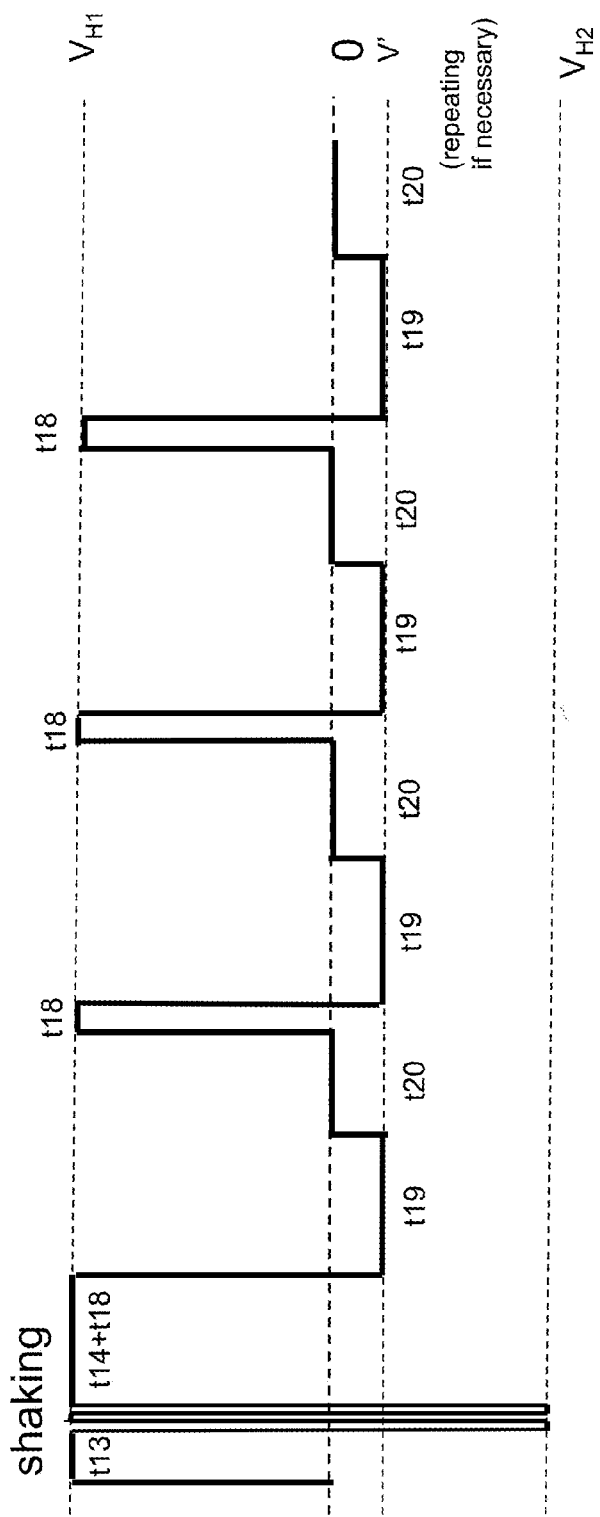

As already noted, the waveform of FIG. 18 may be used to replace the portion of the waveform of FIG. 14 occurring in period t15. FIG. 19 illustrates a waveform in which the portion of the waveform of FIG. 14 occurring in period t15 is replaced by three cycles of the waveform of FIG. 18 (more or fewer cycles may of course be used). In other words, the waveform of FIG. 19 comprises driving towards black for a period of t13 (cf. FIG. 14), a shaking waveform, driving towards black for a period of t14 (again, cf. FIG. 14), and then applying multiple cycles of the waveform of FIG. 18.

Figure 20:
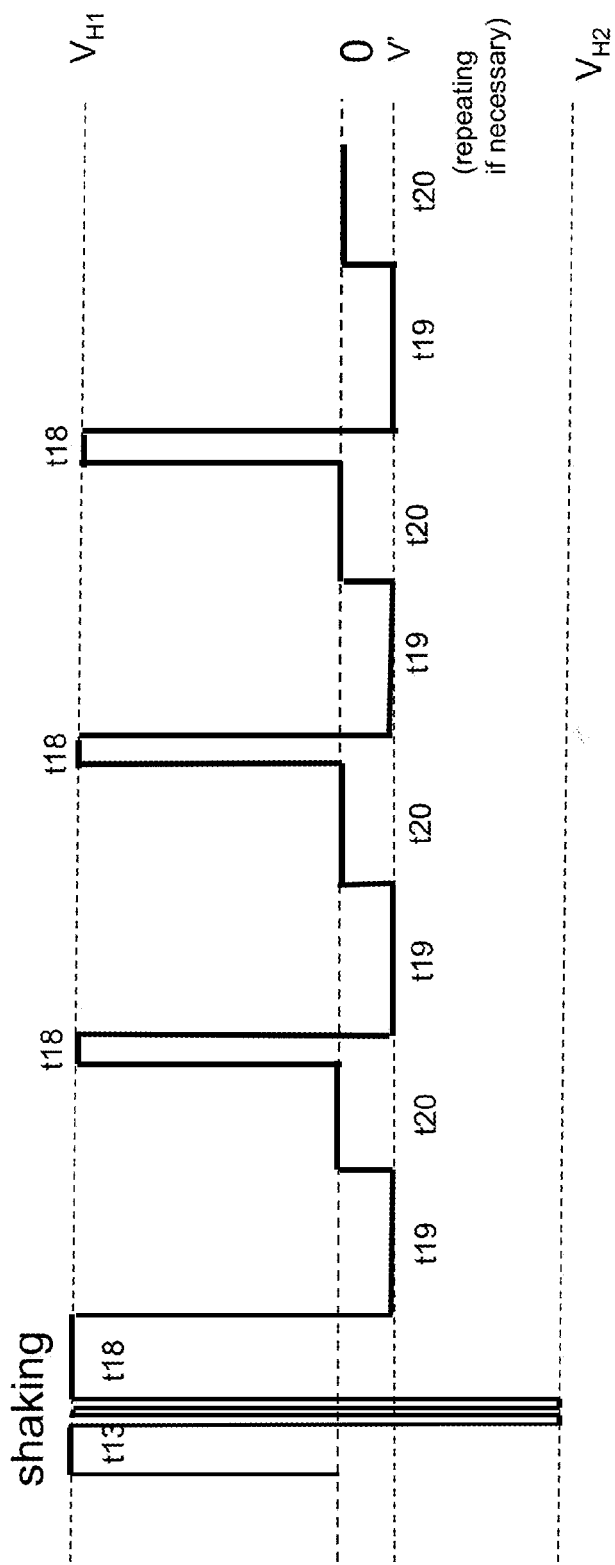

FIG. 20 illustrates a waveform similar to that of FIG. 19 but in which the step of driving towards the black state for the period of t14 is eliminated, so that the waveform of FIG. 20 transitions from the shaking waveform immediately to the waveform of FIG. 18. The waveforms of FIGS. 19 and 20 may each be DC balanced.

The driving method of FIG. 18 therefore can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:

(a) the five types of pigment particles have optical characteristics differing from one another;

(b) the first and second types of particles carry opposite charge polarities;

(c) the third and fourth types of particles carry the same charge polarity as the first type of particles, and the first type, the third type and the fourth type of particles have progressively lower magnitudes; and (d) the fifth type of particles carries the same charge polarity as the second type of particles but its magnitude is lower than that of the second type of particles, the method comprises the following steps:

(i) applying a first driving voltage to a pixel of the electrophoretic display for a first period of time to drive the pixel towards the color state of the first type of particles;

(ii) applying a second driving voltage to the pixel for a second period of time, wherein the second driving voltage has same polarity as the fifth type of particles and a magnitude lower than that of the first driving voltage, to drive the pixel from the color state of the first type of particles towards the color state of the fifth type of particles to appear at the viewing side;

(iii) applying no driving voltage to the pixel for a third period of time; and repeating steps (i)-(iii).

In this method, the magnitude of the second driving voltage may be less than 50% of the magnitude of the first driving voltage. Steps (i), (ii) and (iii) may be repeated at least 2 times, preferably at least 4 times and more preferably at least 8 times. The method may further comprise a shaking waveform before step (i), and/or may further comprise driving the pixel to the color state of the first type of particles after the shaking waveform but prior to step (i). The lengths of the driving periods may be temperature dependent.

Figure 21:
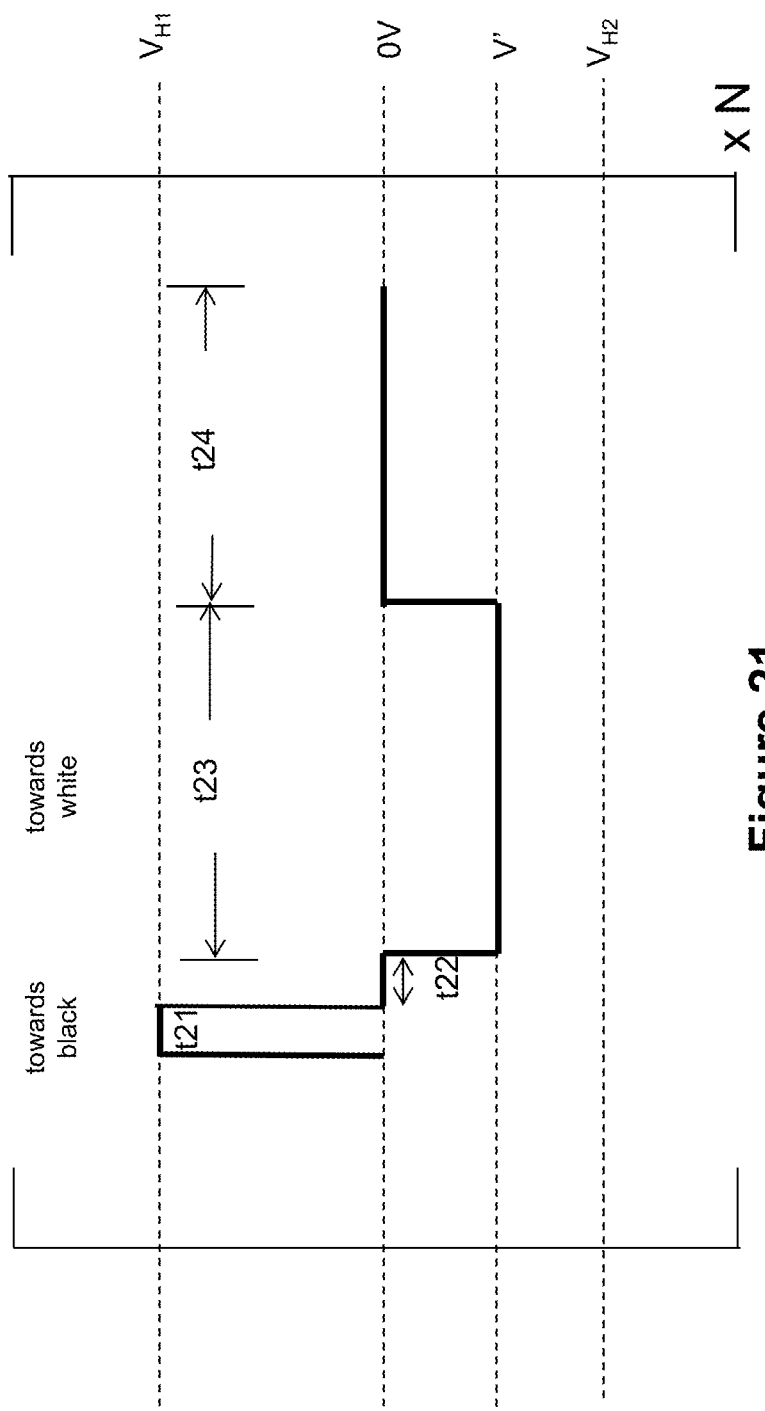

FIG. 21 illustrates a waveform which may be used in place of the waveform of FIG. 15 or 18 to replace the portion of the waveform of FIG. 14 occurring in period t15. The waveform of FIG. 21, which is essentially an inverted version of the waveform of FIG. 11, comprises driving towards black for an initial period of t21 (cf. period t16 in FIG. 15), followed by a wait time of t22 during which no driving voltage is applied. The wait time of t22 is followed by driving towards white for a period of t23 (cf. period t17 in FIG. 15), followed by a wait period of t24 in which no driving voltage is applied (cf. period t20 in FIG. 18). The waveform of FIG. 21 may be repeated at least 2 times, preferably at least 4 times and more preferably at least 8 times.

In the waveform of FIG. 21, the first wait time t22 is very short while the second wait time t24 is longer. The period t21 is also shorter than the period t23. For example, t21 may be in the range of 20-200 msec; t22 may be less than 100 msec; t23 may be in the range of 100-200 msec; and t24 may be less than 1000 msec.

Figure 22:
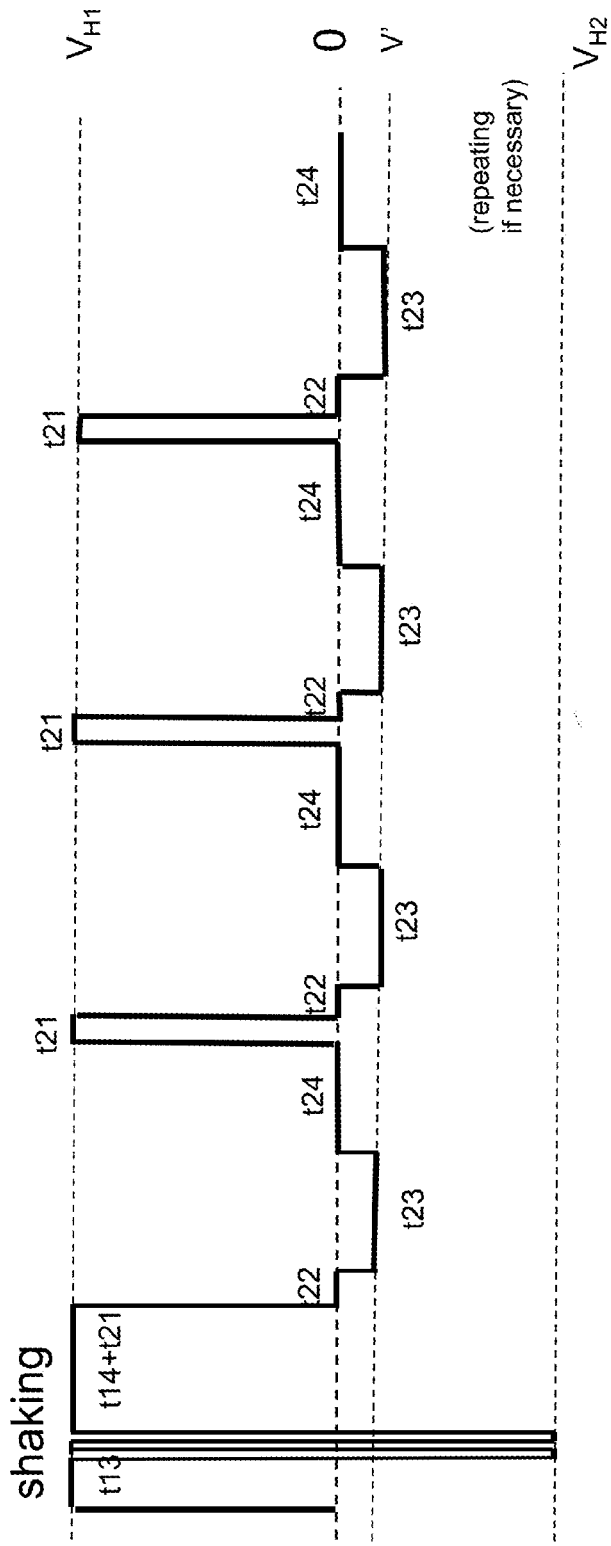

As already noted, the waveform of FIG. 21 may be used to replace the portion of the waveform of FIG. 14 occurring in period t15. FIG. 22 illustrates a waveform in which the portion of the waveform of FIG. 14 occurring in period t15 is replaced by three cycles of the waveform of FIG. 21 (more or fewer cycles may of course be used). In other words, the waveform of FIG. 22 comprises driving towards black for a period of t13 (cf. FIG. 14), a shaking waveform, driving towards black for a period of t14 (again, cf. FIG. 14), and then applying multiple cycles of the waveform of FIG. 21. As a general rule, the better the black state achieved at the end of period t14, the better the white state that will be displayed at the end of the waveform.

Figure 23:
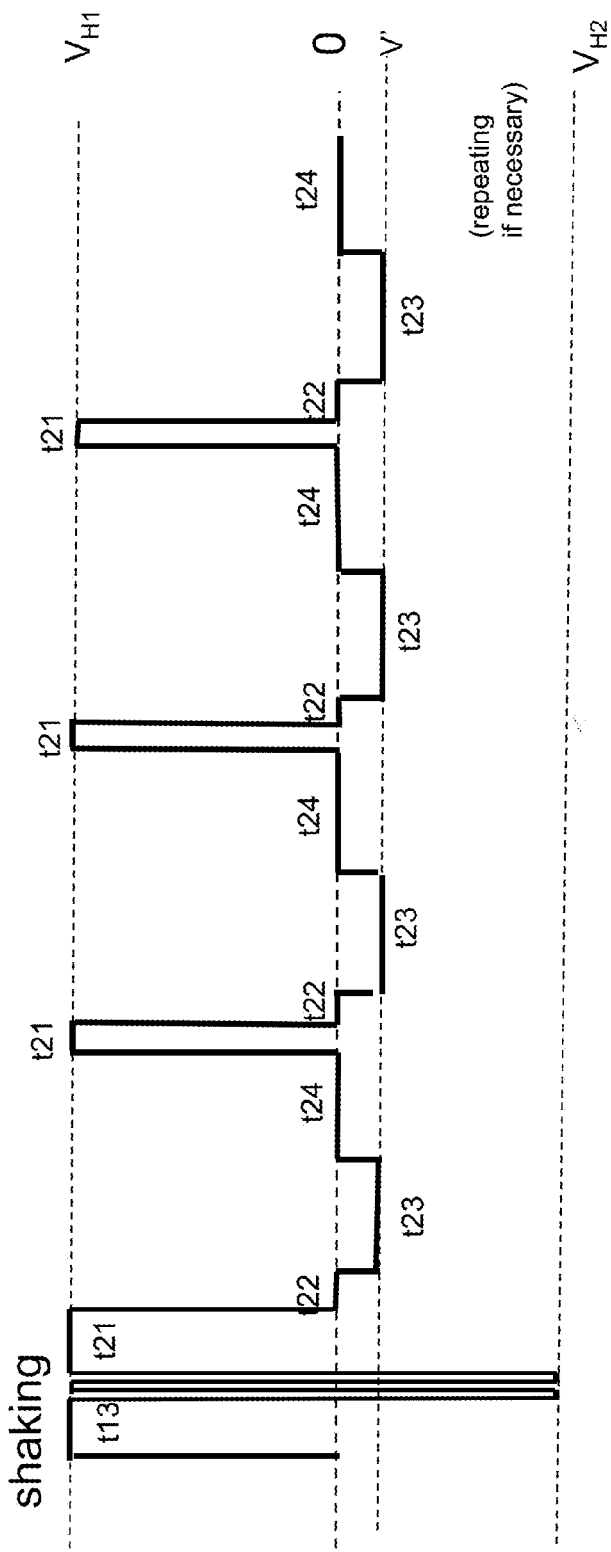

FIG. 23 illustrates a waveform similar to that of FIG. 22 but in which the step of driving towards the black state for the period of t14 is eliminated, so that the waveform of FIG. 23 transitions from the shaking waveform immediately to the waveform of FIG. 21. The waveforms of FIGS. 22 and 23 may each be DC balanced.

The driving method of FIG. 21 therefore can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:

(a) the five types of pigment particles have optical characteristics differing from one another;

(b) the first and second types of particles carry opposite charge polarities;

(c) the third and fourth types of particles carry the same charge polarity as the first type of particles, and the first type, the third type and the fourth type of particles have progressively lower magnitudes; and (d) the fifth type of particles carries the same charge polarity as the second type of particles but its magnitude is lower than that of the second type of particles, the method comprises the following steps:

(i) applying a first driving voltage to a pixel in the electrophoretic display for a first period of time to drive the pixel towards the color state of the first type of particles;

(ii) applying no driving voltage to the pixel for a second period of time;

(iii) applying a second driving voltage to the pixel for a third period of time, wherein the second driving voltage has the same polarity as the fifth type of particles and has a magnitude lower than that of the first driving voltage, to drive the pixel from the color state of the first type of particles towards the color state of the fifth type of particles to appear at the viewing side;

(iv) applying no driving voltage to the pixel for a fourth period of time; and repeating steps (i)-(iv).

In this method, the magnitude of the second driving voltage may be less than 50% of the magnitude of the first driving voltage. Steps (i)-(iv) may be repeated at least 2 times, preferably at least 4 times and more preferably at least 8 times. The method may further comprise a shaking waveform before step (i), and/or may further comprise driving the pixel to the color state of the first type of particles after the shaking waveform but prior to step (i). The lengths of the driving periods may be temperature dependent.

This driving method not only is particularly effective at a low temperature, but can also provide a display device better tolerance of structural variations caused during manufacture of the display device. Therefore its usefulness is not limited to low temperature driving.

Figure 24:
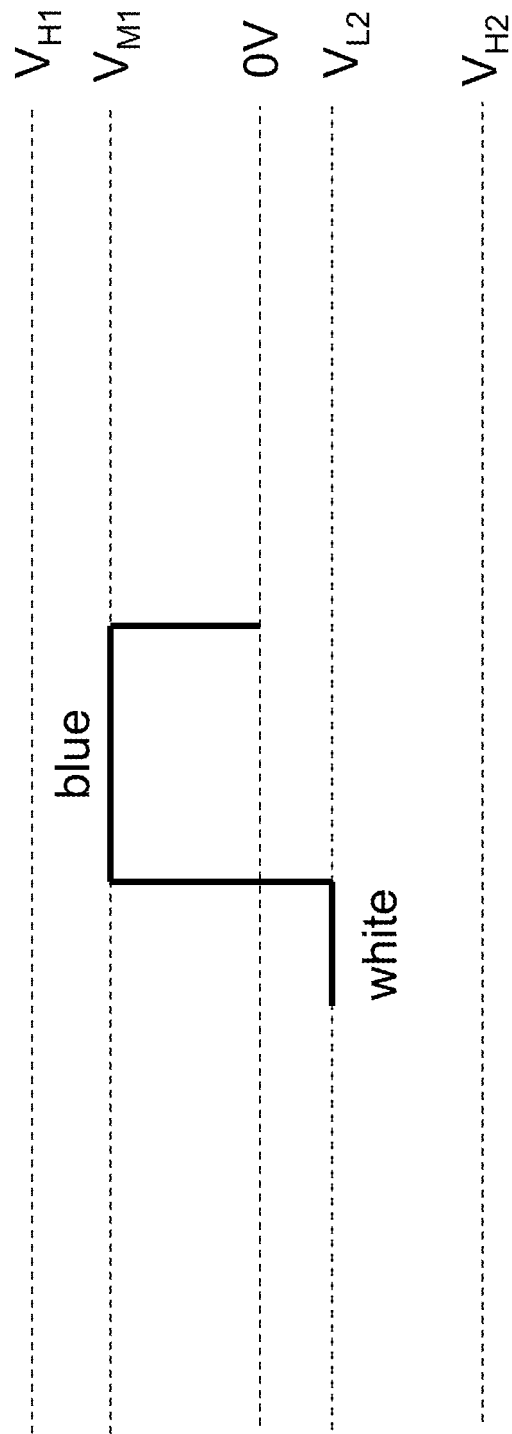
FIGS. 24-27 illustrate waveforms which can be used to cause the display layer shown in FIG. 1 to effect the transitions shown in FIG. 3-4 or 3-5 to display the blue color of the medium positive particles.

FIG. 24 illustrates a waveform which may be used to effect the white-to-blue (low negative to middle positive) transition of FIG. 3-4 or 3-5. The waveform of FIG. 24 is a "single pulse" waveform comprising a low negative driving voltage ($V_{L2}$, for example −3V) to drive the pixel to the white state shown on the left hand side of FIG. 3-4 or 3-5, followed by a medium positive driving voltage $V_{M1}$, for example +12V). The single pulse waveform shown in FIG. 24 can lead to a blue color state, with proper timing. The driving time for the single blue-going pulse may be in the range of about 100 to about 2,000 msec. If the pulse is applied for too long, the red particles may catch up with the blue particles adjacent the viewing surface of the display, which may cause some red contamination of the blue state.

Figure 25:
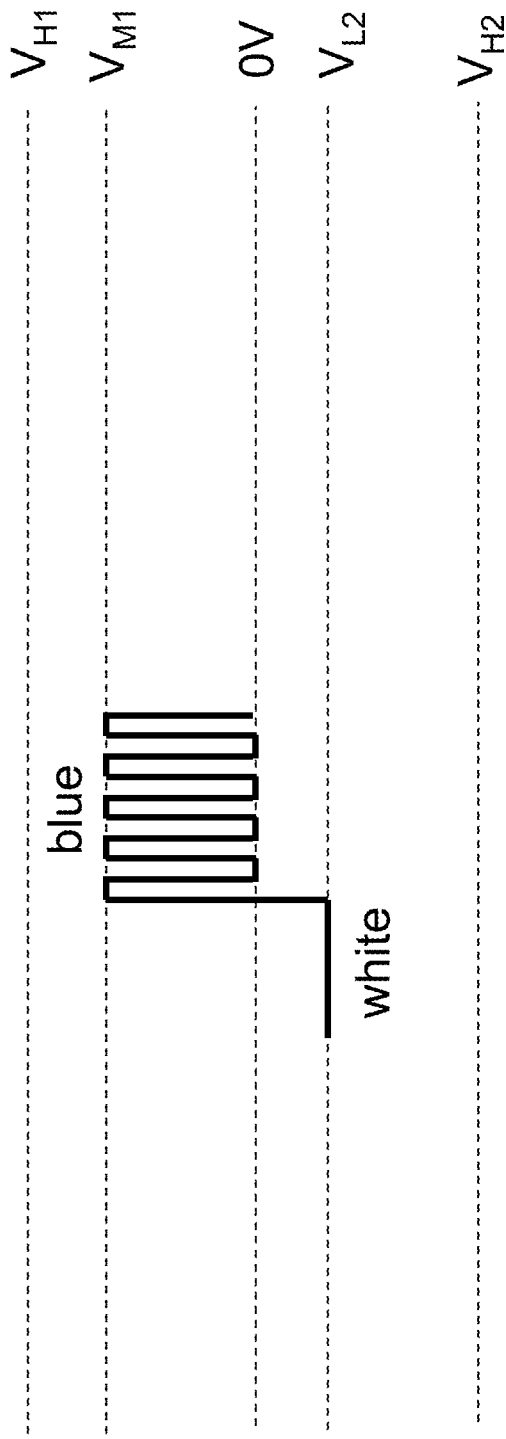

Alternatively, the white-to-blue transition of FIG. 3-4 or 3-5 may be effected using a pulsing waveform as shown in FIG. 25. The waveform of FIG. 25 begins with the same white-going pulse as the waveform of FIG. 24 but instead of the single blue-going pulse in the waveform of FIG. 24, the waveform of FIG. 25 has a series of short driving pulses of the medium positive driving voltage $V_{M1}$, alternating with periods of zero voltage. The medium positive driving voltage used in the waveform of FIG. 25 has a magnitude which may or may not be the same as that of the medium positive driving voltage used in the single pulse waveform of FIG. 24. In a waveform such as that of FIG. 25, there may be 10-200 cycles of pulsing. A pulsing waveform may lead to better color performance because it can prevent self-aggregation of the blue particles, which usually causes reduction of the hiding power of layers of such particles.

As already noted, the five particle system shown in FIGS. 1 and 3-1 to 3-5, has high, middle and low positive particles, and high and low negative particles. If the middle positive particles were replaced with middle negative particles, the color state of these middle negative particles could be displayed by a transition from the color state of the low positive particles using waveforms which are inverted versions of those shown in FIGS. 24 and 25.

The driving method for achieving the (blue) color state of the middle positive particles in the five particle system shown in FIGS. 1 and 3-4 to 3-5 may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of, all of which are dispersed in a solvent or solvent mixture, wherein:
  (a) the five types of pigment particles have optical characteristics differing from one another;
  (b) the first and second types of particles carry opposite charge polarities;
  (c) the third and fourth types of particles carry the same charge polarity as the first type of particles and the first type, the third type and the fourth type have progressively lower magnitudes; and
  (d) the fifth type of particles carries the same charge polarity as the second type of particles but their magnitude is lower than that of the second type of particles, the method comprises applying a driving voltage or a pulsing waveform with alternating a driving voltage and no driving voltage, to a pixel of the electrophoretic display, wherein the pixel is in the color state of the fifth type of particles and the driving voltage has the same polarity as the third type of particles, to drive the pixel from the color state of the fifth type of particles towards the color state of the third type of particles to appear at the viewing side.

Figure 26:
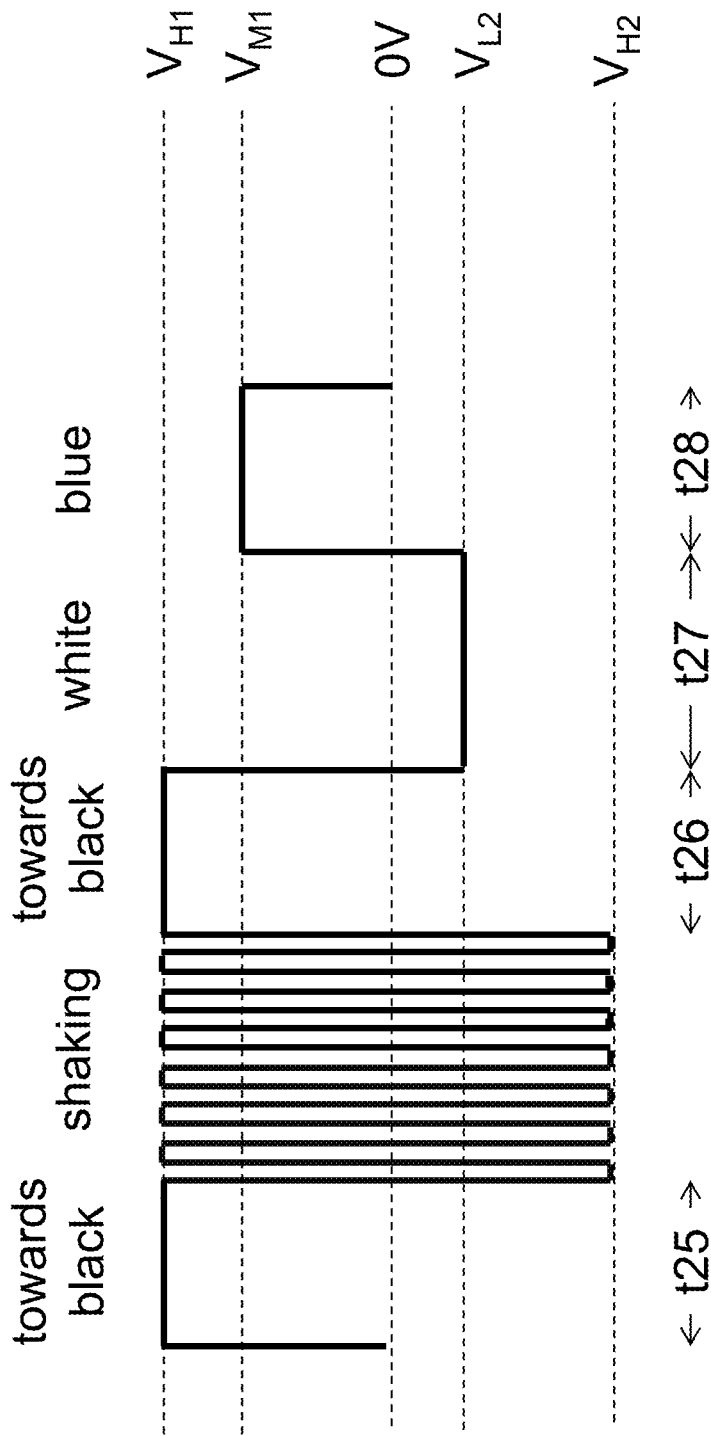
Figure 27:
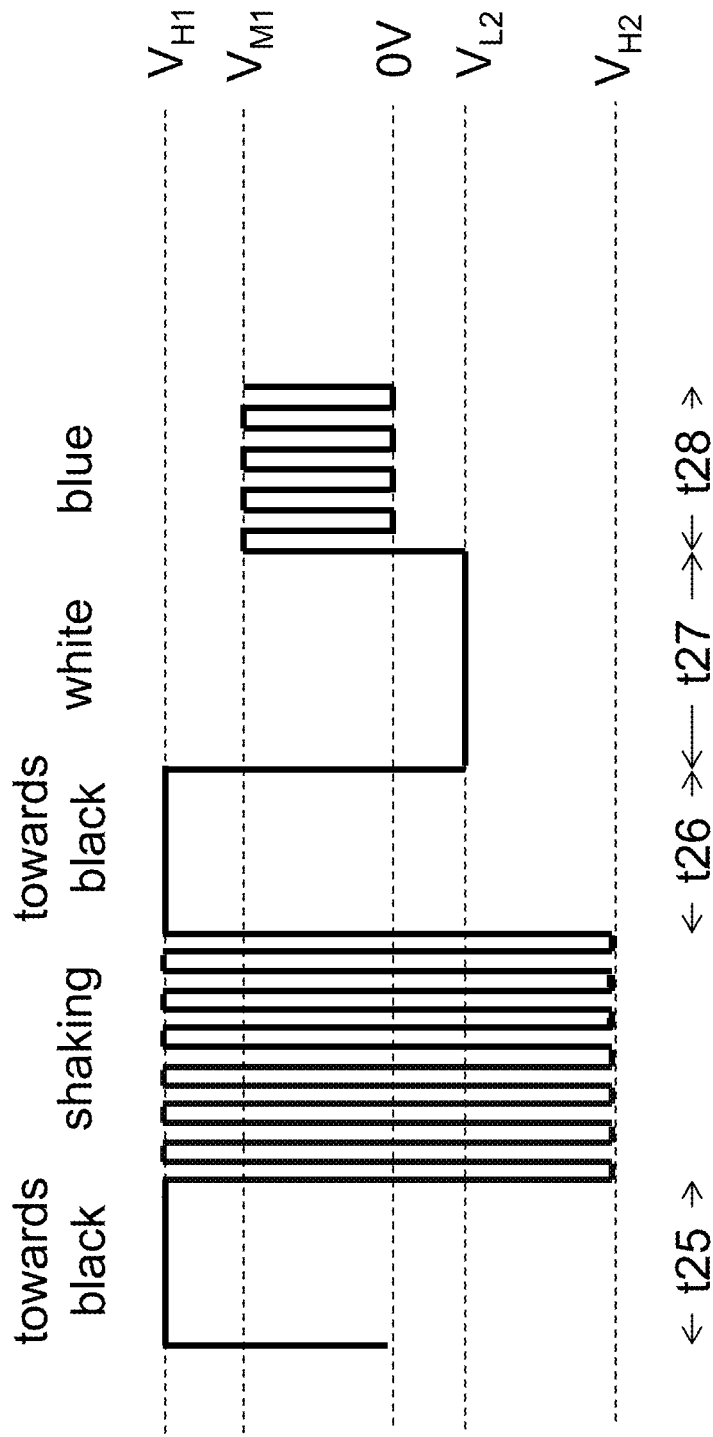

The white state needed for the white-to-blue transition of FIG. 3-4 or 3-5 can be achieved by any of the methods described above, and FIGS. 26 and 27 illustrate two possible waveforms for this purpose. The waveform of FIG. 26 is in effect a combination of the waveforms of FIGS. 14 and 24, while the waveform of FIG. 27 is in effect a combination of the waveforms of FIGS. 14 and 25.

The waveforms described above make use of three levels of positive driving voltage, high positive ($V_{H1}$), medium positive ($V_{M1}$) and low positive ($V_{L1}$), and two levels of negative driving voltage, high negative ($V_{H2}$) and low negative ($V_{L2}$). The medium positive driving voltage ($V_{M1}$) may be 40% to 100%, preferably 50% to 90%, of the high positive driving voltage ($V_{H1}$) and the low positive driving voltage ($V_{L1}$) may be 5% to 50%, preferably 15% to 40%, of the high positive driving voltage ($V_{H1}$). The low negative driving voltage ($V_{L2}$) may be 10% to 90%, preferably 30% to 70%, of the high negative driving voltage ($V_{H2}$).

If the middle positive particles were replaced with middle negative particles, three levels of negative driving voltage, high negative, medium negative and low negative, and two levels of positive driving voltage, high positive and low positive would be required. In such a case, the medium negative driving voltage ($V_{M2}$) may be 40% to 100%, preferably 40% to 90%, of the high negative driving voltage ($V_{H2}$) and the low negative driving voltage ($V_{L2}$) may be 5% to 50%, preferably 10% to 45%, of the high negative driving voltage ($V_{H2}$). The low positive driving voltage ($V_{L1}$) may be 5% to 95%, preferably 25% to 75%, of high positive driving voltage ($V_{H1}$).

The "high" driving voltage (positive or negative) referred to above is usually the driving voltage required to drive a pixel from a color state of one type of the high charged particles to a color state of another type of high charged particles of opposite polarity. For example, in the system shown in FIGS. 1 and 3-1 to 3-5, a high driving voltage ($V_{H1}$ or $V_{H2}$) is defined as a driving voltage which is sufficient to drive a pixel from the black color state to the yellow color state, or vice versa (see FIG. 3-1).

In all embodiments of the present invention, since the five color states are controlled by varying voltage levels and each particle type/color can occupy 100% of the pixel area at a particular driving voltage, the brightness of each individual color state is not compromised. This type of full color electrophoretic display will provide not only non-compromised white and black states, but also non-compromised color states of other colors, such as red, green and blue.

In the specific systems described above, each pixel can display five color states, so that the system is a 5-CP system. More color states may be displayed if a pixel consists of multiple sub-pixels each capable of displaying five color states. For example, if each pixel has three sub-pixels, one of the five color states may be displayed by the pixel if all three sub-pixels display that color. If the three sub-pixels display red, blue and black color states respectively, the pixel will display a magenta color state. If the three sub-pixels display green, blue and black color states respectively, the pixel will display a cyan color state. If the three sub-pixels display red, green and black color states respectively, the pixel will display a yellow color state. More color states may be displayed through adjusting driving waveforms or by using various image processing techniques.

The electrophoretic medium used in the present invention may be unencapsulated, microencapsulated, a polymer-dispersed electrophoretic medium or in microcells or other display cells, for example as described in U.S. Pat. No. 6,930,818, or in microchannels or equivalents, regardless of their shapes or sizes.

Electrophoretic layers of the present invention using six different types of particles (6-CP systems), and driving methods for such electrophoretic layers, will now be described. Such layers differ from the five particle systems previously described in that they have three positive and three negative types of particles, and thus contain both middle positive and middle negative particles.

Figure 28:
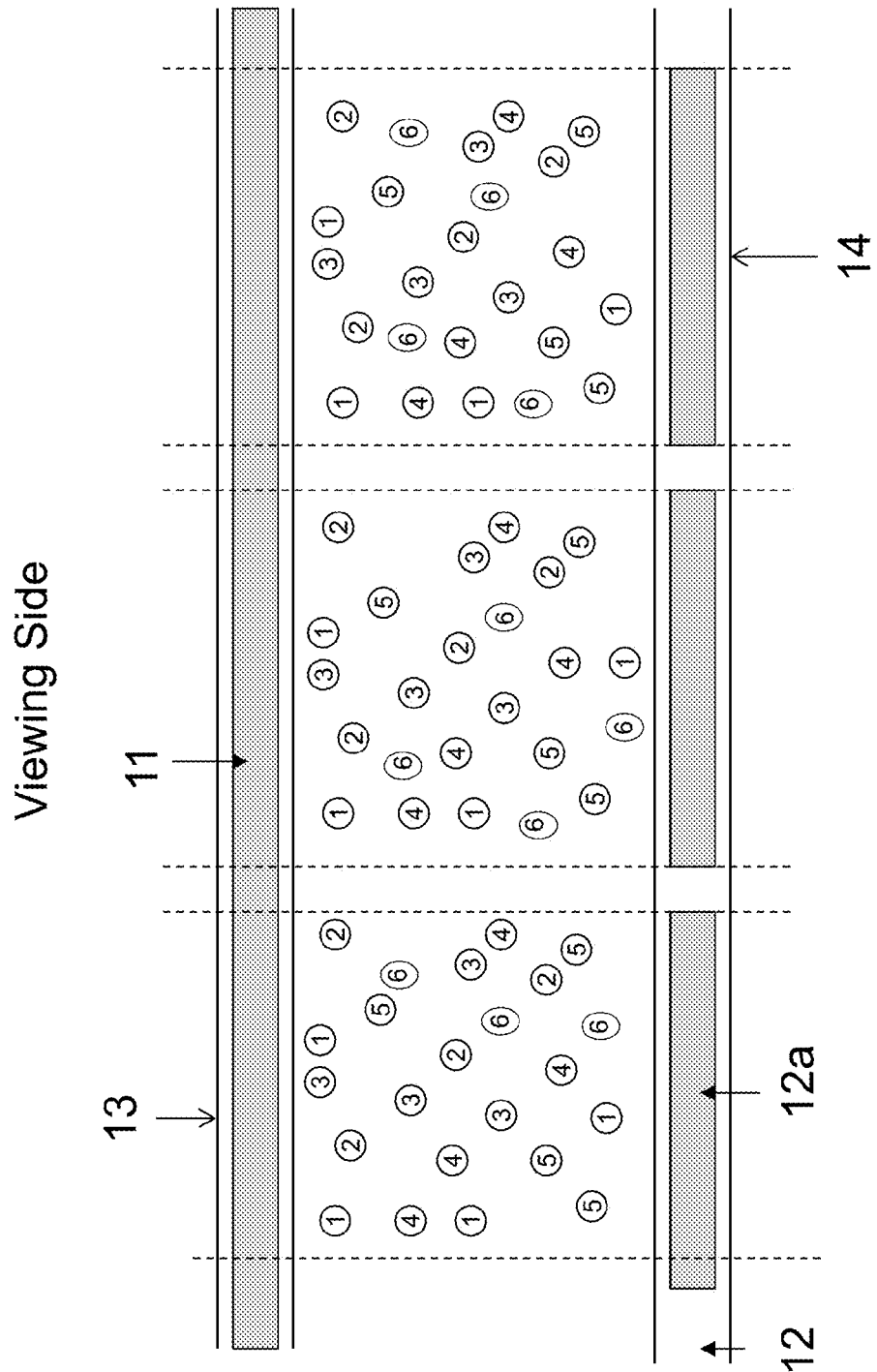
FIG. 28 is a schematic cross-section similar to that of FIG. 1, but taken through a display layer containing six different types of particles which can display six different color states.

FIG. 28 is a schematic cross-section similar to that of FIG. 1, but taken through a display layer containing six different types of particles (designated respectively by numbers 1-6 within circles) which can display six different color states. In addition to the high positive black, middle positive blue, low positive red, high negative yellow and low positive white of the electrophoretic layer shown in FIG. 1, the electrophoretic layer of FIG. 28 contains middle negative green (G) particles.

Figures 1, 29:
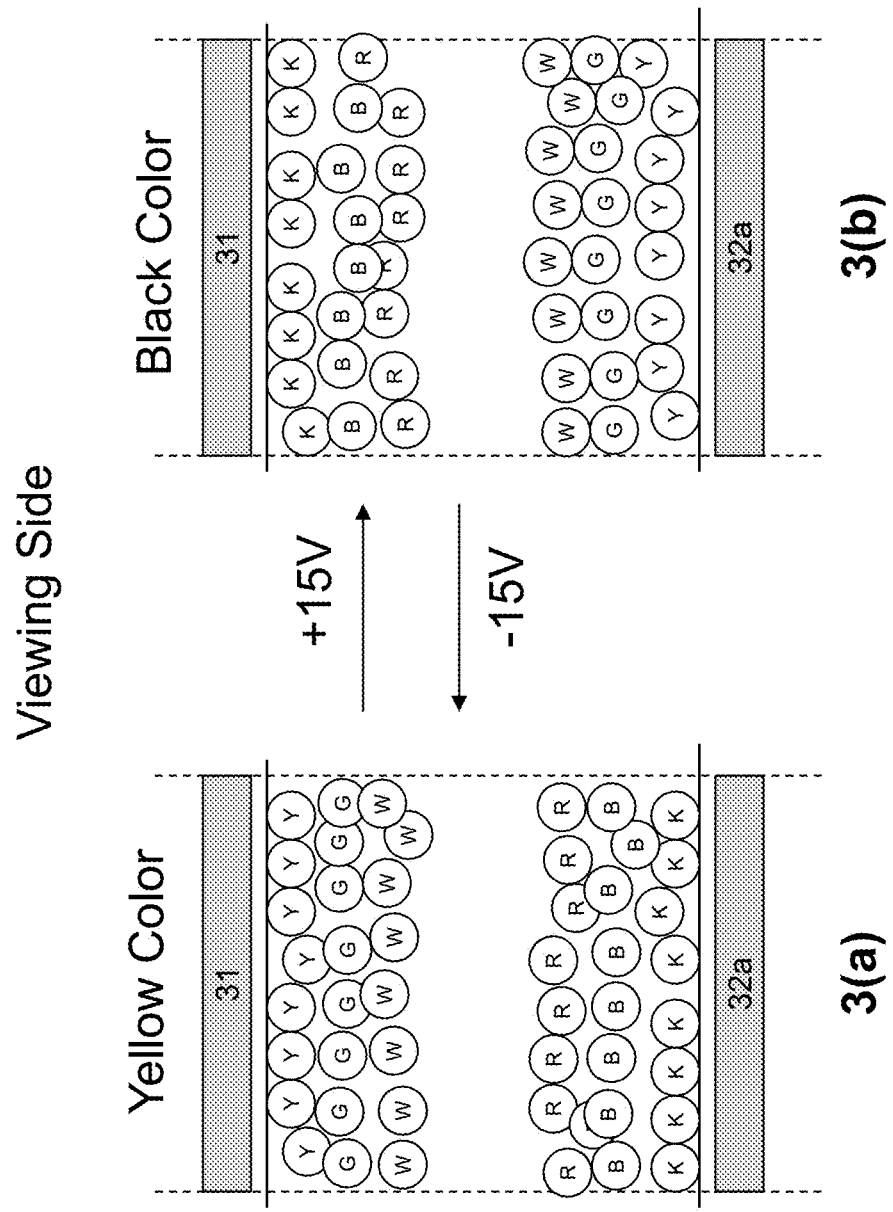
Figures 2, 29:
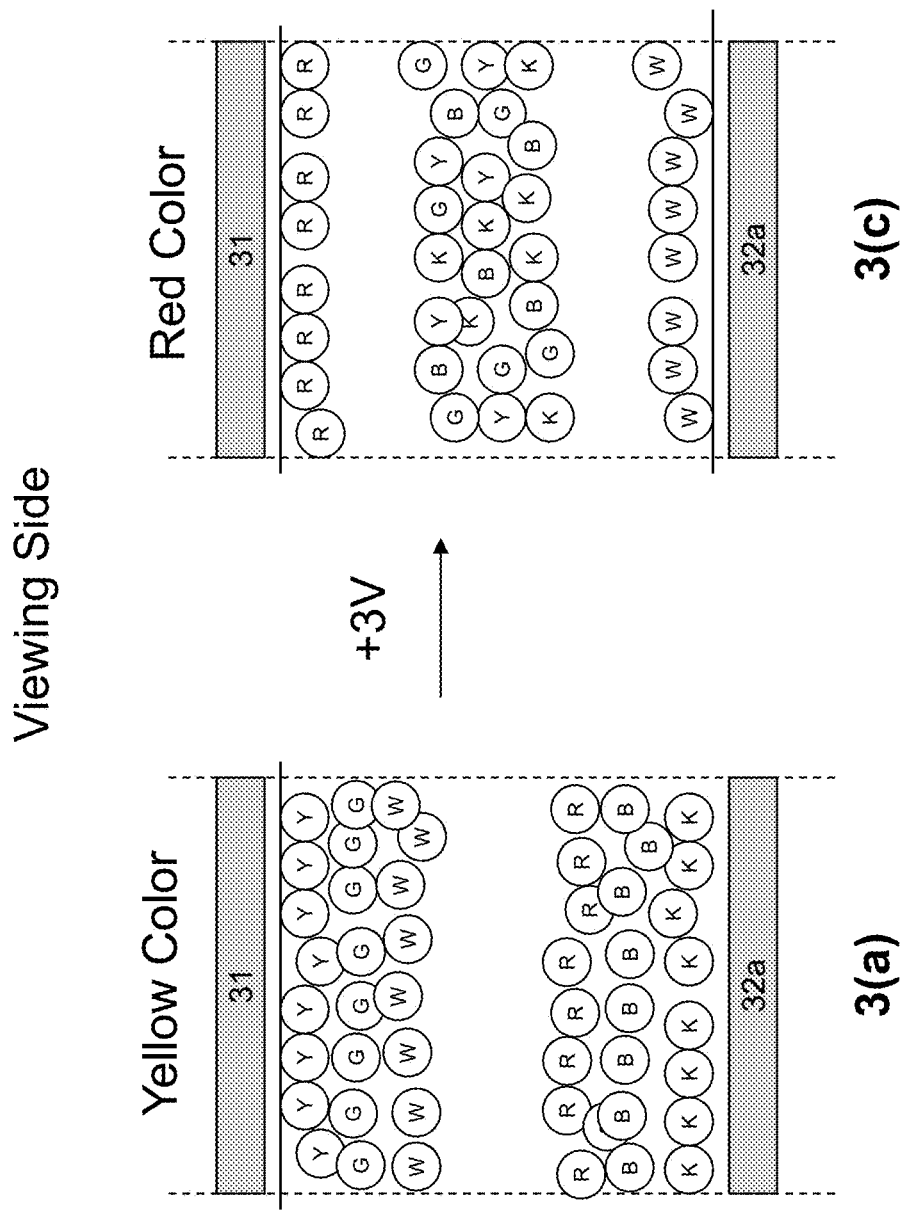
Figures 3, 29:
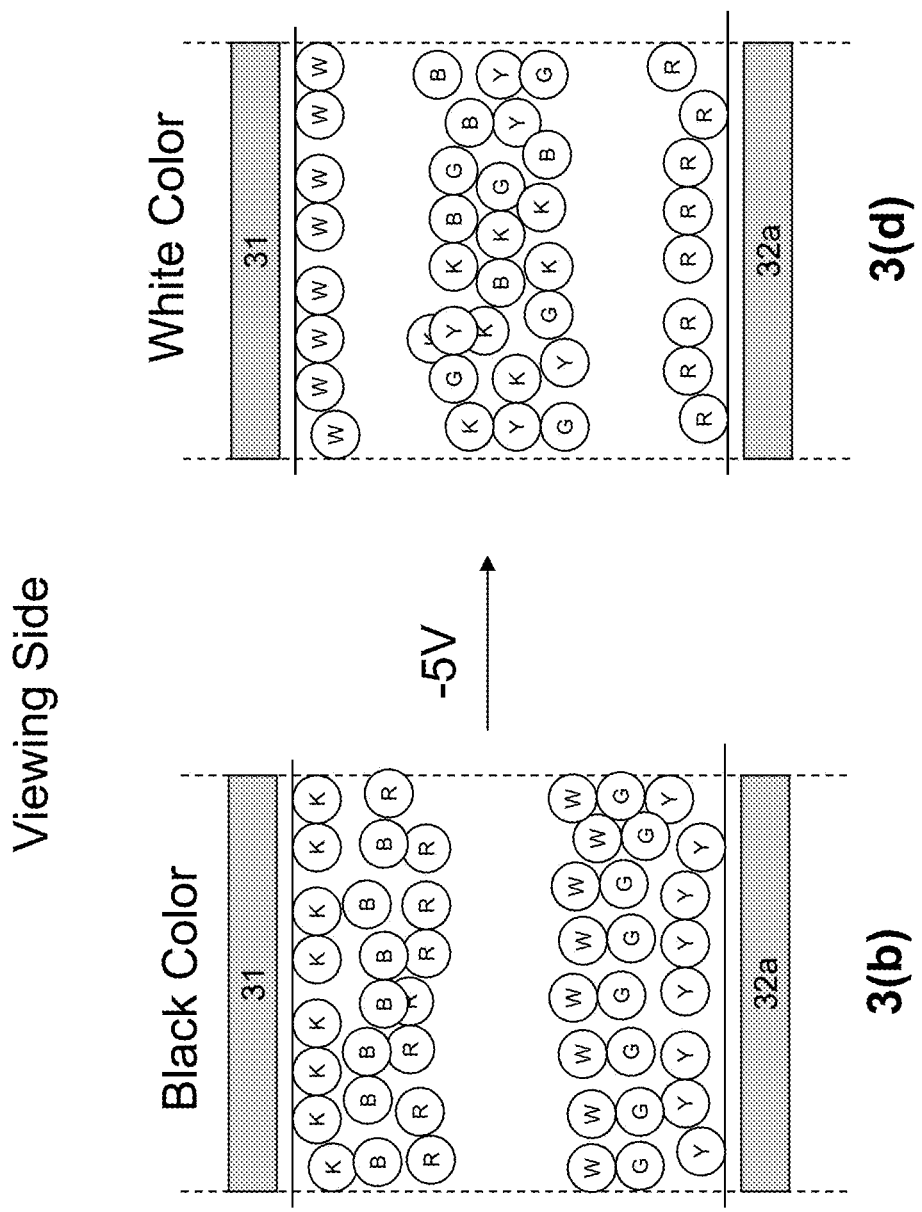
Figures 4, 29:
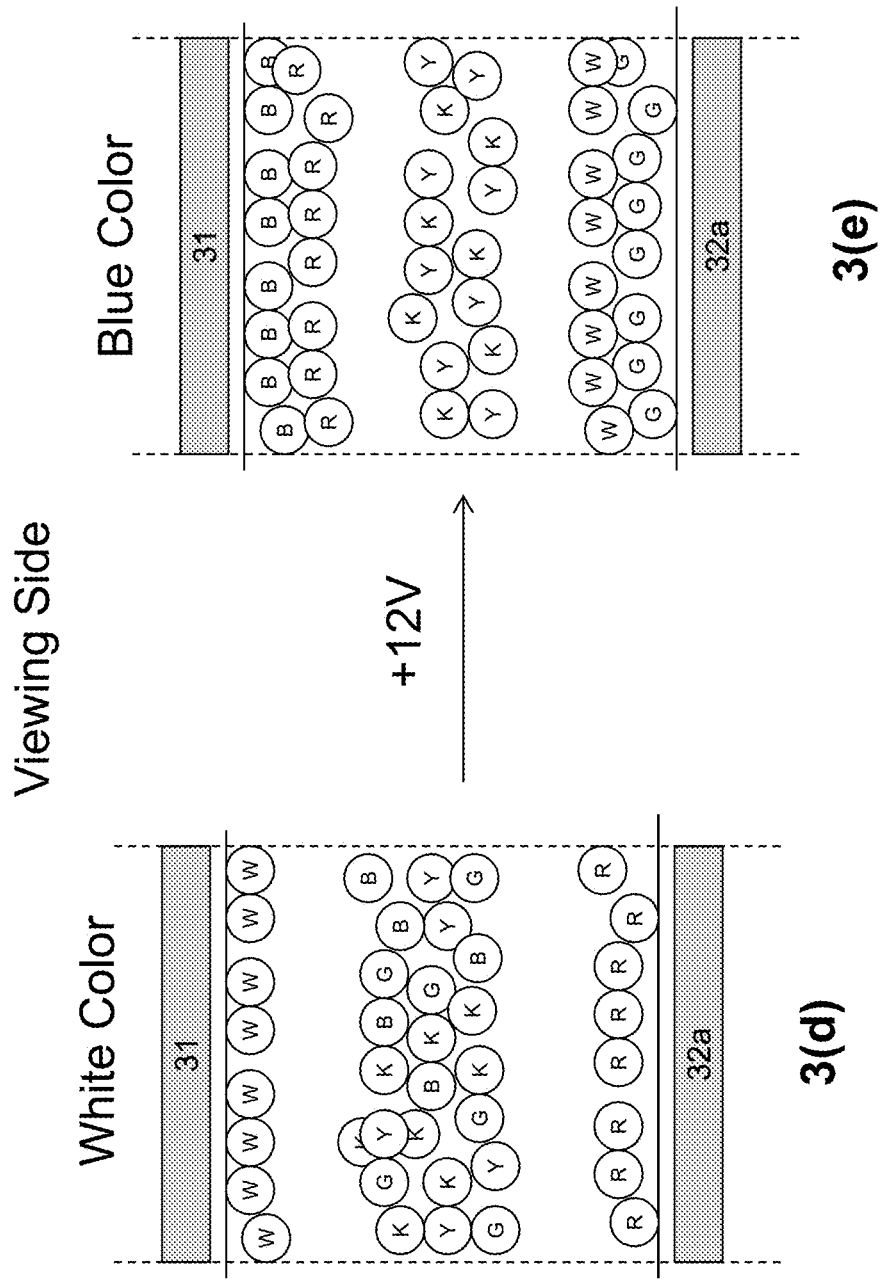
Figures 5, 29:
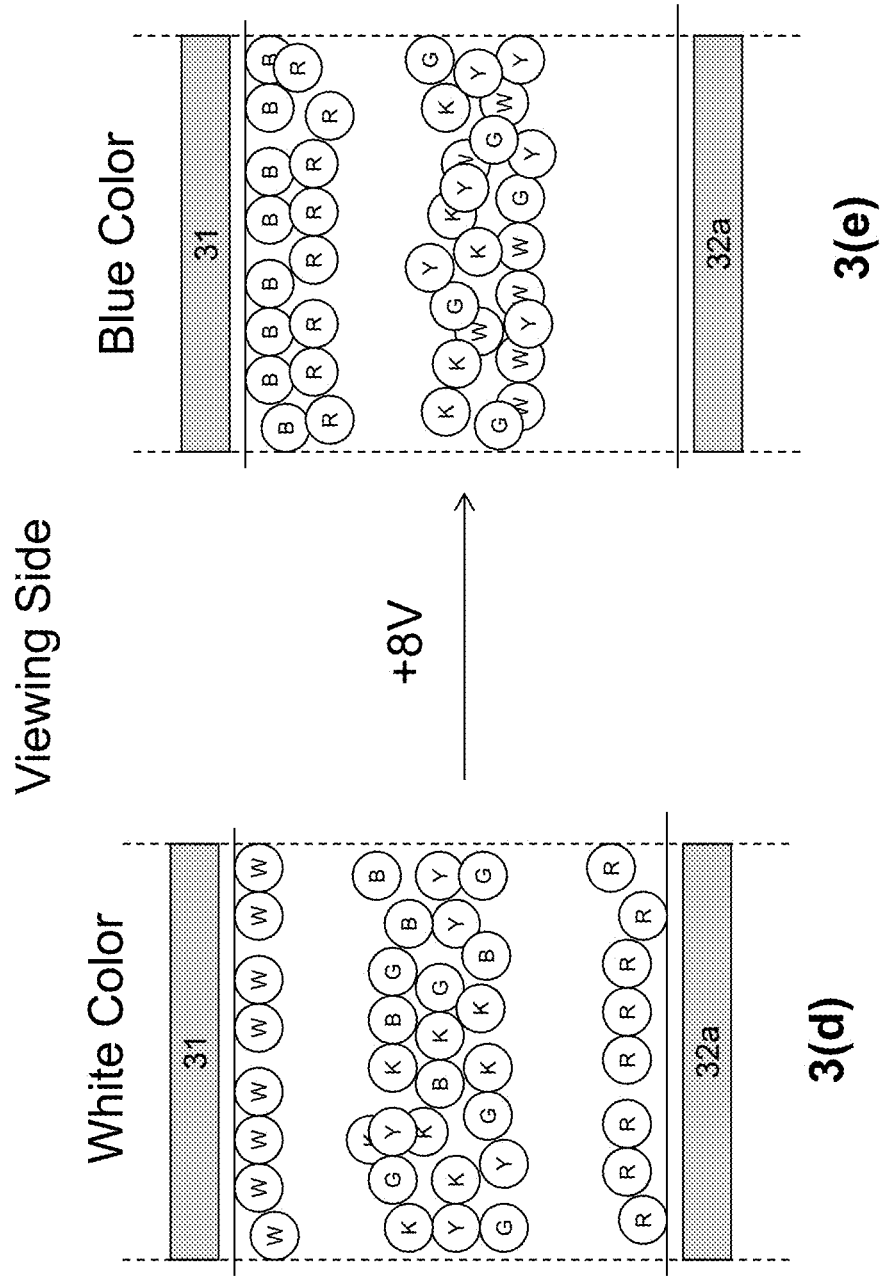
Figures 6, 29:
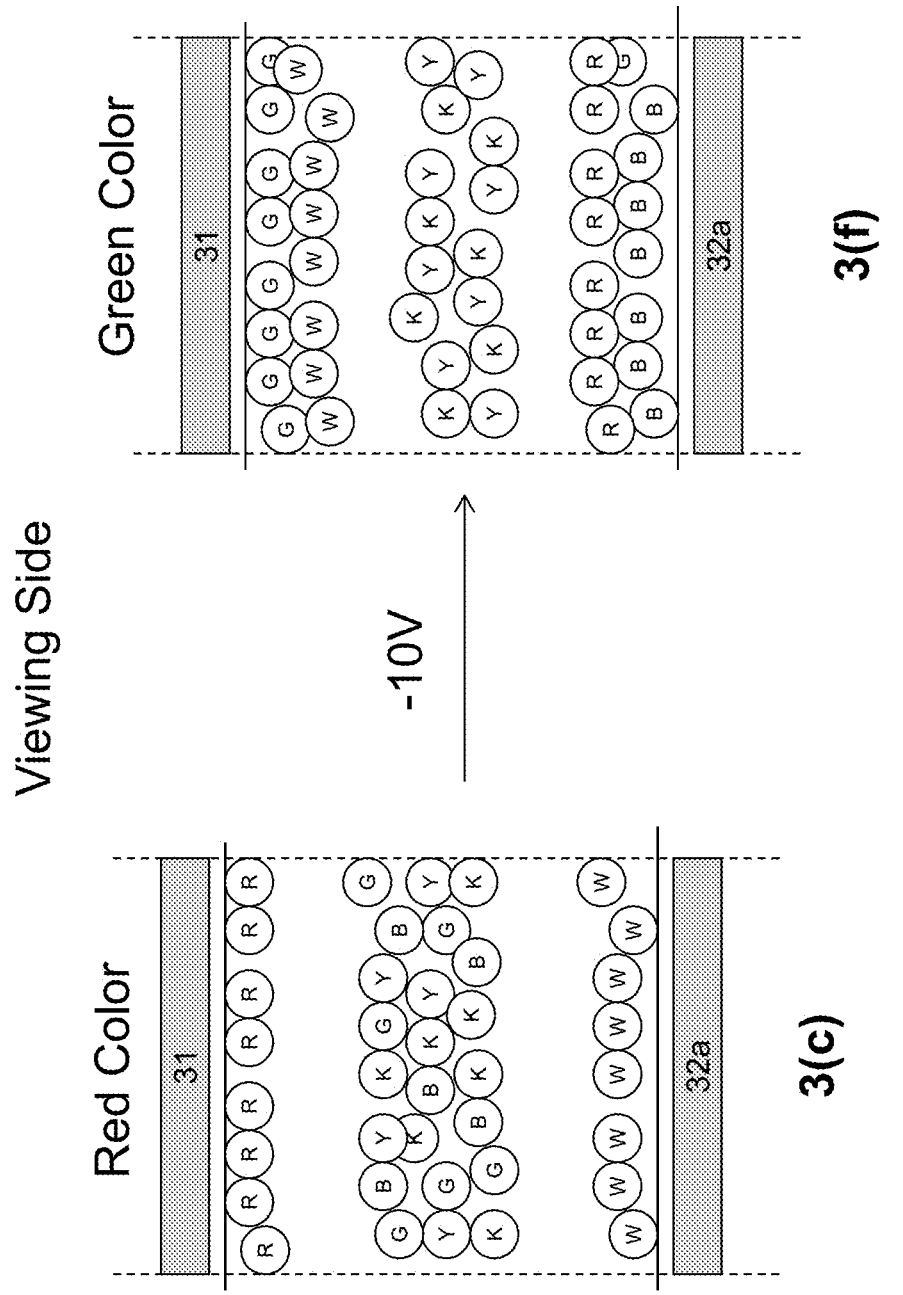
Figures 7, 29:
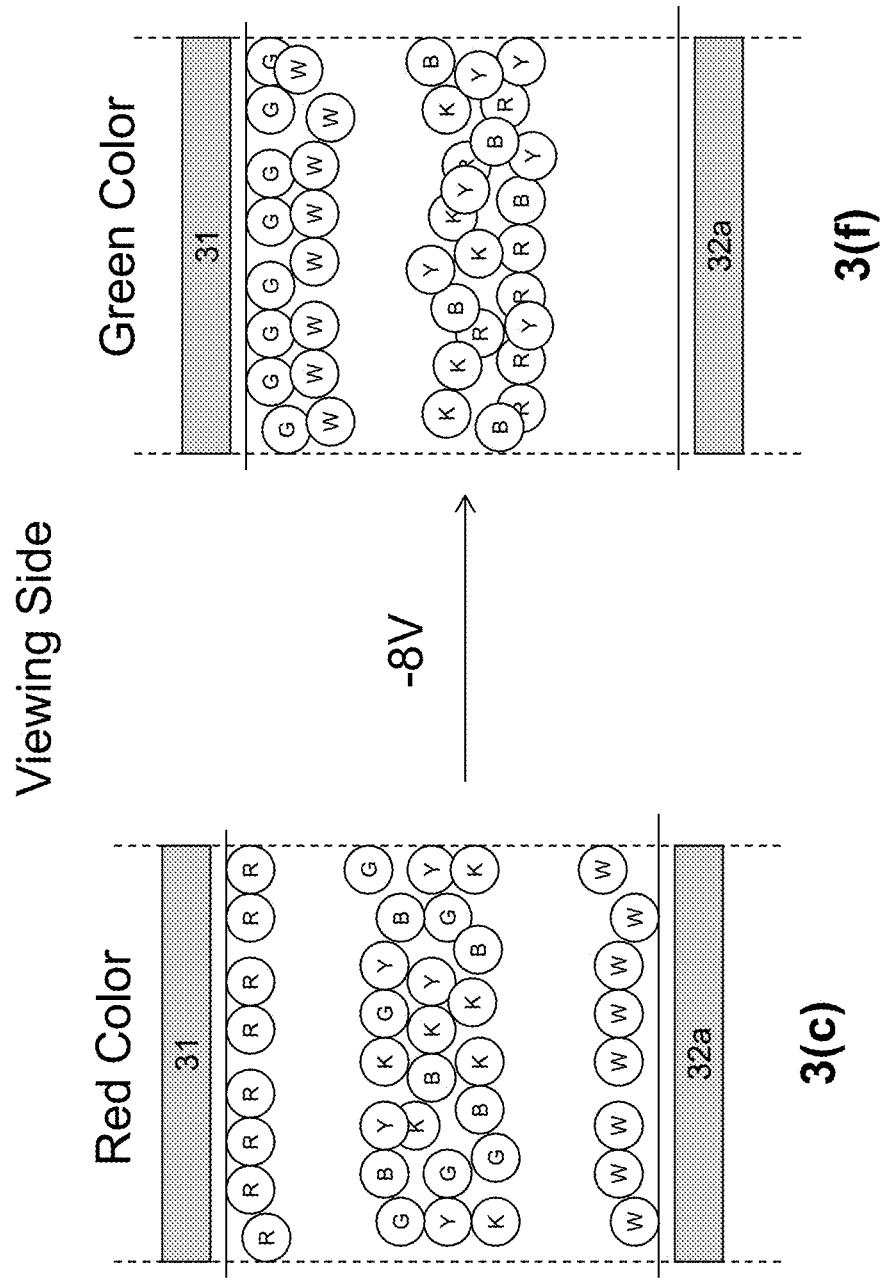

FIGS. 29-1 to 29-5 are schematic cross-sections similar to those of FIGS. 3-1 to 3-5 respectively and illustrating the same transitions. The driving voltages and the positions of the black, yellow, blue, red and white particles in FIGS. 29-1 to 29-5 are essentially identical to those in FIGS. 3-1 to 3-5 respectively; the positions of the green particles are as follows:

(a) in the yellow state shown in FIG. 29-1, the green particles lie between the yellow and white particles adjacent the common electrode;

(b) in the black state shown in FIG. 29-1, the green particles lie between the yellow and white particles adjacent the pixel electrode;

(c) in the black state shown in FIG. 29-2, the green particles are admixed with the yellow, black and blue particles in the pack intermediate the pixel and common electrodes;

(c) in the white state shown in FIG. 29-3, the green particles are again admixed with the yellow, black and blue particles in the pack intermediate the pixel and common electrodes;

(d) in the blue state shown in FIG. 29-4, the green particles lie between the pixel electrode and the white particles (so that a green color is displayed at the pixel electrode, if visible); and (e) in the blue state shown in FIG. 29-5, the green particles are admixed with the yellow, black and white particles in the pack intermediate the pixel and common electrodes (so that a mixture of colors of these four particles would be displayed at the pixel electrode, if visible).

In FIG. 29-4, depending upon the charges on the white and green particles and the specific driving voltage used, it is possible that only the white particles escape from the pack and that the green particles remain with the black and yellow particles, so that a white color is displayed at the pixel electrode, if visible. For reasons already discussed, whether the pixel electrode surface displays a green or a white color will normally be of little practical consequence.

FIGS. 29-6 and 29-7 illustrate the manner in which the middle negative (green) particles are displayed at the viewing surface of the display shown in FIG. 28. By comparing FIGS. 29-6 and 29-7 with FIGS. 29-4 and 29-5 respectively, it will be seen that the method for displaying the middle negative (green) particles is essentially the inverse of that used to display the middle positive (blue) particles. Thus, instead of starting from the color of the low negative (white) particles, the process for displaying the green particles starts from the low positive (red) state 3(*c*) shown in FIG. 29-2 and repeated on the left sides of FIGS. 29-6 and 29-7. In FIG. 29-6, a medium negative voltage ($V_{M2}$, e.g., −10V) is applied to the pixel electrode (i.e., the common electrode is made moderately positive with respect to the pixel electrode). The medium negative driving voltage causes the white particles to move away from the pixel electrode and the red particles to move away from the common electrode, thereby tending to cause all six types of particles to meet and form a "pack" intermediate the common and pixel electrodes. The medium voltage applied is not sufficient to separate the high positive black from the high negative yellow particles in the pack, but (unlike the situation with the low driving voltage used in FIG. 29-2) is sufficient to cause the middle negative green particles to break away from the pack and move towards the common electrode. The low negative white particles also separate from the high positive black particles and move towards the common electrode. However, the middle negative green particles move faster than the low negative white particles and arrive adjacent the common electrode first, so that the pixel displays a green color at the viewing surface. Similarly, both the low positive red particles and the middle positive blue particles separate from the high negative yellow particles and move adjacent the pixel electrode, to produce the state illustrated at 3(*f*) in FIG. 29-6. The middle positive blue particles will normally move faster than the low positive red particles, so that a blue color will be displayed at the pixel electrode, if visible.

FIG. 29-7 shows an alternative method of effecting the same red-to-green transition as in FIG. 29-6. The difference between FIGS. 29-6 and 29-7 is that in the latter the medium negative driving voltage is reduced from −10 to −8V, with the result that, although the green and white particles separate from the pack in the same way as in FIG. 29-6, the electric field generated by the driving voltage of −8V is not sufficient to separate the low positive red particles or the middle positive blue particles from the high negative yellow particles, so that the black, yellow, red and blue particles remain in a pack intermediate the common and pixel electrodes. A green color is still displayed at the viewing surface but the pixel electrode surface (if visible) will display the color of a mixture of black, yellow, red and blue particles, rather than the blue state displayed at this surface in FIG. 29-6. For most practical purposes, this difference is of no consequence.

Scenarios of the type illustrated in FIGS. 3-5, 29-5 and 29-7 are possible because the magnitude of the charge on the middle negative green particles need not be the same as that on the middle positive blue particles, and the magnitude of the charge on the low negative white particles need not be the same as that on the low positive red particles. Indeed, there is a third possibility for the red-to-green transition which is not shown in either FIG. 29-6 or 29-7. Because the blue particles carry a greater charge than the red particles, it is possible to have a situation which might be regarded as intermediate those shown in FIGS. 29-6 and 29-7, in which only the red particles escape from the pack, the blue particles remaining within the pack, so that a red color is displayed at the pixel electrode.

The transitions illustrated in FIGS. 29-1 to 29-5 can be effected using appropriate ones of the waveforms illustrated in FIGS. 4-27 as previously described with reference to FIGS. 3-1 to 3-5 since the only differences between the transitions of FIGS. 3-1 to 3-5 on the one hand and FIGS. 29-1 to 29-5 on the other is the positions of the green particles, which have already been explained. Accordingly, it is now only necessary to discuss waveforms needed for the red-to-green transitions of FIGS. 29-6 and 29-7, and this will now be done with reference to FIGS. 30-33.

Figure 30:
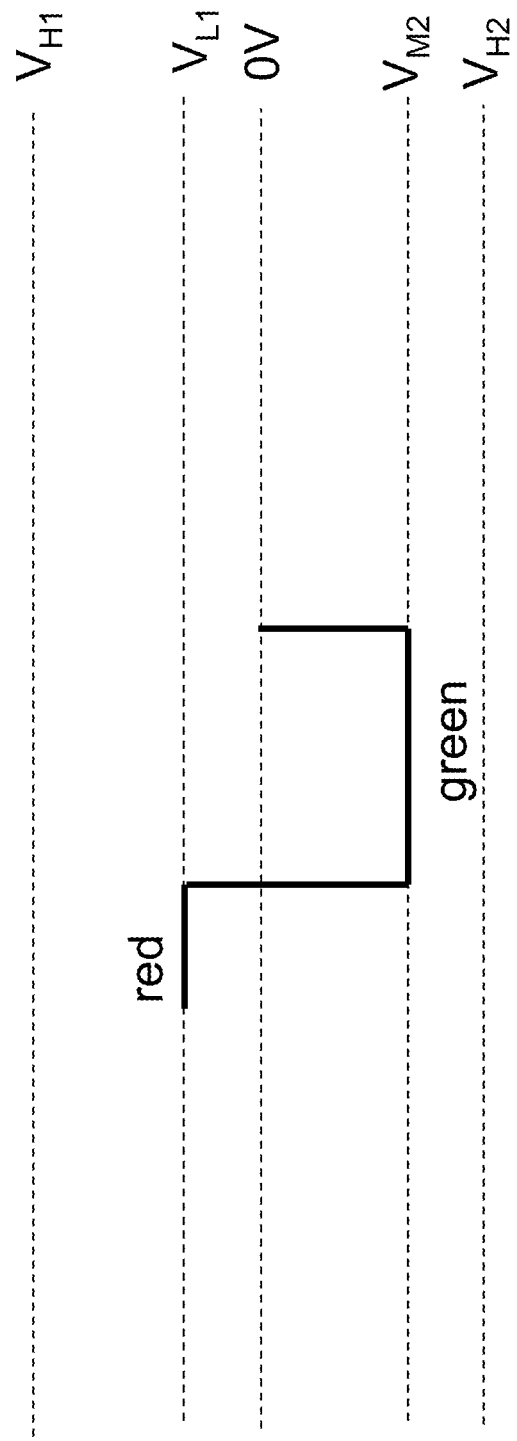
FIGS. 30-33 illustrate waveforms which can be used to cause the display layer shown in FIG. 28 to effect the transitions shown in FIG. 29-6 or 29-7 to display the green color of the medium negative particles.

FIG. 30 illustrates a waveform which may be used to effect the red-to-green (low positive to middle negative) transition of FIG. 29-6 or 29-7. The waveform of FIG. 30, which is essentially an inverted version of the waveform of FIG. 24, is a "single pulse" waveform comprising a low positive driving voltage ($V_{L1}$, for example +3V) to drive the pixel to the red state shown on the left hand side of FIG. 29-6 or 29-7, followed by a medium negative driving voltage $V_{M2}$, for example −12V). The single pulse waveform shown in FIG. 30 can lead to a green color state, with proper timing. The driving time for the single green-going pulse may be in the range of about 100 to about 2,000 msec. If the pulse is applied for too long, the white particles may catch up with the green particles adjacent the viewing surface of the display, which may cause some reduction is saturation of the green state.

Figure 31:
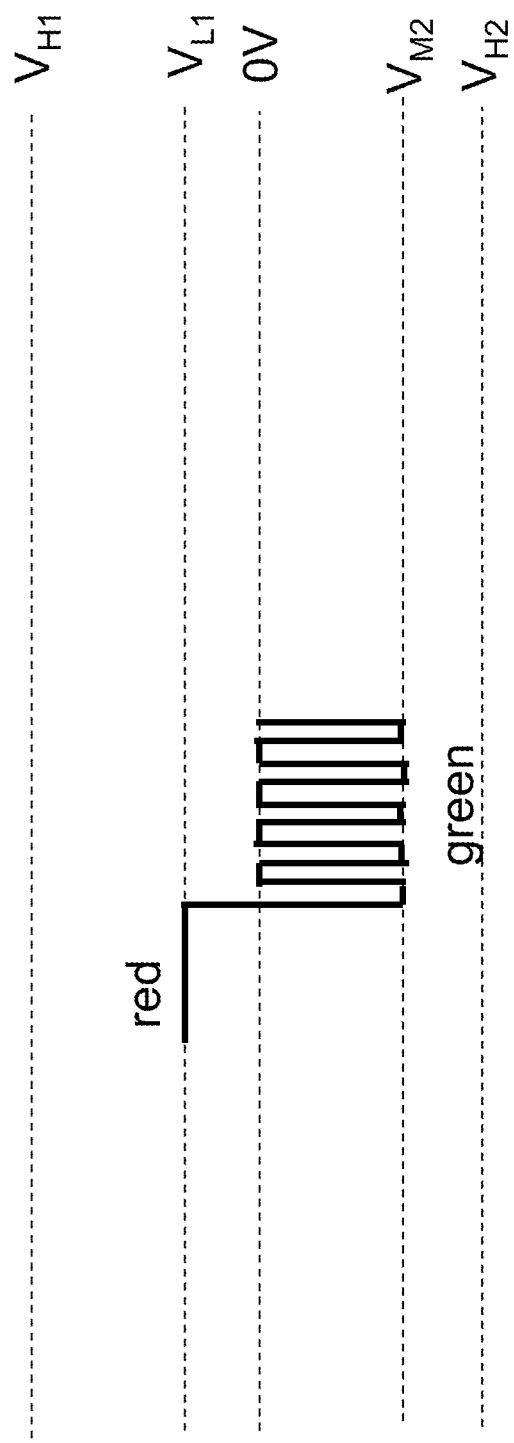

Alternatively, the red-to-green transition of FIG. 29-6 or 29-7 may be effected using a pulsing waveform as shown in FIG. 31. The waveform of FIG. 31 begins with the same red-going pulse as the waveform of FIG. 30 but instead of the single green-going pulse in the waveform of FIG. 30, the waveform of FIG. 31 has a series of short driving pulses of the medium negative driving voltage $V_{M2}$, alternating with periods of zero voltage. The medium negative driving voltage used in the waveform of FIG. 31 has a magnitude which may or may not be the same as that of the medium negative driving voltage used in the single pulse waveform of FIG. 30. In a waveform such as that of FIG. 31, there may be 10-200 cycles of pulsing. A pulsing waveform may lead to better color performance because it can prevent self-aggregation of the green particles, which usually causes reduction of the hiding power of layers of such particles.

Figure 32:
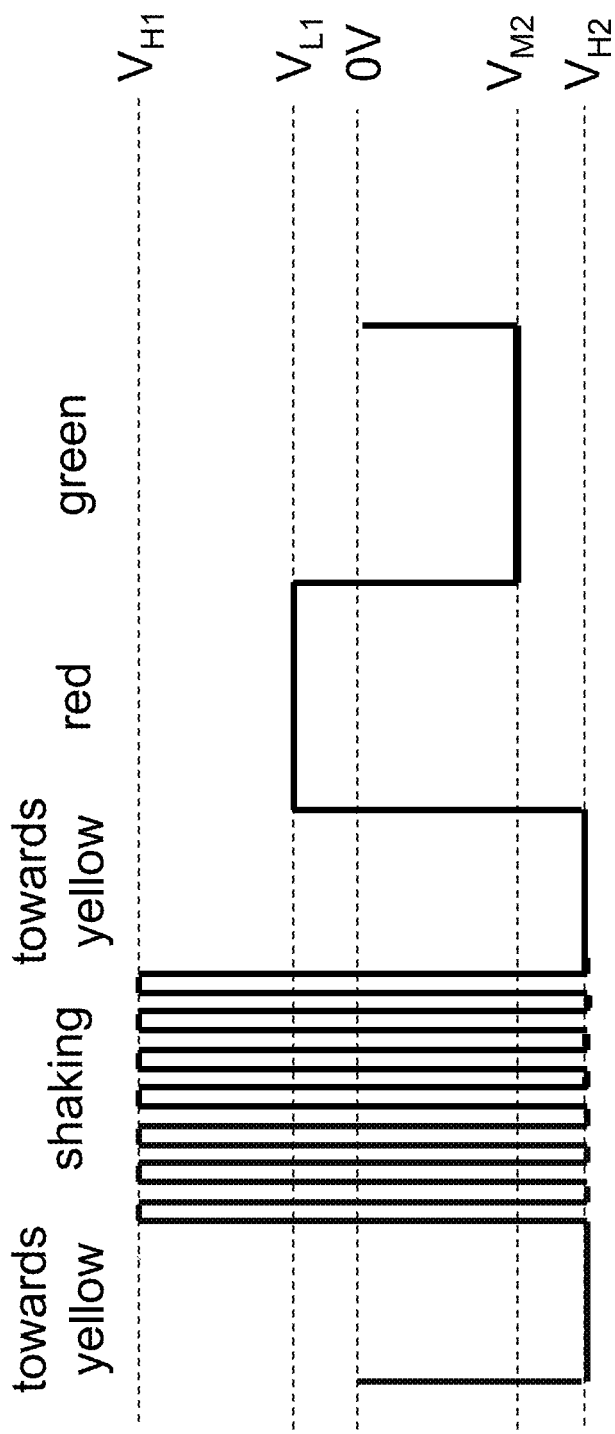
Figure 33:
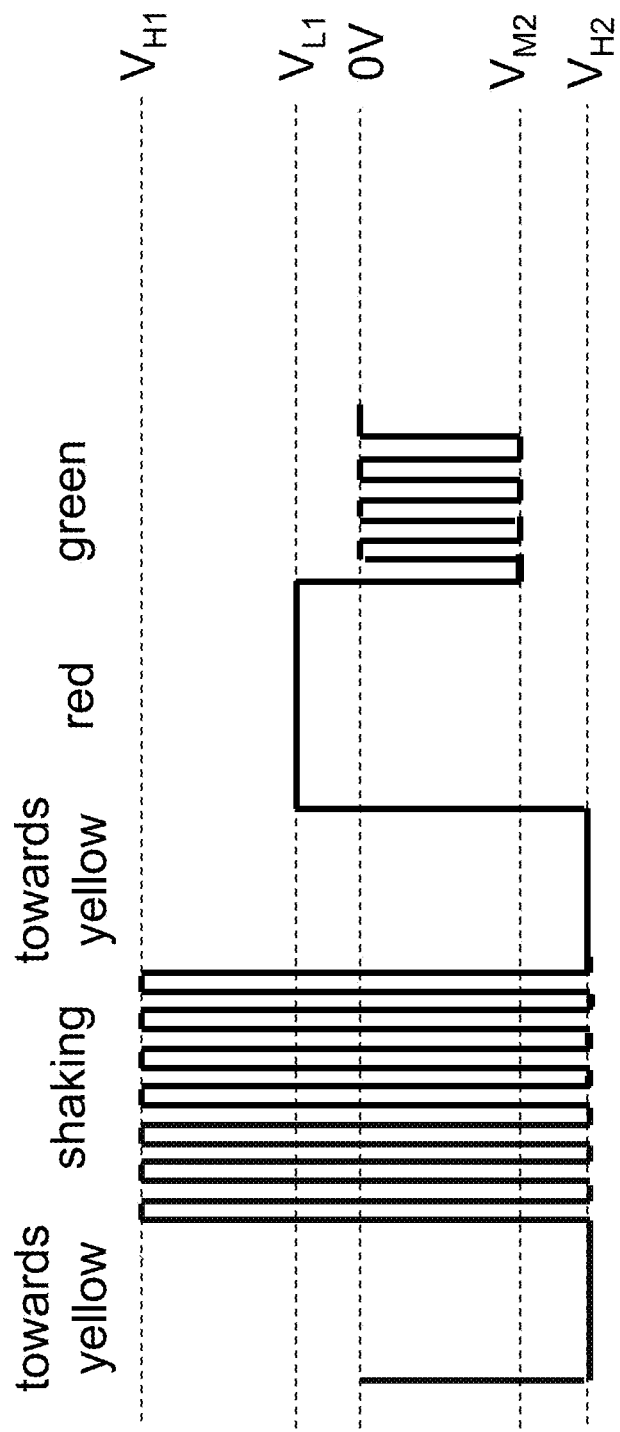

The red state needed for the red-to-green transition of FIG. 29-6 or 29-7 can be achieved by any of the methods described above, and FIGS. 32 and 33 illustrate two possible waveforms for this purpose. The waveform of FIG. 32 is in effect a combination of the waveforms of FIGS. 4 and 30, while the waveform of FIG. 33 is in effect a combination of the waveforms of FIGS. 4 and 31.

Methods for effecting transitions such as those shown in FIGS. 29-6 and 29-7 can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles, a fifth type of particles and a sixth type of particles, all of which are dispersed in a solvent or solvent mixture, wherein:

(a) the six types of pigment particles have optical characteristics differing from one another;

(b) the first type, the third type and the fifth type are high positive particles, mid-positive particles and low positive particles, respectively; and (c) the second type, the fourth type and the sixth type are high negative, mid-negative and low negative particles, respectively, the method comprises applying a driving voltage or a pulsing waveform with alternating a driving voltage and no driving voltage, to a pixel of the electrophoretic display, wherein the pixel is in the color state of the fifth type of particles and the driving voltage has the same polarity as the fourth type of particles, to drive the pixel from the color state of the fifth type of particles towards the color state of the fourth type of particles to appear at the viewing side.

The relationships between the high, medium and low driving voltages, and the forms of electrophoretic layers which may be employed in the present invention have been discussed above with reference to five particle systems, and these relationships and forms apply equally to six particle systems.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method of driving a display layer having a first surface, which forms a viewing surface of the display layer, and a second surface on the opposed side of the display layer from the first surface, the display layer being provided with means for applying an electric field between the first and second surfaces, the display layer further comprising an electrophoretic medium comprising a fluid and first, second, third, fourth and fifth types of particles dispersed in the fluid, the first, second, third, fourth and fifth types of particles having respectively first, second, third, fourth and fifth optical characteristics differing from one another, the first, third and fourth type of particles having charges of one polarity and the second and fifth types of particles having charges of the opposite polarity, the method comprising, in any order:

(i) applying a first electric field having a high magnitude and a polarity driving the first type of particles towards the viewing surface, thereby causing the display layer to display the first optical characteristic at the viewing surface;

(ii) applying a second electric field having a high magnitude and a polarity driving the second type of particles towards the viewing surface, thereby causing the display layer to display the second optical characteristic at the viewing surface;

(iii) when the second optical characteristic is displayed at the viewing surface, applying a third electric field having a low magnitude and a polarity driving the fourth type of particles towards the viewing surface, thereby causing the display layer to display the fourth optical characteristic at the viewing surface;

(iv) when the first optical characteristic is displayed at the viewing surface, applying a fourth electric field having a low magnitude and a polarity driving the fifth type of particles towards the viewing surface, thereby causing the display layer to display the fifth optical characteristic at the viewing surface; and (v) when the fifth optical characteristic is displayed at the viewing surface applying a fifth electric field having a magnitude intermediate the first and third electric fields and a polarity driving the third type of particles towards the viewing surface, thereby causing the display layer to display the third optical characteristic at the viewing surface.

2. The method according to claim 1 wherein the electrophoretic layer further comprises a sixth type of particles having a sixth optical characteristic differing from the first, second, third, fourth and fifth optical characteristics, the sixth type of particles bearing a charge of the same polarity as the second and fifth particles, the method further comprising:

(vi) when the fourth optical characteristic is displayed at the viewing surface applying a sixth electric field having a magnitude intermediate the second and fourth electric fields and a polarity driving the sixth type of particles towards the viewing surface, thereby causing the display layer to display the sixth optical characteristic at the viewing surface.

3. The method according to claim 1 wherein step (iii) is effected by first applying a high electric field having a polarity which drives the fourth particles towards the second surface and thereafter applying said third electric field.

4. The method according to claim 3 further comprising applying a shaking waveform prior to application of the high electric field.

5. The method according to claim 4 further comprising applying said high electric field for a second period prior to the shaking waveform.

6. The method according to claim 3 wherein the application of the high electric field and the application of the third electric field are repeated at least twice.

7. The method according to claim 6 wherein the application of the high electric field and the application of the third electric field are repeated at least four times.

8. The method according to claim 6 further comprising applying no electric field for a period following the application of the third electric field.

9. The method according to claim 6 further comprising applying no electric field for a period between the application of the high electric field and the application of the third electric field.

10. The method according to claim 1 wherein step (iv) is effected by first applying a high electric field having a polarity which drives the fifth particles towards the second surface and thereafter applying said fourth electric field.

11. The method according to claim 1 wherein step (v) is effected by first applying a low electric field having a magnitude less than that of the fifth electric field and a polarity which drives the third particles towards the second surface and thereafter applying said fifth electric field.

12. The method according to claim 11 wherein a high electric field having a magnitude greater than that of, but the same polarity as, the fifth electric field is applied prior to application of the low electric field.

13. The method according to claim 1 wherein step (v) is effected by first applying a low electric field having a magnitude less than that of the fifth electric field and a polarity which drives the third particles towards the second surface and thereafter applying multiple periods of said fifth electric field alternating with periods of zero electric field.

14. The method according to claim 13 wherein a high electric field having a magnitude greater than that of, but the same polarity as, the fifth electric field is applied prior to application of the low electric field.

15. The method according to claim 2 wherein step (vi) is effected by first applying a low electric field having a magnitude less than that of the sixth electric field and a polarity which drives the sixth particles towards the second surface and thereafter applying said sixth electric field.

16. The method according to claim 15 wherein a high electric field having a magnitude greater than that of, but the same polarity as, the sixth electric field is applied prior to application of the low electric field.

17. The method according to claim 16 wherein a shaking waveform is applied prior to the high electric field.

18. The method according to claim 17 further comprising applying said high electric field for a second period prior to the shaking waveform.

19. The method according to claim 2 wherein step (vi) is effected by first applying a low electric field having a magnitude less than that of the sixth electric field and a polarity which drives the sixth particles towards the second surface and thereafter applying multiple periods of said sixth electric field alternating with periods of zero electric field.

20. The method according to claim 19 wherein a high electric field having a magnitude greater than that of, but the same polarity as, the sixth electric field is applied prior to application of the low electric field.

21. The method according to claim 20 wherein a shaking waveform is applied prior to the high electric field.

22. The method according to claim 21 further comprising applying said high electric field for a second period prior to the shaking waveform.

* * * * *